United States Patent
Chang et al.

(10) Patent No.: US 9,915,807 B2
(45) Date of Patent: Mar. 13, 2018

(54) OPTICAL IMAGING LENS

(71) Applicant: Genius Electronic Optical Co., Ltd., Taichung (TW)

(72) Inventors: Kuo-Wen Chang, Taichung (TW); Baina Chen, Fujian (CN)

(73) Assignee: GENIUS ELECTRONIC OPTICAL (XIAMEN) CO., LTD., Fujian (CN)

( * ) Notice: Subject to any disclaimer, the term of this patent is extended or adjusted under 35 U.S.C. 154(b) by 0 days.

(21) Appl. No.: 15/213,409

(22) Filed: Jul. 19, 2016

(65) Prior Publication Data

US 2017/0351064 A1 Dec. 7, 2017

(30) Foreign Application Priority Data

Jun. 2, 2016 (CN) .......................... 2016 1 0387644

(51) Int. Cl.
G02B 9/62 (2006.01)
G02B 13/00 (2006.01)
G02B 9/60 (2006.01)
G02B 9/34 (2006.01)
G02B 27/00 (2006.01)

(52) U.S. Cl.
CPC ........... *G02B 13/0045* (2013.01); *G02B 9/34* (2013.01); *G02B 9/60* (2013.01); *G02B 9/62* (2013.01); *G02B 13/004* (2013.01); *G02B 27/0025* (2013.01)

(58) Field of Classification Search
CPC ...... G02B 15/14; G02B 15/16; G02B 15/177; G02B 5/005; G02B 13/04; G02B 13/0045; G02B 9/00
USPC ........ 359/676, 683, 684, 738–740, 749, 754
See application file for complete search history.

(56) References Cited

U.S. PATENT DOCUMENTS 5,798,872 A * 8/1998 Uzawa ................. G02B 15/173
359/686

* cited by examiner

*Primary Examiner* — William Choi
(74) *Attorney, Agent, or Firm* — JCIPRNET

(57) ABSTRACT

An optical imaging lens includes a plurality of lens elements arranged in order from an object side to an image side along an optical axis, and each lens element has an object-side surface and an image-side surface. There is at least one variable gap between the lens elements, and one of the lens elements closest to the object side has positive refracting power. The optical imaging lens satisfies: $\Delta G/Gv \leq 0.1$. Here, $\Delta G$ is an absolute value of a difference between a first value and a second value of the length of the at least one variable gap along the optical axis when an object having an infinite object distance and an object having an object distance of 500 millimeters are focused respectively, and Gv is the second value.

19 Claims, 37 Drawing Sheets

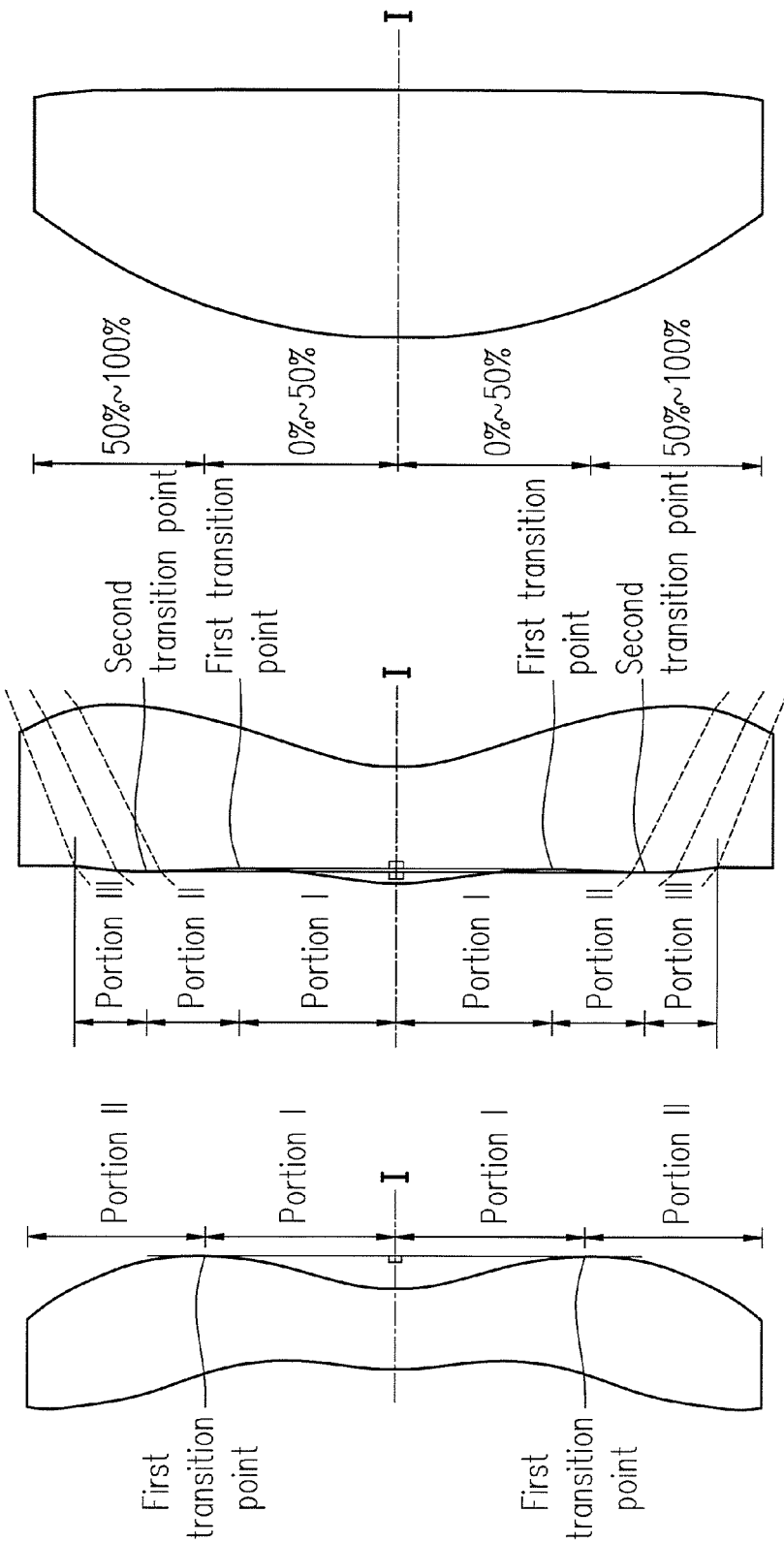

| First embodiment |||||||
|---|---|---|---|---|---|---|
| Effective focal length=8.784 mm, Half field of view (HFOV)=17.993°, Fno=2.023, System length=7.956mm, Image height=2.944mm |||||||
| Lens element | Surface | Radius of curvature(mm) | Thickness (mm) | Refractive index | Dispersion coefficient | Focal length(mm) |
| Object | | Infinity | 1.000E+10 | | | |
| Aperture stop2 | | Infinity | -1.190 | | | |
| First lens element 3 | Object-side surface31 | 2.590 | 1.199 | 1.545 | 55.987 | 5.842 |
| | Image-side surface32 | 11.484 | 0.049 | | | |
| Second lens element 4 | Object-side surface41 | 6.506 | 0.221 | 1.642 | 22.409 | -7.389 |
| | Image-side surface42 | 2.720 | 0.048 | | | |
| Third lens element 5 | Object-side surface51 | 2.734 | 1.019 | 1.545 | 55.987 | 8.468 |
| | Image-side surface52 | 5.803 | 1.240 | | | |
| Fourth lens element 6 | Object-side surface61 | -83.740 | 0.287 | 1.545 | 55.987 | -13.732 |
| | Image-side surface62 | 8.250 | 1.652 | | | |
| Fifth lens element 7 | Object-side surface71 | -3.767 | 0.629 | 1.642 | 22.409 | 10.079 |
| | Image-side surface72 | -2.545 | 0.149 | | | |
| Sixth lens element 8 | Object-side surface81 | -3.078 | 0.560 | 1.545 | 55.987 | -4.752 |
| | Image-side surface82 | 17.644 | 0.400 | | | |
| Filter 9 | Object-side surface91 | Infinity | 0.210 | 1.517 | 64.167 | |
| | Image-side surface92 | Infinity | 0.292 | | | |
| | Image plane100 | Infinity | | | | |

FIG. 8

| Surface | K | $a_4$ | $a_6$ | $a_8$ | $a_{10}$ |
|---|---|---|---|---|---|
| 31 | 0.000000E+00 | -1.667343E-03 | 2.438972E-04 | -9.806488E-06 | 0.000000E+00 |
| 32 | 0.000000E+00 | 1.025667E-02 | 7.088668E-04 | -1.871409E-04 | 0.000000E+00 |
| 41 | 0.000000E+00 | 7.350002E-03 | -9.969426E-04 | -5.761549E-05 | 0.000000E+00 |
| 42 | 0.000000E+00 | 3.761410E-03 | 2.300200E-03 | -5.290178E-04 | 0.000000E+00 |
| 51 | 0.000000E+00 | 4.204645E-03 | 3.990847E-03 | -5.559966E-04 | 0.000000E+00 |
| 52 | 0.000000E+00 | -1.126997E-02 | 1.119264E-03 | -1.932817E-04 | 0.000000E+00 |
| 61 | 0.000000E+00 | -7.916298E-02 | 1.075393E-02 | -3.203867E-03 | 0.000000E+00 |
| 62 | 0.000000E+00 | -4.467616E-02 | 1.359992E-02 | 4.076105E-04 | 0.000000E+00 |
| 71 | 0.000000E+00 | 2.857343E-02 | -1.196064E-02 | 1.088127E-03 | 0.000000E+00 |
| 72 | 0.000000E+00 | 5.407613E-02 | -1.864576E-02 | 2.152687E-03 | 0.000000E+00 |
| 81 | 0.000000E+00 | -3.466459E-02 | 9.952563E-03 | -5.142410E-04 | 3.869217E-06 |
| 82 | 0.000000E+00 | -1.026304E-01 | 2.818704E-02 | -3.458888E-03 | 1.516477E-04 |
| Surface | $a_{12}$ | $a_{14}$ | $a_{16}$ | $a_{18}$ | $a_{20}$ |
| 31 | 0.000000E+00 | 0.000000E+00 | 0.000000E+00 | 0.000000E+00 | 0.000000E+00 |
| 32 | 0.000000E+00 | 0.000000E+00 | 0.000000E+00 | 0.000000E+00 | 0.000000E+00 |
| 41 | 0.000000E+00 | 0.000000E+00 | 0.000000E+00 | 0.000000E+00 | 0.000000E+00 |
| 42 | 0.000000E+00 | 0.000000E+00 | 0.000000E+00 | 0.000000E+00 | 0.000000E+00 |
| 51 | 0.000000E+00 | 0.000000E+00 | 0.000000E+00 | 0.000000E+00 | 0.000000E+00 |
| 52 | 0.000000E+00 | 0.000000E+00 | 0.000000E+00 | 0.000000E+00 | 0.000000E+00 |
| 61 | 0.000000E+00 | 0.000000E+00 | 0.000000E+00 | 0.000000E+00 | 0.000000E+00 |
| 62 | 0.000000E+00 | 0.000000E+00 | 0.000000E+00 | 0.000000E+00 | 0.000000E+00 |
| 71 | 0.000000E+00 | 0.000000E+00 | 0.000000E+00 | 0.000000E+00 | 0.000000E+00 |
| 72 | 0.000000E+00 | 0.000000E+00 | 0.000000E+00 | 0.000000E+00 | 0.000000E+00 |
| 81 | 0.000000E+00 | 0.000000E+00 | 0.000000E+00 | 0.000000E+00 | 0.000000E+00 |
| 82 | 0.000000E+00 | 0.000000E+00 | 0.000000E+00 | 0.000000E+00 | 0.000000E+00 |

FIG. 9

| Second embodiment ||||||
|---|---|---|---|---|---|
| Effective focal length=5.993 mm, Half field of view (HFOV)=23.580°, Fno=2.365, System length=5.258mm, Image height=2.619mm ||||||
| Lens element | Surface | Radius of curvature(mm) | Thickness(mm) | Refractive index | Dispersion coefficient | Focal length(mm) |
| Object | | Infinity | 1.000E+10 | | | |
| Aperture stop2 | | Infinity | -0.500 | | | |
| First lens element 3 | Object-side surface31 | 1.570 | 0.585 | 1.545 | 55.987 | 2.922 |
| | Image-side surface32 | 83.290 | 0.217 | | | |
| Second lens element 4 | Object-side surface41 | -10.035 | 0.295 | 1.642 | 22.409 | -5.060 |
| | Image-side surface42 | 4.919 | 0.103 | | | |
| Third lens element 5 | Object-side surface51 | 2.343 | 0.516 | 1.545 | 55.987 | 16.749 |
| | Image-side surface52 | 2.905 | 0.398 | | | |
| Fourth lens element 6 | Object-side surface61 | -12.433 | 0.296 | 1.642 | 22.409 | -20.628 |
| | Image-side surface62 | -182.163 | 0.912 | | | |
| Fifth lens element 7 | Object-side surface71 | 41.116 | 0.300 | 1.545 | 55.987 | -2.977 |
| | Image-side surface72 | 1.561 | 0.135 | | | |
| Sixth lens element 8 | Object-side surface81 | 13.834 | 0.651 | 1.642 | 22.409 | 11.413 |
| | Image-side surface82 | -15.562 | 0.400 | | | |
| Filter 9 | Object-side surface91 | Infinity | 0.210 | 1.517 | 64.167 | |
| | Image-side surface92 | Infinity | 0.240 | | | |
| | Image plane100 | Infinity | | | | |

FIG. 12

| Surface | K | $a_4$ | $a_6$ | $a_8$ | $a_{10}$ |
|---|---|---|---|---|---|
| 31 | 0.000000E+00 | -2.672498E-02 | 9.957680E-03 | -1.249545E-02 | 2.652432E-04 |
| 32 | 0.000000E+00 | -3.669324E-03 | 8.759758E-03 | -5.755055E-03 | 1.040879E-03 |
| 41 | 0.000000E+00 | 5.517572E-02 | 1.966263E-02 | -9.933722E-03 | -4.786556E-03 |
| 42 | 0.000000E+00 | -6.723124E-02 | 2.057322E-01 | -3.879381E-02 | -4.616883E-02 |
| 51 | 0.000000E+00 | -1.860111E-01 | 2.849788E-01 | -3.498619E-02 | -7.890589E-02 |
| 52 | 0.000000E+00 | -1.228177E-01 | 1.970006E-01 | -1.161510E-01 | -1.738486E-01 |
| 61 | 0.000000E+00 | -1.015791E-01 | -1.713696E-01 | 2.839853E-01 | -6.243273E-01 |
| 62 | 0.000000E+00 | -4.524425E-02 | 1.573007E-02 | -8.058504E-02 | 2.032761E-02 |
| 71 | 0.000000E+00 | -1.028528E-01 | -5.292006E-01 | 1.040841E+00 | -6.740694E-01 |
| 72 | 0.000000E+00 | -6.219300E-01 | 2.889405E-01 | -2.790470E-01 | 1.589036E-01 |
| 81 | 0.000000E+00 | -3.266399E-01 | -1.719449E-01 | 3.061166E-01 | -1.997963E-01 |
| 82 | 0.000000E+00 | -1.046865E-01 | -7.483113E-03 | 3.787174E-02 | -1.197309E-02 |
| Surface | $a_{12}$ | $a_{14}$ | $a_{16}$ | $a_{18}$ | $a_{20}$ |
| 31 | 0.000000E+00 | 0.000000E+00 | 0.000000E+00 | 0.000000E+00 | 0.000000E+00 |
| 32 | 0.000000E+00 | 0.000000E+00 | 0.000000E+00 | 0.000000E+00 | 0.000000E+00 |
| 41 | 0.000000E+00 | 0.000000E+00 | 0.000000E+00 | 0.000000E+00 | 0.000000E+00 |
| 42 | 0.000000E+00 | 0.000000E+00 | 0.000000E+00 | 0.000000E+00 | 0.000000E+00 |
| 51 | 5.443497E-02 | 0.000000E+00 | 0.000000E+00 | 0.000000E+00 | 0.000000E+00 |
| 52 | 2.433127E-01 | 0.000000E+00 | 0.000000E+00 | 0.000000E+00 | 0.000000E+00 |
| 61 | 3.521400E-01 | 0.000000E+00 | 0.000000E+00 | 0.000000E+00 | 0.000000E+00 |
| 62 | 3.672075E-02 | 0.000000E+00 | 0.000000E+00 | 0.000000E+00 | 0.000000E+00 |
| 71 | -3.844182E-02 | 1.681074E-01 | -3.988604E-02 | 0.000000E+00 | 0.000000E+00 |
| 72 | -2.270520E-02 | -1.170774E-02 | 2.476382E-03 | 0.000000E+00 | 0.000000E+00 |
| 81 | 5.885550E-02 | 1.789001E-02 | -1.248331E-02 | 0.000000E+00 | 0.000000E+00 |
| 82 | -2.049574E-03 | 1.457632E-03 | -1.860127E-04 | 0.000000E+00 | 0.000000E+00 |

FIG. 13

| Third embodiment | | | | | | |
|---|---|---|---|---|---|---|
| Effective focal length=7.669 mm, Half field of view (HFOV)=20.860°, Fno=2.395, System length=7.365mm, Image height=2.944mm | | | | | | |
| Lens element | Surface | Radius of curvature(mm) | Thickness(mm) | Refractive index | Dispersion coefficient | Focal length(mm) |
| Object | | Infinity | 1.000E+10 | | | |
| Aperture stop2 | | Infinity | -0.600 | | | |
| First lens element 3 | Object-side surface31 | 2.369 | 0.760 | 1.545 | 55.987 | 4.745 |
| | Image-side surface32 | 24.330 | 0.049 | | | |
| Second lens element 4 | Object-side surface41 | 38.227 | 0.465 | 1.642 | 22.409 | -7.579 |
| | Image-side surface42 | 4.327 | 0.048 | | | |
| Third lens element 5 | Object-side surface51 | 3.233 | 0.616 | 1.545 | 55.987 | 17.589 |
| | Image-side surface52 | 4.545 | 1.243 | | | |
| Fourth lens element 6 | Object-side surface61 | 5.972 | 0.297 | 1.545 | 55.987 | -93.260 |
| | Image-side surface62 | 5.251 | 1.652 | | | |
| Fifth lens element 7 | Object-side surface71 | -6.260 | 0.580 | 1.642 | 22.409 | 10.962 |
| | Image-side surface72 | -3.447 | 0.149 | | | |
| Sixth lens element 8 | Object-side surface81 | -2.715 | 0.605 | 1.545 | 55.987 | -4.770 |
| | Image-side surface82 | 70.048 | 0.400 | | | |
| Filter 9 | Object-side surface91 | Infinity | 0.210 | 1.517 | 64.167 | |
| | Image-side surface92 | Infinity | 0.292 | | | |
| | Image plane100 | Infinity | | | | |

FIG. 16

| Surface | K | $a_4$ | $a_6$ | $a_8$ | $a_{10}$ |
|---|---|---|---|---|---|
| 31 | 0.000000E+00 | -1.546906E-03 | -3.452439E-04 | 1.913914E-04 | 0.000000E+00 |
| 32 | 0.000000E+00 | -1.478119E-03 | 1.015442E-02 | -1.501764E-03 | 0.000000E+00 |
| 41 | 0.000000E+00 | 9.747960E-03 | 6.873096E-03 | -1.496451E-03 | 0.000000E+00 |
| 42 | 0.000000E+00 | 2.652771E-03 | 2.063726E-02 | -3.503539E-03 | 0.000000E+00 |
| 51 | 0.000000E+00 | -3.188504E-02 | 3.119948E-02 | -5.326465E-03 | 0.000000E+00 |
| 52 | 0.000000E+00 | -3.018386E-02 | 7.297802E-03 | -1.994728E-03 | 0.000000E+00 |
| 61 | 0.000000E+00 | -8.518948E-02 | -1.903289E-02 | 4.515765E-03 | 0.000000E+00 |
| 62 | 0.000000E+00 | -6.271975E-02 | -1.184925E-02 | 7.841575E-03 | 0.000000E+00 |
| 71 | 0.000000E+00 | 1.803344E-03 | -9.031784E-03 | 1.427555E-03 | 0.000000E+00 |
| 72 | 0.000000E+00 | 1.606673E-02 | -1.112699E-02 | 1.552766E-03 | 0.000000E+00 |
| 81 | 0.000000E+00 | -3.508805E-03 | 1.732064E-03 | 1.073673E-04 | 3.120362E-05 |
| 82 | 0.000000E+00 | -3.333094E-02 | 6.889460E-03 | -8.330334E-04 | 3.577532E-05 |
| Surface | $a_{12}$ | $a_{14}$ | $a_{16}$ | $a_{18}$ | $a_{20}$ |
| 31 | 0.000000E+00 | 0.000000E+00 | 0.000000E+00 | 0.000000E+00 | 0.000000E+00 |
| 32 | 0.000000E+00 | 0.000000E+00 | 0.000000E+00 | 0.000000E+00 | 0.000000E+00 |
| 41 | 0.000000E+00 | 0.000000E+00 | 0.000000E+00 | 0.000000E+00 | 0.000000E+00 |
| 42 | 0.000000E+00 | 0.000000E+00 | 0.000000E+00 | 0.000000E+00 | 0.000000E+00 |
| 51 | 0.000000E+00 | 0.000000E+00 | 0.000000E+00 | 0.000000E+00 | 0.000000E+00 |
| 52 | 0.000000E+00 | 0.000000E+00 | 0.000000E+00 | 0.000000E+00 | 0.000000E+00 |
| 61 | 0.000000E+00 | 0.000000E+00 | 0.000000E+00 | 0.000000E+00 | 0.000000E+00 |
| 62 | 0.000000E+00 | 0.000000E+00 | 0.000000E+00 | 0.000000E+00 | 0.000000E+00 |
| 71 | 0.000000E+00 | 0.000000E+00 | 0.000000E+00 | 0.000000E+00 | 0.000000E+00 |
| 72 | 0.000000E+00 | 0.000000E+00 | 0.000000E+00 | 0.000000E+00 | 0.000000E+00 |
| 81 | 0.000000E+00 | 0.000000E+00 | 0.000000E+00 | 0.000000E+00 | 0.000000E+00 |
| 82 | 0.000000E+00 | 0.000000E+00 | 0.000000E+00 | 0.000000E+00 | 0.000000E+00 |

FIG. 17

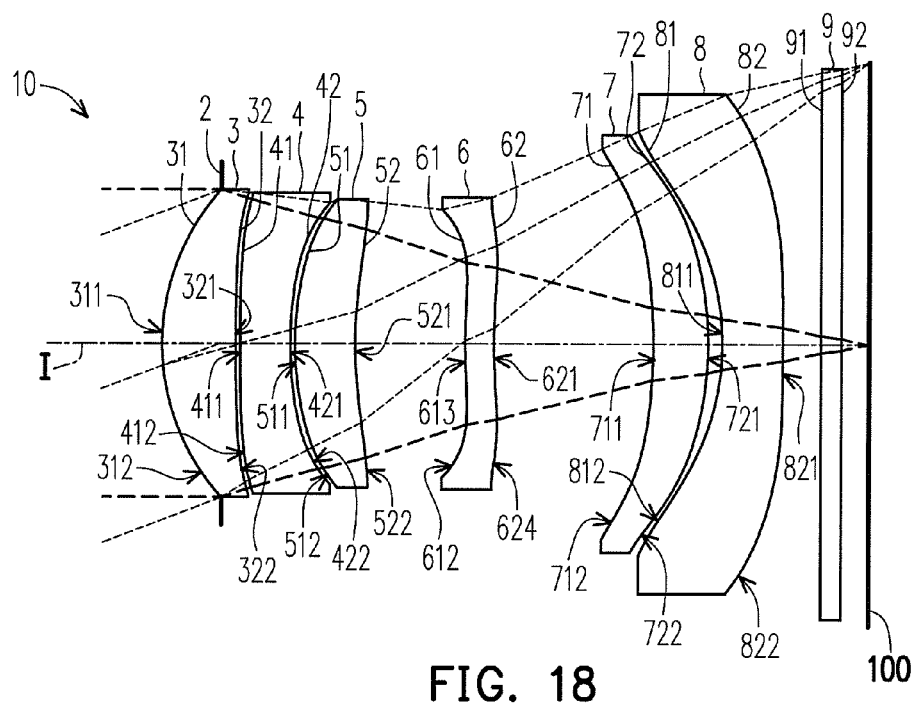
FIG. 18
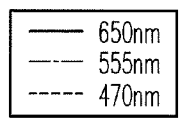
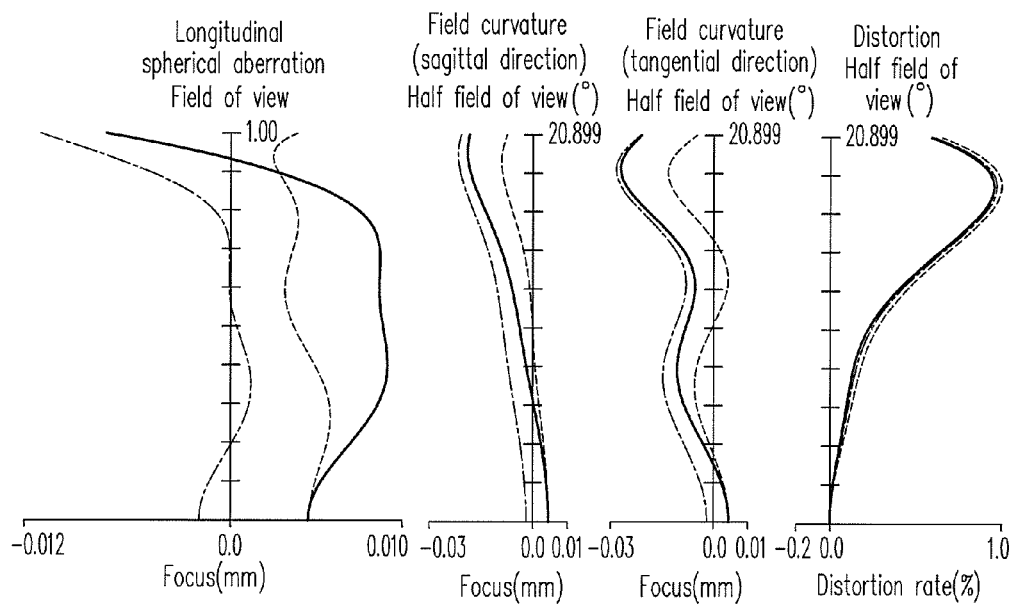
FIG. 19A   FIG. 19B   FIG. 19C   FIG. 19D

| Fourth embodiment ||||||
|---|---|---|---|---|---|
| Effective focal length=7.660 mm, Half field of view (HFOV)=20.899°, Fno=2.393, System length=7.365mm, Image height=2.944mm ||||||
| Lens element | Surface | Radius of curvature(mm) | Thickness(mm) | Refractive index | Dispersion coefficient | Focal length(mm) |
| Object | | Infinity | 1.000E+10 | | | |
| Aperture stop2 | | Infinity | -0.600 | | | |
| First lens element 3 | Object-side surface31 | 2.353 | 0.767 | 1.545 | 55.987 | 4.719 |
| | Image-side surface32 | 23.848 | 0.049 | | | |
| Second lens element 4 | Object-side surface41 | 37.336 | 0.525 | 1.642 | 22.409 | -7.430 |
| | Image-side surface42 | 4.237 | 0.048 | | | |
| Third lens element 5 | Object-side surface51 | 3.194 | 0.625 | 1.545 | 55.987 | 18.047 |
| | Image-side surface52 | 4.397 | 1.146 | | | |
| Fourth lens element 6 | Object-side surface61 | 5.747 | 0.298 | 1.545 | 55.987 | -138.174 |
| | Image-side surface62 | 5.242 | 1.652 | | | |
| Fifth lens element 7 | Object-side surface71 | -6.106 | 0.574 | 1.642 | 22.409 | 11.218 |
| | Image-side surface72 | -3.440 | 0.149 | | | |
| Sixth lens element 8 | Object-side surface81 | -2.698 | 0.630 | 1.545 | 55.987 | -4.818 |
| | Image-side surface82 | 116.233 | 0.400 | | | |
| Filter 9 | Object-side surface91 | Infinity | 0.210 | 1.517 | 64.167 | |
| | Image-side surface92 | Infinity | 0.292 | | | |
| | Image plane100 | Infinity | | | | |

FIG. 20

| Surface | K | $a_4$ | $a_6$ | $a_8$ | $a_{10}$ |
|---|---|---|---|---|---|
| 31 | 0.000000E+00 | -1.754233E-03 | -2.992640E-04 | 1.171964E-04 | 0.000000E+00 |
| 32 | 0.000000E+00 | -1.076370E-03 | 9.860181E-03 | -1.556944E-03 | 0.000000E+00 |
| 41 | 0.000000E+00 | 9.399123E-03 | 6.953721E-03 | -1.569716E-03 | 0.000000E+00 |
| 42 | 0.000000E+00 | 2.524322E-03 | 2.174649E-02 | -3.835157E-03 | 0.000000E+00 |
| 51 | 0.000000E+00 | -3.197238E-02 | 3.190205E-02 | -5.476627E-03 | 0.000000E+00 |
| 52 | 0.000000E+00 | -3.301343E-02 | 7.694908E-03 | -2.157347E-03 | 0.000000E+00 |
| 61 | 0.000000E+00 | -8.579768E-02 | -2.095430E-02 | 4.890574E-03 | 0.000000E+00 |
| 62 | 0.000000E+00 | -6.159880E-02 | -1.361880E-02 | 8.646414E-03 | 0.000000E+00 |
| 71 | 0.000000E+00 | 1.748677E-03 | -9.147092E-03 | 1.468954E-03 | 0.000000E+00 |
| 72 | 0.000000E+00 | 1.548676E-02 | -1.114304E-02 | 1.582853E-03 | 0.000000E+00 |
| 81 | 0.000000E+00 | -3.596695E-03 | 1.765552E-03 | 1.068024E-04 | 3.389262E-05 |
| 82 | 0.000000E+00 | -3.305126E-02 | 6.841385E-03 | -8.336297E-04 | 3.613878E-05 |
| Surface | $a_{12}$ | $a_{14}$ | $a_{16}$ | $a_{18}$ | $a_{20}$ |
| 31 | 0.000000E+00 | 0.000000E+00 | 0.000000E+00 | 0.000000E+00 | 0.000000E+00 |
| 32 | 0.000000E+00 | 0.000000E+00 | 0.000000E+00 | 0.000000E+00 | 0.000000E+00 |
| 41 | 0.000000E+00 | 0.000000E+00 | 0.000000E+00 | 0.000000E+00 | 0.000000E+00 |
| 42 | 0.000000E+00 | 0.000000E+00 | 0.000000E+00 | 0.000000E+00 | 0.000000E+00 |
| 51 | 0.000000E+00 | 0.000000E+00 | 0.000000E+00 | 0.000000E+00 | 0.000000E+00 |
| 52 | 0.000000E+00 | 0.000000E+00 | 0.000000E+00 | 0.000000E+00 | 0.000000E+00 |
| 61 | 0.000000E+00 | 0.000000E+00 | 0.000000E+00 | 0.000000E+00 | 0.000000E+00 |
| 62 | 0.000000E+00 | 0.000000E+00 | 0.000000E+00 | 0.000000E+00 | 0.000000E+00 |
| 71 | 0.000000E+00 | 0.000000E+00 | 0.000000E+00 | 0.000000E+00 | 0.000000E+00 |
| 72 | 0.000000E+00 | 0.000000E+00 | 0.000000E+00 | 0.000000E+00 | 0.000000E+00 |
| 81 | 0.000000E+00 | 0.000000E+00 | 0.000000E+00 | 0.000000E+00 | 0.000000E+00 |
| 82 | 0.000000E+00 | 0.000000E+00 | 0.000000E+00 | 0.000000E+00 | 0.000000E+00 |

FIG. 21

| Fifth embodiment | | | | | | |
|---|---|---|---|---|---|---|
| Effective focal length=6.133 mm, Half field of view (HFOV)=25.002°, Fno=2.042, System length=5.952mm, Image height=2.912mm | | | | | | |
| Lens element | Surface | Radius of curvature(mm) | Thickness(mm) | Refractive index | Dispersion coefficient | Focal length(mm) |
| Object | | Infinity | 1.000E+10 | | | |
| Aperture stop2 | | Infinity | -0.770 | | | |
| First lens element 3 | Object-side surface31 | 1.807 | 0.848 | 1.545 | 55.987 | 3.799 |
| | Image-side surface32 | 11.666 | 0.050 | | | |
| Second lens element 4 | Object-side surface41 | 7.051 | 0.215 | 1.661 | 20.401 | -6.999 |
| | Image-side surface42 | 2.773 | 0.238 | | | |
| Third lens element 5 | Object-side surface51 | 3.433 | 0.637 | 1.545 | 55.987 | 14.433 |
| | Image-side surface52 | 5.682 | 0.562 | | | |
| Fourth lens element 6 | Object-side surface61 | 17.075 | 0.266 | 1.661 | 20.401 | -48.910 |
| | Image-side surface62 | 11.135 | 0.852 | | | |
| Fifth lens element 7 | Object-side surface71 | 15.484 | 0.328 | 1.545 | 55.987 | -6.213 |
| | Image-side surface72 | 2.763 | 0.290 | | | |
| Sixth lens element 8 | Object-side surface81 | 231.183 | 0.816 | 1.661 | 20.401 | -267.045 |
| | Image-side surface82 | 100.408 | 0.403 | | | |
| Filter 9 | Object-side surface91 | Infinity | 0.210 | 1.517 | 64.167 | |
| | Image-side surface92 | Infinity | 0.237 | | | |
| | Image plane100 | Infinity | | | | |

FIG. 24

| Surface | K | $a_4$ | $a_6$ | $a_8$ | $a_{10}$ |
|---|---|---|---|---|---|
| 31 | 0.000000E+00 | -4.943003E-03 | 8.525558E-03 | -5.760804E-03 | 1.020577E-03 |
| 32 | 0.000000E+00 | 2.849332E-02 | -1.908899E-02 | 1.410374E-02 | -6.065046E-05 |
| 41 | 0.000000E+00 | -6.206552E-02 | 7.444173E-02 | -2.126053E-02 | 7.080960E-03 |
| 42 | 0.000000E+00 | -1.279818E-01 | 1.485097E-01 | -4.033992E-02 | 1.437304E-02 |
| 51 | 0.000000E+00 | -6.307676E-02 | 4.572668E-02 | 3.654023E-02 | -3.248874E-02 |
| 52 | 0.000000E+00 | -5.694147E-02 | 4.736583E-02 | -4.502795E-02 | 2.923299E-02 |
| 61 | 0.000000E+00 | -1.068023E-01 | -2.068688E-01 | 4.579909E-01 | -5.867960E-01 |
| 62 | 0.000000E+00 | -9.267299E-02 | -8.545353E-02 | 2.032906E-01 | -2.173967E-01 |
| 71 | 0.000000E+00 | -1.702576E-01 | -2.281668E-03 | 4.471431E-02 | -3.173774E-02 |
| 72 | 0.000000E+00 | -1.629979E-01 | 5.632583E-02 | -1.131777E-02 | -2.642909E-03 |
| 81 | 0.000000E+00 | -4.004619E-02 | 2.260053E-02 | -7.537122E-03 | 4.612506E-04 |
| 82 | 0.000000E+00 | -5.754097E-02 | 2.024272E-02 | -5.897472E-03 | 9.146678E-04 |
| Surface | $a_{12}$ | $a_{14}$ | $a_{16}$ | $a_{18}$ | $a_{20}$ |
| 31 | 0.000000E+00 | 0.000000E+00 | 0.000000E+00 | 0.000000E+00 | 0.000000E+00 |
| 32 | -9.307294E-04 | 0.000000E+00 | 0.000000E+00 | 0.000000E+00 | 0.000000E+00 |
| 41 | -2.186138E-03 | 0.000000E+00 | 0.000000E+00 | 0.000000E+00 | 0.000000E+00 |
| 42 | -5.431004E-03 | 0.000000E+00 | 0.000000E+00 | 0.000000E+00 | 0.000000E+00 |
| 51 | 8.162206E-03 | 0.000000E+00 | 0.000000E+00 | 0.000000E+00 | 0.000000E+00 |
| 52 | -1.573831E-02 | 4.557716E-03 | 0.000000E+00 | 0.000000E+00 | 0.000000E+00 |
| 61 | 3.731046E-01 | -9.151164E-02 | 0.000000E+00 | 0.000000E+00 | 0.000000E+00 |
| 62 | 1.230001E-01 | -2.529809E-02 | 0.000000E+00 | 0.000000E+00 | 0.000000E+00 |
| 71 | 2.491590E-03 | 4.124061E-03 | -9.054952E-04 | 0.000000E+00 | 0.000000E+00 |
| 72 | 1.313608E-03 | -1.408954E-04 | 2.634517E-06 | 0.000000E+00 | 0.000000E+00 |
| 81 | 6.669670E-05 | 1.258892E-05 | -2.686612E-06 | 0.000000E+00 | 0.000000E+00 |
| 82 | -3.760836E-05 | -9.353189E-06 | 1.016096E-06 | 0.000000E+00 | 0.000000E+00 |

FIG. 25

| Sixth embodiment ||||||
|---|---|---|---|---|---|
| Effective focal length=7.011 mm, Half field of view (HFOV)=25.001°, Fno=1.911, System length=7.465mm, Image height=3.214mm ||||||
| Lens element | Surface | Radius of curvature(mm) | Thickness(mm) | Refractive index | Dispersion coefficient | Focal length(mm) |
| Object | | Infinity | 1.000E+10 | | | |
| Aperture stop2 | | Infinity | -0.770 | | | |
| First lens element 3 | Object-side surface31 | 2.147 | 1.075 | 1.545 | 55.987 | 4.215 |
| | Image-side surface32 | 26.143 | 0.050 | | | |
| Second lens element 4 | Object-side surface41 | 6.083 | 0.233 | 1.661 | 20.401 | -10.109 |
| | Image-side surface42 | 3.148 | 0.238 | | | |
| Third lens element 5 | Object-side surface51 | 6.904 | 0.559 | 1.545 | 55.987 | 3214.005 |
| | Image-side surface52 | 6.733 | 0.562 | | | |
| Fourth lens element 6 | Object-side surface61 | -33.333 | 0.273 | 1.661 | 20.401 | -17.241 |
| | Image-side surface62 | 17.588 | 1.241 | | | |
| Fifth lens element 7 | Object-side surface71 | -50.125 | 0.391 | 1.545 | 55.987 | -35.582 |
| | Image-side surface72 | 31.837 | 0.290 | | | |
| Sixth lens element 8 | Object-side surface81 | 6.284 | 1.704 | 1.661 | 20.401 | -78.250 |
| | Image-side surface82 | 5.000 | 0.403 | | | |
| Filter 9 | Object-side surface91 | Infinity | 0.210 | 1.517 | 64.167 | |
| | Image-side surface92 | Infinity | 0.237 | | | |
| | Image plane100 | Infinity | | | | |

FIG. 28

| Surface | K | $a_4$ | $a_6$ | $a_8$ | $a_{10}$ |
|---|---|---|---|---|---|
| 31 | 0.000000E+00 | -6.055748E-03 | 6.967401E-03 | -3.105259E-03 | 1.614534E-04 |
| 32 | 0.000000E+00 | 7.653884E-04 | -1.488010E-02 | 7.113424E-03 | 5.183158E-04 |
| 41 | 0.000000E+00 | -1.034367E-01 | 6.634934E-02 | -2.262808E-02 | 9.595976E-03 |
| 42 | 0.000000E+00 | -1.725816E-01 | 1.310162E-01 | -4.687460E-02 | 1.920747E-02 |
| 51 | 0.000000E+00 | -9.307041E-02 | 4.799014E-02 | 2.902845E-02 | -2.578246E-02 |
| 52 | 0.000000E+00 | -5.716707E-02 | 7.302492E-02 | -5.517418E-02 | 3.846492E-02 |
| 61 | 0.000000E+00 | -6.237867E-02 | -2.883898E-01 | 5.729054E-01 | -5.508528E-01 |
| 62 | 0.000000E+00 | -9.763976E-02 | -5.974153E-02 | 1.664166E-01 | -1.554557E-01 |
| 71 | 0.000000E+00 | -4.400578E-02 | -1.962795E-02 | 2.261649E-02 | -7.080124E-03 |
| 72 | 0.000000E+00 | -8.087607E-02 | 3.017305E-02 | -5.403643E-03 | -2.494046E-04 |
| 81 | 0.000000E+00 | -3.367307E-02 | 1.156627E-02 | -1.648068E-03 | -4.060360E-05 |
| 82 | 0.000000E+00 | 2.209152E-03 | -1.048536E-02 | 3.973204E-03 | -8.007911E-04 |
| Surface | $a_{12}$ | $a_{14}$ | $a_{16}$ | $a_{18}$ | $a_{20}$ |
| 31 | 0.000000E+00 | 0.000000E+00 | 0.000000E+00 | 0.000000E+00 | 0.000000E+00 |
| 32 | -3.936116E-04 | 0.000000E+00 | 0.000000E+00 | 0.000000E+00 | 0.000000E+00 |
| 41 | -1.752291E-03 | 0.000000E+00 | 0.000000E+00 | 0.000000E+00 | 0.000000E+00 |
| 42 | -3.899055E-03 | 0.000000E+00 | 0.000000E+00 | 0.000000E+00 | 0.000000E+00 |
| 51 | 5.694473E-03 | 0.000000E+00 | 0.000000E+00 | 0.000000E+00 | 0.000000E+00 |
| 52 | -2.465939E-02 | 6.678364E-03 | 0.000000E+00 | 0.000000E+00 | 0.000000E+00 |
| 61 | 2.544965E-01 | -4.429607E-02 | 0.000000E+00 | 0.000000E+00 | 0.000000E+00 |
| 62 | 6.810136E-02 | -1.081705E-02 | 0.000000E+00 | 0.000000E+00 | 0.000000E+00 |
| 71 | -1.096248E-03 | 8.360091E-04 | -9.784887E-05 | 0.000000E+00 | 0.000000E+00 |
| 72 | 7.571358E-05 | 8.626642E-06 | -7.977325E-07 | 0.000000E+00 | 0.000000E+00 |
| 81 | 4.053754E-05 | -4.625393E-06 | 1.781197E-07 | 0.000000E+00 | 0.000000E+00 |
| 82 | 9.311351E-05 | -5.862987E-06 | 1.532427E-07 | 0.000000E+00 | 0.000000E+00 |

FIG. 29

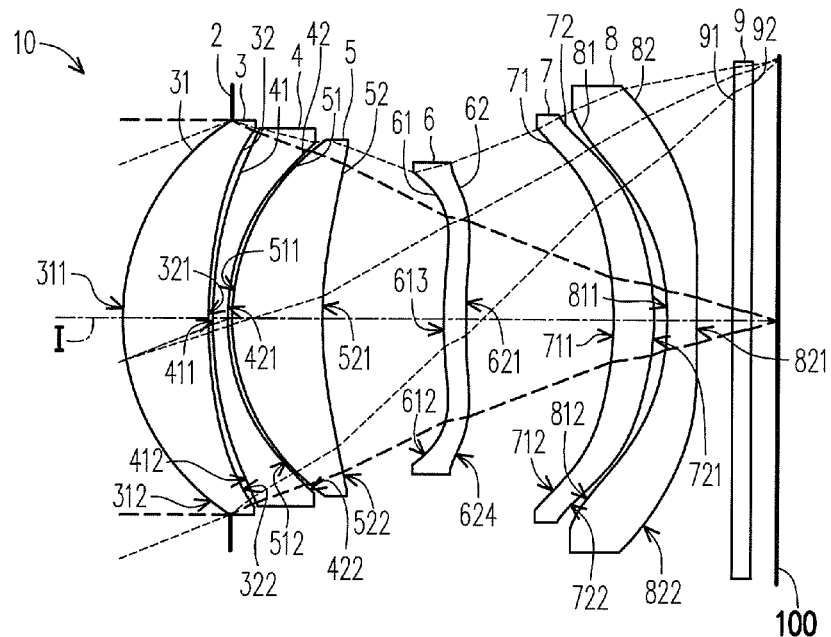
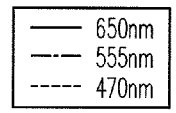
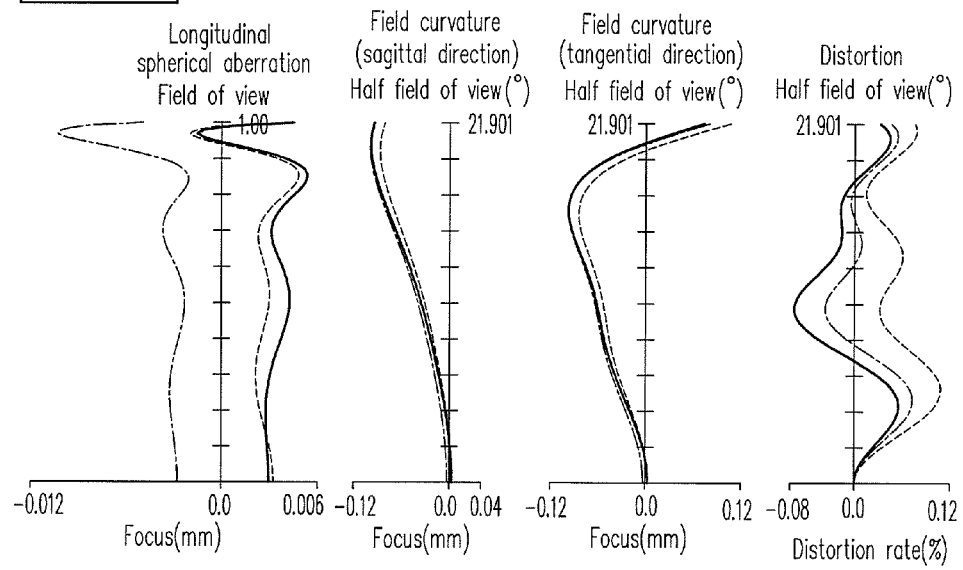
FIG. 30
FIG. 31A  FIG. 31B  FIG. 31C  FIG. 31D

| Seventh embodiment |||||||
|---|---|---|---|---|---|---|
| Effective focal length=7.314 mm, Half field of view (HFOV)=21.901°, Fno=1.660, System length=7.310mm, Image height=2.944mm |||||||
| Lens element | Surface | Radius of curvature(mm) | Thickness(mm) | Refractive index | Dispersion coefficient | Focal length(mm) |
| Object | | Infinity | 1.000E+10 | | | |
| Aperture stop2 | | Infinity | -1.190 | | | |
| First lens element 3 | Object-side surface31 | 2.561 | 0.957 | 1.545 | 55.987 | 7.610 |
| | Image-side surface32 | 5.788 | 0.049 | | | |
| Second lens element 4 | Object-side surface41 | 5.382 | 0.164 | 1.642 | 22.409 | -7.661 |
| | Image-side surface42 | 2.550 | 0.048 | | | |
| Third lens element 5 | Object-side surface51 | 2.303 | 0.997 | 1.545 | 55.987 | 7.052 |
| | Image-side surface52 | 4.852 | 1.362 | | | |
| Fourth lens element 6 | Object-side surface61 | 5.492 | 0.249 | 1.545 | 55.987 | 28.694 |
| | Image-side surface62 | 8.318 | 1.652 | | | |
| Fifth lens element 7 | Object-side surface71 | -3.642 | 0.454 | 1.642 | 22.409 | 11.311 |
| | Image-side surface72 | -2.551 | 0.149 | | | |
| Sixth lens element 8 | Object-side surface81 | -2.889 | 0.325 | 1.545 | 55.987 | -4.356 |
| | Image-side surface82 | 14.049 | 0.400 | | | |
| Filter 9 | Object-side surface91 | Infinity | 0.210 | 1.517 | 64.167 | |
| | Image-side surface92 | Infinity | 0.292 | | | |
| | Image plane100 | Infinity | | | | |

FIG. 32

| Surface | K | $a_4$ | $a_6$ | $a_8$ | $a_{10}$ |
|---|---|---|---|---|---|
| 31 | 0.000000E+00 | -7.334344E-05 | -5.510118E-04 | 3.267273E-05 | 0.000000E+00 |
| 32 | 0.000000E+00 | -4.996009E-04 | 1.620145E-03 | -5.693564E-05 | 0.000000E+00 |
| 41 | 0.000000E+00 | 1.009089E-02 | -1.083386E-03 | -7.118322E-05 | 0.000000E+00 |
| 42 | 0.000000E+00 | 9.145230E-03 | 1.033682E-03 | -6.945743E-04 | 0.000000E+00 |
| 51 | 0.000000E+00 | -1.195451E-02 | 3.847509E-03 | -6.382139E-04 | 0.000000E+00 |
| 52 | 0.000000E+00 | -7.134198E-03 | -1.302523E-03 | 2.442324E-04 | 0.000000E+00 |
| 61 | 0.000000E+00 | 2.308652E-03 | -5.758776E-02 | 9.435794E-03 | 0.000000E+00 |
| 62 | 0.000000E+00 | 1.680726E-02 | -5.626753E-02 | 1.246197E-02 | 0.000000E+00 |
| 71 | 0.000000E+00 | 2.957481E-02 | -1.973592E-02 | 2.492746E-03 | 0.000000E+00 |
| 72 | 0.000000E+00 | 6.460554E-02 | -2.782807E-02 | 3.404096E-03 | 0.000000E+00 |
| 81 | 0.000000E+00 | -1.087572E-02 | -4.765905E-03 | 2.059894E-03 | -1.270124E-04 |
| 82 | 0.000000E+00 | -7.150431E-02 | 1.548499E-02 | -1.759121E-03 | 7.566371E-05 |
| Surface | $a_{12}$ | $a_{14}$ | $a_{16}$ | $a_{18}$ | $a_{20}$ |
| 31 | 0.000000E+00 | 0.000000E+00 | 0.000000E+00 | 0.000000E+00 | 0.000000E+00 |
| 32 | 0.000000E+00 | 0.000000E+00 | 0.000000E+00 | 0.000000E+00 | 0.000000E+00 |
| 41 | 0.000000E+00 | 0.000000E+00 | 0.000000E+00 | 0.000000E+00 | 0.000000E+00 |
| 42 | 0.000000E+00 | 0.000000E+00 | 0.000000E+00 | 0.000000E+00 | 0.000000E+00 |
| 51 | 0.000000E+00 | 0.000000E+00 | 0.000000E+00 | 0.000000E+00 | 0.000000E+00 |
| 52 | 0.000000E+00 | 0.000000E+00 | 0.000000E+00 | 0.000000E+00 | 0.000000E+00 |
| 61 | 0.000000E+00 | 0.000000E+00 | 0.000000E+00 | 0.000000E+00 | 0.000000E+00 |
| 62 | 0.000000E+00 | 0.000000E+00 | 0.000000E+00 | 0.000000E+00 | 0.000000E+00 |
| 71 | 0.000000E+00 | 0.000000E+00 | 0.000000E+00 | 0.000000E+00 | 0.000000E+00 |
| 72 | 0.000000E+00 | 0.000000E+00 | 0.000000E+00 | 0.000000E+00 | 0.000000E+00 |
| 81 | 0.000000E+00 | 0.000000E+00 | 0.000000E+00 | 0.000000E+00 | 0.000000E+00 |
| 82 | 0.000000E+00 | 0.000000E+00 | 0.000000E+00 | 0.000000E+00 | 0.000000E+00 |

FIG. 33

| Eighth embodiment | | | | | | |
|---|---|---|---|---|---|---|
| Effective focal length=9.355 mm, Half field of view (HFOV)=17.449°, Fno=2.392, System length=9.000mm, Image height=2.944mm | | | | | | |
| Lens element | Surface | Radius of curvature(mm) | Thickness(mm) | Refractive index | Dispersion coefficient | Focal length(mm) |
| Object | | Infinity | 1.000E+10 | | | |
| Aperture stop2 | | Infinity | -0.600 | | | |
| First lens element 3 | Object-side surface31 | 2.877 | 1.679 | 1.545 | 55.987 | 6.555 |
| | Image-side surface32 | 11.628 | 0.049 | | | |
| Second lens element 4 | Object-side surface41 | 11.479 | 0.472 | 1.642 | 22.409 | -7.125 |
| | Image-side surface42 | 3.237 | 0.048 | | | |
| Third lens element 5 | Object-side surface51 | 2.665 | 0.871 | 1.545 | 55.987 | 11.534 |
| | Image-side surface52 | 4.084 | 1.145 | | | |
| Fourth lens element 6 | Object-side surface61 | 4.399 | 0.369 | 1.545 | 55.987 | -380.626 |
| | Image-side surface62 | 4.180 | 1.652 | | | |
| Fifth lens element 7 | Object-side surface71 | -6.110 | 0.695 | 1.642 | 22.409 | 9.324 |
| | Image-side surface72 | -3.172 | 0.149 | | | |
| Sixth lens element 8 | Object-side surface81 | -2.841 | 0.340 | 1.545 | 55.987 | -6.478 |
| | Image-side surface82 | -15.012 | 0.400 | | | |
| Filter 9 | Object-side surface91 | Infinity | 0.210 | 1.517 | 64.167 | |
| | Image-side surface92 | Infinity | 0.920 | | | |
| | Image plane100 | Infinity | | | | |

FIG. 36

| Surface | K | $a_4$ | $a_6$ | $a_8$ | $a_{10}$ |
|---|---|---|---|---|---|
| 31 | 0.000000E+00 | -8.977570E-04 | -2.223629E-04 | 4.734819E-05 | 0.000000E+00 |
| 32 | 0.000000E+00 | -2.240691E-02 | 1.278524E-02 | -1.698718E-03 | 0.000000E+00 |
| 41 | 0.000000E+00 | -1.320223E-02 | 1.027605E-02 | -1.744360E-03 | 0.000000E+00 |
| 42 | 0.000000E+00 | -2.511194E-02 | 2.041045E-02 | -3.420283E-03 | 0.000000E+00 |
| 51 | 0.000000E+00 | -5.670559E-02 | 2.729814E-02 | -3.867710E-03 | 0.000000E+00 |
| 52 | 0.000000E+00 | -3.349440E-02 | 6.862691E-03 | -1.198176E-03 | 0.000000E+00 |
| 61 | 0.000000E+00 | -7.168082E-02 | -1.033922E-02 | 1.659306E-03 | 0.000000E+00 |
| 62 | 0.000000E+00 | -5.547922E-02 | -6.202324E-03 | 3.273894E-03 | 0.000000E+00 |
| 71 | 0.000000E+00 | 2.017398E-03 | -5.405948E-03 | 5.613695E-04 | 0.000000E+00 |
| 72 | 0.000000E+00 | 1.980621E-02 | -8.291678E-03 | 8.635731E-04 | 0.000000E+00 |
| 81 | 0.000000E+00 | -6.158623E-04 | -3.775635E-04 | 1.417204E-04 | 2.488569E-05 |
| 82 | 0.000000E+00 | -2.776118E-02 | 4.996758E-03 | -5.642369E-04 | 2.040981E-05 |
| Surface | $a_{12}$ | $a_{14}$ | $a_{16}$ | $a_{18}$ | $a_{20}$ |
| 31 | 0.000000E+00 | 0.000000E+00 | 0.000000E+00 | 0.000000E+00 | 0.000000E+00 |
| 32 | 0.000000E+00 | 0.000000E+00 | 0.000000E+00 | 0.000000E+00 | 0.000000E+00 |
| 41 | 0.000000E+00 | 0.000000E+00 | 0.000000E+00 | 0.000000E+00 | 0.000000E+00 |
| 42 | 0.000000E+00 | 0.000000E+00 | 0.000000E+00 | 0.000000E+00 | 0.000000E+00 |
| 51 | 0.000000E+00 | 0.000000E+00 | 0.000000E+00 | 0.000000E+00 | 0.000000E+00 |
| 52 | 0.000000E+00 | 0.000000E+00 | 0.000000E+00 | 0.000000E+00 | 0.000000E+00 |
| 61 | 0.000000E+00 | 0.000000E+00 | 0.000000E+00 | 0.000000E+00 | 0.000000E+00 |
| 62 | 0.000000E+00 | 0.000000E+00 | 0.000000E+00 | 0.000000E+00 | 0.000000E+00 |
| 71 | 0.000000E+00 | 0.000000E+00 | 0.000000E+00 | 0.000000E+00 | 0.000000E+00 |
| 72 | 0.000000E+00 | 0.000000E+00 | 0.000000E+00 | 0.000000E+00 | 0.000000E+00 |
| 81 | 0.000000E+00 | 0.000000E+00 | 0.000000E+00 | 0.000000E+00 | 0.000000E+00 |
| 82 | 0.000000E+00 | 0.000000E+00 | 0.000000E+00 | 0.000000E+00 | 0.000000E+00 |

FIG. 37

| Ninth embodiment | | | | | | |
|---|---|---|---|---|---|---|
| Effective focal length=9.391 mm, Half field of view (HFOV)=17.323°, Fno=2.400, System length=9.000mm, Image height=2.944mm | | | | | | |
| Lens element | Surface | Radius of curvature(mm) | Thickness(mm) | Refractive index | Dispersion coefficient | Focal length(mm) |
| Object | | Infinity | 1.000E+10 | | | |
| First lens element 3 | Object-side surface31 | 4.475 | 1.188 | 1.545 | 55.987 | 4.834 |
| | Image-side surface32 | -5.838 | 0.080 | | | |
| Aperture stop2 | | Infinity | 0.377 | | | |
| Second lens element 4 | Object-side surface41 | -5.982 | 0.239 | 1.642 | 22.409 | -8.175 |
| | Image-side surface42 | 46.600 | 0.048 | | | |
| Third lens element 5 | Object-side surface51 | 3.972 | 0.884 | 1.545 | 55.987 | 39.930 |
| | Image-side surface52 | 4.475 | 1.154 | | | |
| Fourth lens element 6 | Object-side surface61 | 77.115 | 0.293 | 1.545 | 55.987 | -35.110 |
| | Image-side surface62 | 15.339 | 1.809 | | | |
| Fifth lens element 7 | Object-side surface71 | -130.666 | 0.477 | 1.545 | 55.987 | -7.087 |
| | Image-side surface72 | 3.995 | 0.196 | | | |
| Sixth lens element 8 | Object-side surface81 | 6.172 | 0.846 | 1.642 | 22.409 | 13.743 |
| | Image-side surface82 | 19.069 | 0.400 | | | |
| Filter 9 | Object-side surface91 | Infinity | 0.210 | 1.517 | 64.167 | |
| | Image-side surface92 | Infinity | 0.798 | | | |
| | Image plane100 | Infinity | | | | |

FIG. 40

| Surface | K | $a_4$ | $a_6$ | $a_8$ | $a_{10}$ |
|---|---|---|---|---|---|
| 31 | 0.000000E+00 | -2.425578E-03 | -9.743337E-04 | 1.907763E-04 | 0.000000E+00 |
| 32 | 0.000000E+00 | 3.055801E-03 | 7.911012E-04 | -3.322859E-05 | 0.000000E+00 |
| 41 | 0.000000E+00 | 2.041111E-02 | 1.409797E-03 | -9.313323E-04 | 0.000000E+00 |
| 42 | 0.000000E+00 | 9.347324E-03 | 7.667386E-03 | -1.847142E-03 | 0.000000E+00 |
| 51 | 0.000000E+00 | -1.850376E-02 | 8.698290E-03 | -8.198415E-04 | 0.000000E+00 |
| 52 | 0.000000E+00 | -3.546727E-02 | 1.154832E-03 | 3.978961E-04 | 0.000000E+00 |
| 61 | 0.000000E+00 | -9.794439E-03 | 1.243372E-02 | -4.984615E-03 | 0.000000E+00 |
| 62 | 0.000000E+00 | 1.886289E-02 | 2.011574E-02 | -4.487089E-03 | 0.000000E+00 |
| 71 | 0.000000E+00 | -2.439754E-02 | 4.610688E-03 | -2.198366E-04 | 0.000000E+00 |
| 72 | 0.000000E+00 | -3.545710E-02 | 2.362481E-03 | -1.334939E-04 | 0.000000E+00 |
| 81 | 0.000000E+00 | -2.424154E-02 | -6.533942E-04 | 3.281002E-04 | -2.129236E-05 |
| 82 | 0.000000E+00 | -2.589144E-02 | 2.052541E-03 | -1.200926E-04 | 5.162342E-06 |
| Surface | $a_{12}$ | $a_{14}$ | $a_{16}$ | $a_{18}$ | $a_{20}$ |
| 31 | 0.000000E+00 | 0.000000E+00 | 0.000000E+00 | 0.000000E+00 | 0.000000E+00 |
| 32 | 0.000000E+00 | 0.000000E+00 | 0.000000E+00 | 0.000000E+00 | 0.000000E+00 |
| 41 | 0.000000E+00 | 0.000000E+00 | 0.000000E+00 | 0.000000E+00 | 0.000000E+00 |
| 42 | 0.000000E+00 | 0.000000E+00 | 0.000000E+00 | 0.000000E+00 | 0.000000E+00 |
| 51 | 0.000000E+00 | 0.000000E+00 | 0.000000E+00 | 0.000000E+00 | 0.000000E+00 |
| 52 | 0.000000E+00 | 0.000000E+00 | 0.000000E+00 | 0.000000E+00 | 0.000000E+00 |
| 61 | 0.000000E+00 | 0.000000E+00 | 0.000000E+00 | 0.000000E+00 | 0.000000E+00 |
| 62 | 0.000000E+00 | 0.000000E+00 | 0.000000E+00 | 0.000000E+00 | 0.000000E+00 |
| 71 | 0.000000E+00 | 0.000000E+00 | 0.000000E+00 | 0.000000E+00 | 0.000000E+00 |
| 72 | 0.000000E+00 | 0.000000E+00 | 0.000000E+00 | 0.000000E+00 | 0.000000E+00 |
| 81 | 0.000000E+00 | 0.000000E+00 | 0.000000E+00 | 0.000000E+00 | 0.000000E+00 |
| 82 | 0.000000E+00 | 0.000000E+00 | 0.000000E+00 | 0.000000E+00 | 0.000000E+00 |

FIG. 41

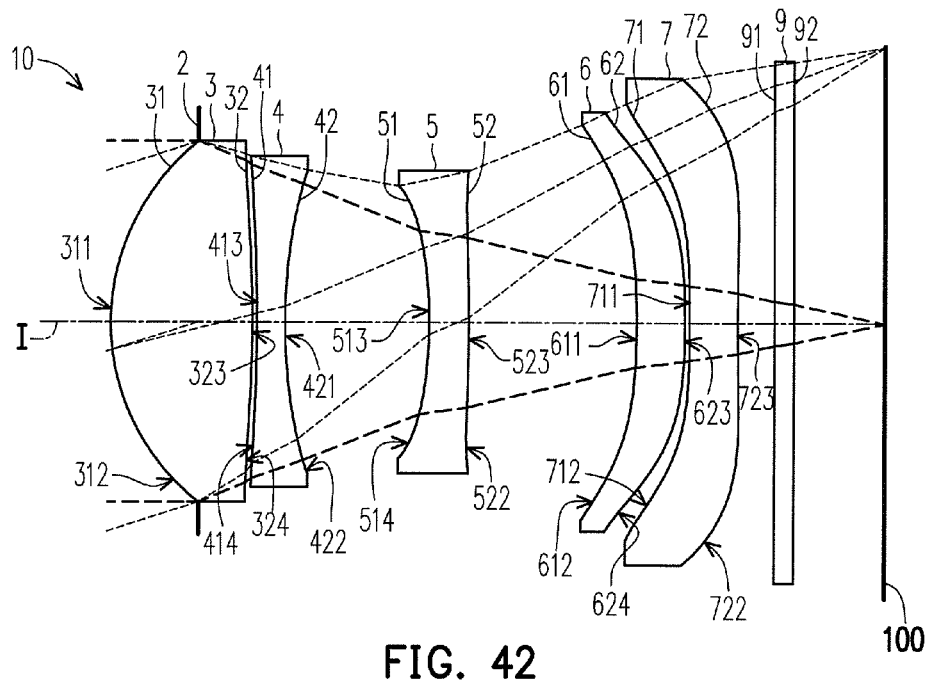
FIG. 42
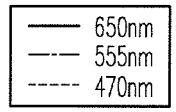
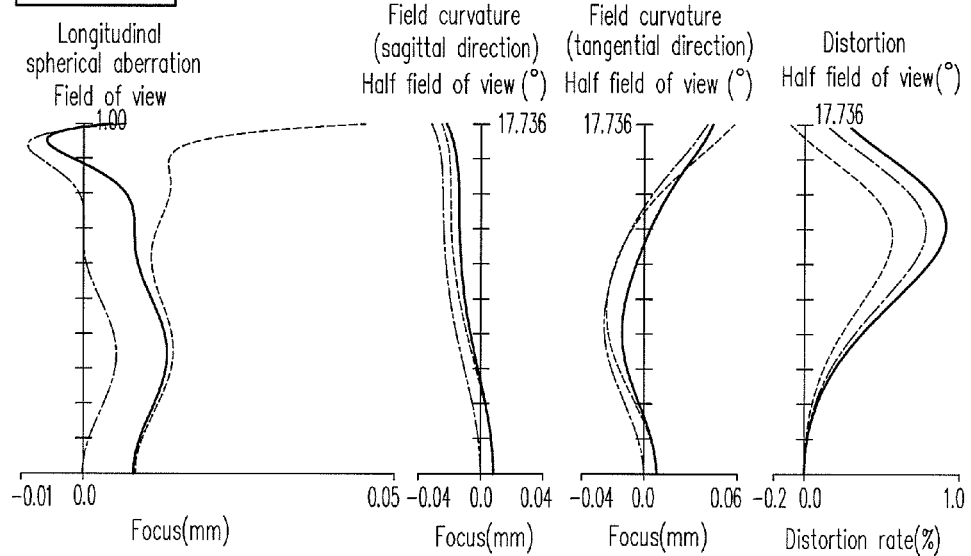
FIG. 43A    FIG. 43B  FIG. 43C    FIG. 43D

| Tenth embodiment ||||||
|---|---|---|---|---|---|
| | Effective focal length=9.192 mm, Half field of view (HFOV)=17.736°, Fno=2.397, System length=8.279mm, Image height=2.944mm |
| Lens element | Surface | Radius of curvature(mm) | Thickness(mm) | Refractive index | Dispersion coefficient | Focal length(mm) |
| Object | | Infinity | 1.000E+10 | | | |
| Aperture stop2 | | Infinity | -0.920 | | | |
| First lens element 3 | Object-side surface31 | 2.410 | 1.516 | 1.545 | 55.987 | 3.831 |
| | Image-side surface32 | -12.363 | 0.050 | | | |
| Second lens element 4 | Object-side surface41 | -17.089 | 0.299 | 1.642 | 22.409 | -6.827 |
| | Image-side surface42 | 6.001 | 1.537 | | | |
| Third lens element 5 | Object-side surface51 | -5.630 | 0.426 | 1.545 | 55.987 | -14.933 |
| | Image-side surface52 | -18.654 | 1.792 | | | |
| Fourth lens element 6 | Object-side surface61 | -9.380 | 0.511 | 1.642 | 22.409 | -263.166 |
| | Image-side surface62 | -10.139 | 0.050 | | | |
| Fifth lens element 7 | Object-side surface71 | -31.507 | 0.513 | 1.535 | 55.690 | -21.517 |
| | Image-side surface72 | 18.328 | 0.400 | | | |
| Filter 9 | Object-side surface91 | Infinity | 0.210 | 1.517 | 64.167 | |
| | Image-side surface92 | Infinity | 0.975 | | | |
| | Image plane100 | Infinity | | | | |

FIG. 44

| Surface | K | $a_4$ | $a_6$ | $a_8$ | $a_{10}$ |
|---|---|---|---|---|---|
| 31 | 0.000000E+00 | -1.601771E-03 | 3.544314E-04 | -1.251469E-04 | 1.586021E-05 |
| 32 | 0.000000E+00 | 5.408793E-03 | 3.342632E-04 | -1.207318E-04 | -3.172188E-06 |
| 41 | 0.000000E+00 | 1.698417E-03 | 8.649923E-04 | -1.814950E-04 | -1.772442E-06 |
| 42 | 0.000000E+00 | -7.595879E-04 | 1.833786E-03 | -5.081589E-04 | 1.098471E-04 |
| 51 | 1.199330E+01 | -6.371748E-03 | -2.669399E-03 | 2.030178E-03 | -9.033426E-04 |
| 52 | 4.608773E+01 | 1.724771E-03 | 4.827782E-03 | -6.048125E-04 | 2.127075E-06 |
| 61 | -2.866850E+00 | -2.629887E-02 | 1.905416E-04 | 4.942525E-04 | -2.785894E-05 |
| 62 | 7.225170E+00 | -4.484432E-02 | 2.749469E-03 | 2.195121E-04 | 2.075385E-05 |
| 71 | 1.273538E+02 | -3.585085E-02 | 1.245465E-03 | 3.239069E-04 | 6.382158E-06 |
| 72 | 4.202089E+01 | -1.542062E-02 | -2.058883E-05 | -2.360618E-04 | 3.954455E-05 |
| Surface | $a_{12}$ | $a_{14}$ | $a_{16}$ | $a_{18}$ | $a_{20}$ |
| 31 | 0.000000E+00 | 0.000000E+00 | 0.000000E+00 | 0.000000E+00 | 0.000000E+00 |
| 32 | 0.000000E+00 | 0.000000E+00 | 0.000000E+00 | 0.000000E+00 | 0.000000E+00 |
| 41 | 0.000000E+00 | 0.000000E+00 | 0.000000E+00 | 0.000000E+00 | 0.000000E+00 |
| 42 | 0.000000E+00 | 0.000000E+00 | 0.000000E+00 | 0.000000E+00 | 0.000000E+00 |
| 51 | 0.000000E+00 | 0.000000E+00 | 0.000000E+00 | 0.000000E+00 | 0.000000E+00 |
| 52 | 0.000000E+00 | 0.000000E+00 | 0.000000E+00 | 0.000000E+00 | 0.000000E+00 |
| 61 | 0.000000E+00 | 0.000000E+00 | 0.000000E+00 | 0.000000E+00 | 0.000000E+00 |
| 62 | 0.000000E+00 | 0.000000E+00 | 0.000000E+00 | 0.000000E+00 | 0.000000E+00 |
| 71 | -8.746095E-07 | 0.000000E+00 | 0.000000E+00 | 0.000000E+00 | 0.000000E+00 |
| 72 | -2.348544E-06 | 0.000000E+00 | 0.000000E+00 | 0.000000E+00 | 0.000000E+00 |

FIG. 45

| Eleventh embodiment ||||||
|---|---|---|---|---|---|
| Effective focal length=3.515 mm, Half field of view (HFOV)=18.771°, Fno=2.343, System length=3.253mm, Image height=1.224mm ||||||
| Lens element | Surface | Radius of curvature(mm) | Thickness(mm) | Refractive index | Dispersion coefficient | Focal length(mm) |
| Object | | Infinity | 5.100E+09 | | | |
| Aperture stop2 | | Infinity | -0.077 | | | |
| First lens element 3 | Object-side surface31 | 0.974 | 0.495 | 1.545 | 55.987 | 1.644 |
| | Image-side surface32 | -9.447 | 0.029 | | | |
| Second lens element 4 | Object-side surface41 | -10.333 | 0.117 | 1.642 | 22.409 | -3.078 |
| | Image-side surface42 | 2.480 | 0.652 | | | |
| Third lens element 5 | Object-side surface51 | 1.196 | 0.177 | 1.535 | 55.690 | -5.797 |
| | Image-side surface52 | 0.819 | 0.927 | | | |
| Fourth lens element 6 | Object-side surface61 | 8.766 | 0.332 | 1.642 | 22.409 | -8.714 |
| | Image-side surface62 | 3.381 | 0.204 | | | |
| Filter 9 | Object-side surface91 | Infinity | 0.107 | 1.517 | 64.167 | |
| | Image-side surface92 | Infinity | 0.214 | | | |
| | Image plane100 | Infinity | | | | |

FIG. 48

| Surface | K | $a_4$ | $a_6$ | $a_8$ | $a_{10}$ |
|---|---|---|---|---|---|
| 31 | 0.000000E+00 | -1.053695E-01 | 1.585177E-02 | -2.343171E-01 | -3.252902E-02 |
| 32 | 0.000000E+00 | 2.552388E-02 | 1.852790E-01 | -5.676530E-01 | 5.234000E-01 |
| 41 | 0.000000E+00 | 1.172668E-01 | 1.815558E-01 | -7.222577E-01 | 7.976741E-01 |
| 42 | 0.000000E+00 | -2.950327E-02 | 1.383158E-01 | -9.940486E-01 | 1.040695E+00 |
| 51 | 0.000000E+00 | -8.241384E-01 | -1.640595E+00 | -3.550405E+00 | 1.364758E+01 |
| 52 | 0.000000E+00 | -8.513063E-01 | -1.820781E+00 | 2.623644E+00 | 3.676223E+00 |
| 61 | 0.000000E+00 | -3.194461E-01 | 5.242190E-01 | -4.714179E-01 | 2.483986E-01 |
| 62 | 0.000000E+00 | -4.481116E-01 | 5.334649E-01 | -4.744890E-01 | 2.488807E-01 |
| Surface | $a_{12}$ | $a_{14}$ | $a_{16}$ | $a_{18}$ | $a_{20}$ |
| 31 | 0.000000E+00 | 0.000000E+00 | 0.000000E+00 | 0.000000E+00 | 0.000000E+00 |
| 32 | 0.000000E+00 | 0.000000E+00 | 0.000000E+00 | 0.000000E+00 | 0.000000E+00 |
| 41 | 0.000000E+00 | 0.000000E+00 | 0.000000E+00 | 0.000000E+00 | 0.000000E+00 |
| 42 | 0.000000E+00 | 0.000000E+00 | 0.000000E+00 | 0.000000E+00 | 0.000000E+00 |
| 51 | -9.384624E+00 | 0.000000E+00 | 0.000000E+00 | 0.000000E+00 | 0.000000E+00 |
| 52 | -6.748323E+00 | 0.000000E+00 | 0.000000E+00 | 0.000000E+00 | 0.000000E+00 |
| 61 | -5.423044E-02 | 0.000000E+00 | 0.000000E+00 | 0.000000E+00 | 0.000000E+00 |
| 62 | -5.329802E-02 | 0.000000E+00 | 0.000000E+00 | 0.000000E+00 | 0.000000E+00 |

FIG. 49

| Conditional expression | First embodiment | Second embodiment | Third embodiment | Fourth embodiment | Fifth embodiment |
|---|---|---|---|---|---|
| EFL | 8.784 | 5.993 | 7.669 | 7.660 | 6.133 |
| HFOV | 17.993 | 23.580 | 20.860 | 20.899 | 25.002 |
| Fno | 2.023 | 2.365 | 2.395 | 2.393 | 2.042 |
| T1 | 1.199 | 0.585 | 0.760 | 0.767 | 0.848 |
| G1 | 0.049 | 0.217 | 0.049 | 0.049 | 0.050 |
| T2 | 0.221 | 0.295 | 0.465 | 0.525 | 0.215 |
| G2 | 0.048 | 0.103 | 0.048 | 0.048 | 0.238 |
| T3 | 1.019 | 0.516 | 0.616 | 0.625 | 0.637 |
| G3 | 1.240 | 0.398 | 1.243 | 1.146 | 0.562 |
| T4 | 0.287 | 0.296 | 0.297 | 0.298 | 0.266 |
| G4 | 1.652 | 0.912 | 1.652 | 1.652 | 0.852 |
| T5 | 0.629 | 0.300 | 0.580 | 0.574 | 0.328 |
| G5 | 0.149 | 0.135 | 0.149 | 0.149 | 0.290 |
| T6 | 0.560 | 0.651 | 0.605 | 0.630 | 0.816 |
| G6 | 0.400 | 0.400 | 0.400 | 0.400 | 0.403 |
| TF | 0.210 | 0.210 | 0.210 | 0.210 | 0.210 |
| GFP | 0.292 | 0.240 | 0.292 | 0.292 | 0.237 |
| TTL | 7.956 | 5.258 | 7.365 | 7.365 | 5.952 |
| BFL | 0.902 | 0.850 | 0.902 | 0.902 | 0.850 |
| Gaa | 3.138 | 1.765 | 3.141 | 3.044 | 1.991 |
| ALT | 3.915 | 2.643 | 3.322 | 3.419 | 3.111 |
| TL | 7.054 | 4.408 | 6.463 | 6.463 | 5.102 |
| △G | 0.010 | 0.023 | 0.007 | 0.104 | 0.036 |
| Gv | 1.250 | 0.240 | 1.250 | 1.250 | 0.888 |
| EFL_GvA1 | 6.174 | 4.221 | 6.455 | 6.496 | 6.124 |
| EFL_GvA2 | -4.765 | -6.610 | -7.459 | -7.700 | -267.045 |
| △G/Gv | 0.008 | 0.096 | 0.006 | 0.083 | 0.041 |
| EFL/TTL | 1.104 | 1.140 | 1.041 | 1.040 | 1.030 |
| (ALT*HFOV)/EFL | 8.020 | 10.400 | 9.036 | 9.328 | 12.680 |
| EFL/Fno | 4.343 | 2.534 | 3.202 | 3.201 | 3.004 |
| (TTL*Fno)/(EFL+AAG) | 1.267 | 1.440 | 1.605 | 1.591 | 1.315 |
| (TTL*Fno)/(EFL+TL) | 1.016 | 1.196 | 1.248 | 1.248 | 1.082 |
| (TTL*Fno)/EFL | 1.832 | 2.075 | 2.300 | 2.301 | 1.981 |
| AAG/10△G | 31.383 | 7.672 | 44.868 | 2.927 | 5.531 |
| (EFL+AAG)/(10△G*Fno) | 58.945 | 14.262 | 64.469 | 4.301 | 11.053 |
| EFL/BFL | 9.736 | 7.049 | 8.500 | 8.490 | 7.215 |
| (EFL+TTL)/(ALT*Fno) | 2.114 | 1.800 | 1.889 | 1.837 | 1.903 |

FIG. 50

| Conditional expression | Sixth embodiment | Seventh embodiment | Eighth embodiment | Ninth embodiment | Tenth embodiment | Eleventh embodiment |
|---|---|---|---|---|---|---|
| EFL | 7.011 | 7.314 | 9.355 | 9.391 | 9.192 | 3.515 |
| HFOV | 25.001 | 21.901 | 17.449 | 17.323 | 17.736 | 18.771 |
| Fno | 1.911 | 1.660 | 2.392 | 2.400 | 2.397 | 2.343 |
| T1 | 1.075 | 0.957 | 1.679 | 1.188 | 1.516 | 0.495 |
| G1 | 0.050 | 0.049 | 0.049 | 0.457 | 0.050 | 0.029 |
| T2 | 0.233 | 0.164 | 0.472 | 0.239 | 0.299 | 0.117 |
| G2 | 0.238 | 0.048 | 0.048 | 0.048 | 1.537 | 0.652 |
| T3 | 0.559 | 0.997 | 0.871 | 0.884 | 0.426 | 0.177 |
| G3 | 0.562 | 1.362 | 1.145 | 1.154 | 1.792 | 0.927 |
| T4 | 0.273 | 0.249 | 0.369 | 0.293 | 0.511 | 0.332 |
| G4 | 1.241 | 1.652 | 1.652 | 1.809 | 0.050 | 0.204 |
| T5 | 0.391 | 0.454 | 0.695 | 0.477 | 0.513 | |
| G5 | 0.290 | 0.149 | 0.149 | 0.196 | 0.400 | |
| T6 | 1.704 | 0.325 | 0.340 | 0.846 | | |
| G6 | 0.403 | 0.400 | 0.400 | 0.400 | | |
| TF | 0.210 | 0.210 | 0.210 | 0.210 | 0.210 | 0.107 |
| GFP | 0.237 | 0.292 | 0.920 | 0.798 | 0.975 | 0.214 |
| TTL | 7.465 | 7.310 | 9.000 | 9.000 | 8.279 | 3.253 |
| BFL | 0.850 | 0.902 | 1.530 | 1.408 | 1.185 | 0.321 |
| Gaa | 2.381 | 3.261 | 3.043 | 3.665 | 3.829 | 1.812 |
| ALT | 4.234 | 3.147 | 4.427 | 3.927 | 3.266 | 1.120 |
| TL | 6.615 | 6.407 | 7.470 | 7.592 | 7.094 | 2.932 |
| △G | 0.068 | 0.112 | 0.105 | 0.009 | 0.033 | 0.020 |
| Gv | 1.309 | 1.250 | 1.250 | 0.466 | 1.825 | 0.673 |
| EFL_GvA1 | 7.242 | 7.013 | 8.485 | 4.834 | 8.309 | 2.786 |
| EFL_GvA2 | -22.295 | -9.831 | -18.627 | -4.208 | -19.487 | -3.264 |
| △G/Gv | 0.052 | 0.090 | 0.084 | 0.019 | 0.018 | 0.030 |
| EFL/TTL | 0.939 | 1.001 | 1.039 | 1.043 | 1.110 | 1.081 |
| (ALT*HFOV)/EFL | 15.100 | 9.422 | 8.257 | 7.243 | 6.301 | 5.982 |
| EFL/Fno | 3.669 | 4.407 | 3.911 | 3.913 | 3.835 | 1.500 |
| (TTL*Fno)/(EFL+AAG) | 1.268 | 1.160 | 1.562 | 1.622 | 1.593 | 1.645 |
| (TTL*Fno)/(EFL+TL) | 1.047 | 0.884 | 1.280 | 1.272 | 1.219 | 1.182 |
| (TTL*Fno)/EFL | 2.034 | 1.659 | 2.301 | 2.300 | 2.159 | 2.169 |
| AAG/10△G | 3.501 | 2.911 | 2.898 | 40.722 | 11.602 | 9.059 |
| (EFL+AAG)/(10△G*Fno) | 7.228 | 5.689 | 4.936 | 60.446 | 16.460 | 11.366 |
| EFL/BFL | 8.247 | 8.107 | 6.114 | 6.669 | 7.757 | 10.945 |
| (EFL+TTL)/(ALT*Fno) | 1.789 | 2.800 | 1.733 | 1.951 | 2.232 | 2.578 |

FIG. 51

OPTICAL IMAGING LENS

CROSS-REFERENCE TO RELATED APPLICATION

This application claims the priority benefit of China application serial no. 201610387644.X, filed on Jun. 2, 2013. The entirety of the above-mentioned patent application is hereby incorporated by reference herein and made a part of this specification.

FIELD OF THE INVENTION

The invention relates to an optical lens; more particularly, the invention relates to an optical imaging lens.

DESCRIPTION OF RELATED ART

The specification of consumer electronics (e.g., mobile phones, cameras, tablet PCs, personal digital assistants, and automotive cameras) is ever-changing, and the consumer electronics are evolving so fast that the demand for lighter, thinner, and smaller products never stops growing. Therefore, the specification of key components, such as optical lenses, of the electronic products needs to be improved constantly so as to meet the consumers' demand. Needless to say, the most important characteristics of an optical lens are the imaging quality and size. As to the imaging quality, consumers become more and more demanding in response to the progress in the image sensing technology; hence, in the field of optical lens design, the lens should be miniaturized optical without sacrificing the imaging quality and the performance of the lens. To comply with the requirements for taking pictures of objects near or far, the existing optical lenses are often equipped with a voice coil motor (VCM) for adjusting a location of an image plane, so as to achieve auto focus.

Simply scaling down a lens with good imaging quality is not enough for designing a miniaturized optical lens that has favorable imaging quality. The design involves not only material properties but also production-related issues such as assembly yield. The use of the VCM for adjusting the location of the image plane to achieve auto focus leads to an increase in the length of the lens during the operation of the VCM. Hence, how to produce an optical lens that complies with the requirements for consumer electronics, the functions of auto focus, the miniaturized volume and features the improved imaging quality has always been a concern of industry, government, and academia.

SUMMARY OF THE INVENTION

The invention provides an optical imaging lens that can take quality pictures of a distant or close object, given that the system length of the lens is reduced.

In an embodiment of the invention, an optical imaging lens that includes a plurality of lens elements arranged in order from an object side to an image side along an optical axis is provided. Each of the lens elements includes an object-side surface and an image-side surface, the object-side surface faces the object side and allows an imaging ray to pass through, and the image-side surface faces the image side and allows the imaging ray to pass through. There is at least one variable gap between the lens elements, and one of the lens elements closest to the object side has positive refracting power. The optical imaging lens satisfies $\Delta G/Gv \leq 0.1$. Here, $\Delta G$ is an absolute value of a difference between a first value and a second value of a length of the at least one variable gap along the optical axis when an object having an infinite object distance and an object having an object distance of 500 millimeters are focused respectively, and Gv is the second value.

In view of the above, the optical imaging lens provided in an embodiment of the invention has certain advantages. For instance, the length of the lens extended during auto focus can be reduced because of the feature of refracting power of the lens elements, the possibility of adjusting the length of air gaps between the lens elements, and the compliance with said conditions; in this case, the imaging quality is not compromised, and the clarity of the image of the distant or close object can still be guaranteed. Moreover, it is not difficult to design and further process the optical imaging lens provided herein.

In order to make the aforementioned and other features and advantages of the invention more comprehensible, embodiments accompanying figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 3 is a schematic view illustrating a surface structure of a lens element according to a first example.

FIG. 4 is a schematic view illustrating a surface structure of a lens element according to a second example.

FIG. 5 is a schematic view illustrating a surface structure of a lens element according to a third example.

FIG. 8 shows detailed optical data pertaining to the optical imaging lens according to the first embodiment of the invention.

FIG. 9 shows aspheric parameters pertaining to the optical imaging lens according to the first embodiment of the invention.

FIG. 12 shows detailed optical data pertaining to the optical imaging lens according to the second embodiment of the invention.

FIG. 13 shows aspheric parameters pertaining to the optical imaging lens according to the second embodiment of the invention.

FIG. 16 shows detailed optical data pertaining to the optical imaging lens according to the third embodiment of the invention.

FIG. 17 shows aspheric parameters pertaining to the optical imaging lens according to the third embodiment of the invention.

FIG. 18 is a schematic view illustrating an optical imaging lens according to a fourth embodiment of the invention.

FIG. 19A to FIG. 19D illustrate a longitudinal spherical aberration and other aberrations of the optical imaging lens according to the fourth embodiment of the invention.

FIG. 20 shows detailed optical data pertaining to the optical imaging lens according to the fourth embodiment of the invention.

FIG. 21 shows aspheric parameters pertaining to the optical imaging lens according to the fourth embodiment of the invention.

FIG. 24 shows detailed optical data pertaining to the optical imaging lens according to the fifth embodiment of the invention.

FIG. 25 shows aspheric parameters pertaining to the optical imaging lens according to the fifth embodiment of the invention.

FIG. 28 shows detailed optical data pertaining to the optical imaging lens according to the sixth embodiment of the invention.

FIG. 29 shows aspheric parameters pertaining to the optical imaging lens according to the sixth embodiment of the invention.

FIG. 30 is a schematic view illustrating an optical imaging lens according to a seventh embodiment of the invention.

FIG. 31A to FIG. 31D illustrate a longitudinal spherical aberration and other aberrations of the optical imaging lens according to the seventh embodiment of the invention.

FIG. 32 shows detailed optical data pertaining to the optical imaging lens according to the seventh embodiment of the invention.

FIG. 33 shows aspheric parameters pertaining to the optical imaging lens according to the seventh embodiment of the invention.

FIG. 36 shows detailed optical data pertaining to the optical imaging lens according to the eighth embodiment of the invention.

FIG. 37 shows aspheric parameters pertaining to the optical imaging lens according to the eighth embodiment of the invention.

FIG. 40 shows detailed optical data pertaining to the optical imaging lens according to the ninth embodiment of the invention.

FIG. 41 shows aspheric parameters pertaining to the optical imaging lens according to the ninth embodiment of the invention.

FIG. 42 is a schematic view illustrating an optical imaging lens according to a tenth embodiment of the invention.

FIG. 43A to FIG. 43D illustrate a longitudinal spherical aberration and other aberrations of the optical imaging lens according to the tenth embodiment of the invention.

FIG. 44 shows detailed optical data pertaining to the optical imaging lens according to the tenth embodiment of the invention.

FIG. 45 shows aspheric parameters pertaining to the optical imaging lens according to the tenth embodiment of the invention.

FIG. 48 shows detailed optical data pertaining to the optical imaging lens according to the eleventh embodiment of the invention.

FIG. 49 shows aspheric parameters pertaining to the optical imaging lens according to the eleventh embodiment of the invention.

FIG. 50 shows important parameters and relation values thereof pertaining to the optical imaging lens according to the first through the fifth embodiments of the invention.

FIG. 51 shows important parameters and relation values thereof pertaining to the optical imaging lens according to the sixth through the eleventh embodiments of the invention.

DETAILED DESCRIPTION OF DISCLOSED EMBODIMENTS

In the present specification, the description "a lens element having positive refracting power (or negative refracting power)" means that the paraxial refracting power of the lens element in Gaussian optics is positive (or negative). The description "An object-side (or image-side) surface of a lens element" only includes a specific region of that surface of the lens element where imaging rays are capable of passing through that region, namely the clear aperture of the surface. The aforementioned imaging rays can be classified into two types, chief ray Lc and marginal ray Lm. Taking a lens element depicted in FIG. 1 as an example, the lens element is rotationally symmetric, where the optical axis I is the axis of symmetry. The region A of the lens element is defined as "a portion in a vicinity of the optical axis", and the region C of the lens element is defined as "a portion in a vicinity of a periphery of the lens element". Besides, the lens element may also have an extending portion E extended radially and outwardly from the region C, namely the portion outside of the clear aperture of the lens element. The extending portion E is usually used for physically assembling the lens element into an optical imaging lens system. Under normal circumstances, the imaging rays would not pass through the extending portion E because those imaging rays only pass through the clear aperture. The structures and shapes of the aforementioned extending portion E are only examples for technical explanation, the structures and shapes of lens elements should not be limited to these examples. Note that the extending portions of the lens element surfaces depicted in the following embodiments are partially omitted.

The following criteria are provided for determining the shapes and the portions of lens element surfaces set forth in the present specification. These criteria mainly determine the boundaries of portions under various circumstances including the portion in a vicinity of the optical axis, the portion in a vicinity of a periphery of a lens element surface, and other types of lens element surfaces such as those having multiple portions.

Figure 1:
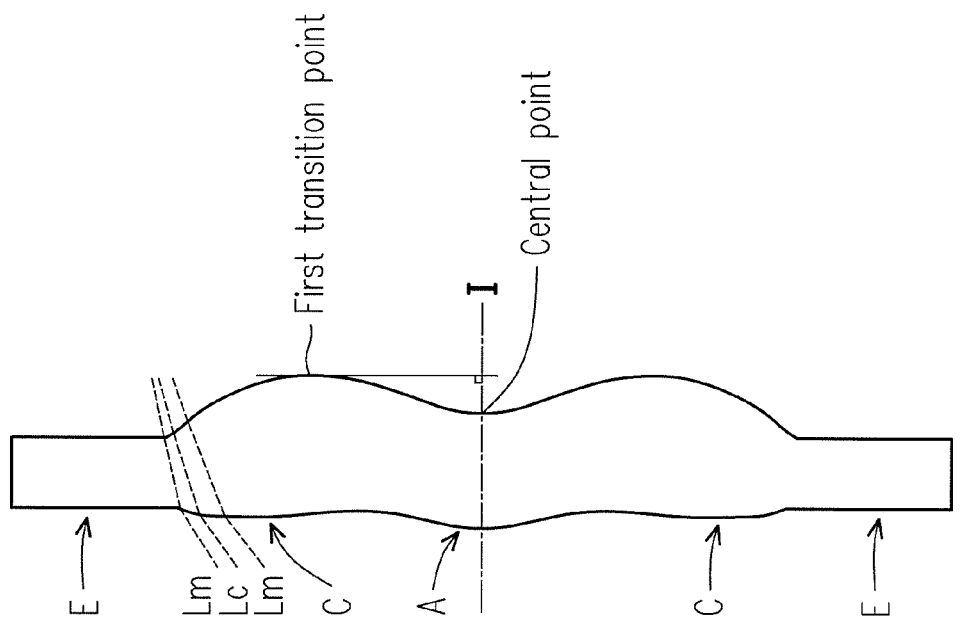
FIG. 1 is a schematic view illustrating a surface structure of a lens element.

1. FIG. 1 is a radial cross-sectional view of a lens element. Before determining boundaries of those aforesaid portions, two referential points should be defined first, central point and transition point. The central point of a surface of a lens element is a point of intersection of that surface and the optical axis. The transition point is a point on a surface of a lens element, where the tangent line of that point is perpendicular to the optical axis. Additionally, if multiple transition points appear on one single surface, then these transition points are sequentially named along the radial direction of the surface with numbers starting from the first transition point. For instance, the first transition point (closest one to the optical axis), the second transition point, and the Nth transition point (farthest one to the optical axis within the scope of the clear aperture of the surface). The portion of a surface of the lens element between the central point and the first transition point is defined as the portion in a vicinity of the optical axis. The portion located radially outside of the Nth transition point (but still within the scope of the clear aperture) is defined as the portion in a vicinity of a periphery of the lens element. In some embodiments, there are other portions existing between the portion in a vicinity of the optical axis and the portion in a vicinity of a periphery of the lens element; the numbers of portions depend on the numbers of the transition point(s). In addition, the radius of the clear aperture (or a so-called effective radius) of a surface is defined as the radial distance from the optical axis I to a point of intersection of the marginal ray Lm and the surface of the lens element.

Figure 2:
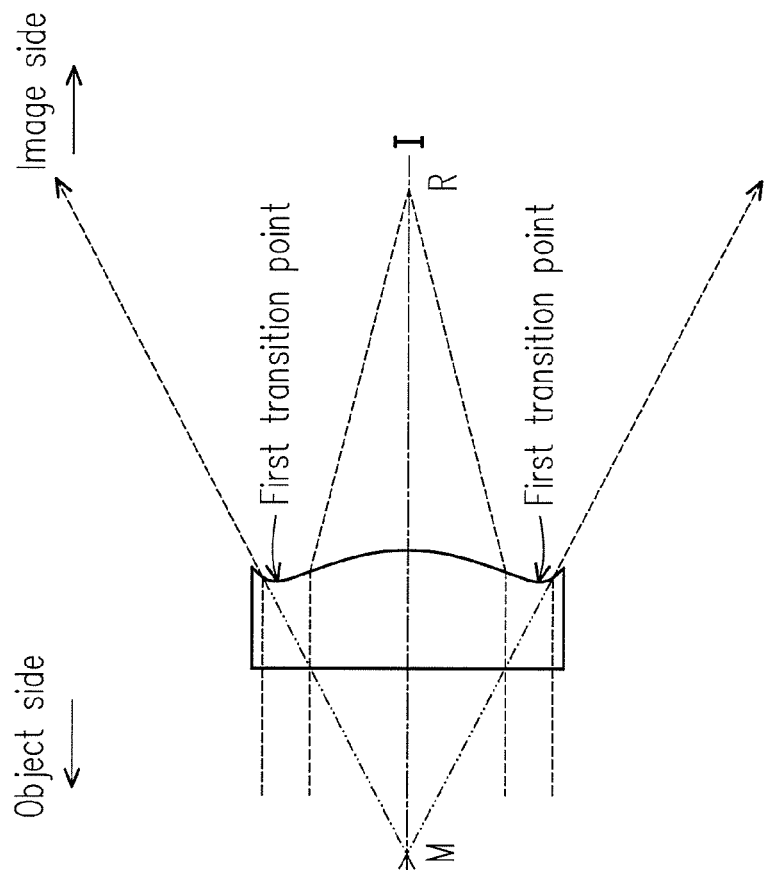
FIG. 2 is a schematic view illustrating a concave and convex surface structure of a lens element and a ray focal point.

2. Referring to FIG. 2, determining the shape of a portion is convex or concave depends on whether a collimated ray passing through that portion converges or diverges. That is, while applying a collimated ray to a portion to be determined in terms of shape, the collimated ray passing through that portion will be bended and the ray itself or its extension line will eventually meet the optical axis. The shape of that portion can be determined by whether the ray or its extension line meets (intersects) the optical axis (focal point) at the object-side or image-side. For instance, if the ray itself intersects the optical axis at the image side of the lens element after passing through a portion, i.e. the focal point of this ray is at the image side (see point R in FIG. 2), the portion will be determined as having a convex shape. On the contrary, if the ray diverges after passing through a portion, the extension line of the ray intersects the optical axis at the object side of the lens element, i.e. the focal point of the ray is at the object side (see point M in FIG. 2), that portion will be determined as having a concave shape. Therefore, referring to FIG. 2, the portion between the central point and the first transition point has a convex shape, the portion located radially outside of the first transition point has a concave shape, and the first transition point is the point where the portion having a convex shape changes to the portion having a concave shape, namely the border of two adjacent portions. Alternatively, there is another common way for a person with ordinary skill in the art to tell whether a portion in a vicinity of the optical axis has a convex or concave shape by referring to the sign of an "R" value, which is the (paraxial) radius of curvature of a lens surface. The R value which is commonly used in conventional optical design software such as Zemax and CodeV. The R value usually appears in the lens data sheet in the software. For an object-side surface, positive R means that the object-side surface is convex, and negative R means that the object-side surface is concave. Conversely, for an image-side surface, positive R means that the image-side surface is concave, and negative R means that the image-side surface is convex. The result found by using this method should be consistent as by using the other way mentioned above, which determines surface shapes by referring to whether the focal point of a collimated ray is at the object side or the image side.

3. For none transition point cases, the portion in a vicinity of the optical axis is defined as the portion between 0~50% of the effective radius (radius of the clear aperture) of the surface, whereas the portion in a vicinity of a periphery of the lens element is defined as the portion between 50~100% of effective radius (radius of the clear aperture) of the surface.

Referring to the first example depicted in FIG. 3, only one transition point, namely a first transition point, appears within the clear aperture of the image-side surface of the lens element. Portion I is a portion in a vicinity of the optical axis, and portion II is a portion in a vicinity of a periphery of the lens element. The portion in a vicinity of the optical axis is determined as having a concave surface due to the R value at the image-side surface of the lens element is positive. The shape of the portion in a vicinity of a periphery of the lens element is different from that of the radially inner adjacent portion, i.e. the shape of the portion in a vicinity of a periphery of the lens element is different from the shape of the portion in a vicinity of the optical axis; the portion in a vicinity of a periphery of the lens element has a convex shape.

Referring to the second example depicted in FIG. 4, a first transition point and a second transition point exist on the object-side surface (within the clear aperture) of a lens element. In which portion I is the portion in a vicinity of the optical axis, and portion III is the portion in a vicinity of a periphery of the lens element. The portion in a vicinity of the optical axis has a convex shape because the R value at the object-side surface of the lens element is positive. The portion in a vicinity of a periphery of the lens element (portion III) has a convex shape. What is more, there is another portion having a concave shape existing between the first and second transition point (portion II).

Referring to a third example depicted in FIG. 5, no transition point exists on the object-side surface of the lens element. In this case, the portion between 0~50% of the effective radius (radius of the clear aperture) is determined as the portion in a vicinity of the optical axis, and the portion between 50~100% of the effective radius is determined as the portion in a vicinity of a periphery of the lens element. The portion in a vicinity of the optical axis of the object-side surface of the lens element is determined as having a convex shape due to its positive R value, and the portion in a vicinity of a periphery of the lens element is determined as having a convex shape as well.

Figure 6:
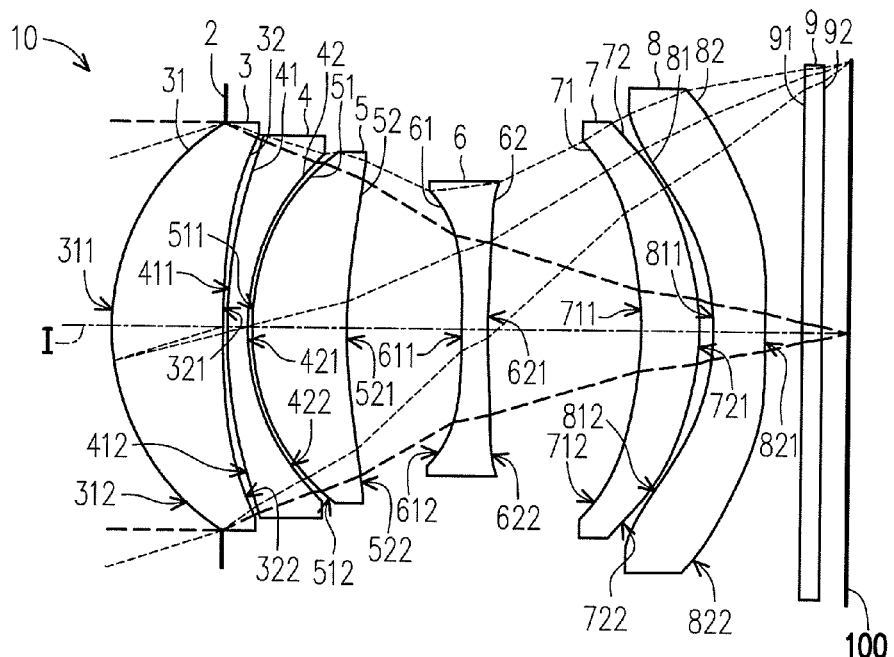
FIG. 6 is a schematic view illustrating an optical imaging lens according to a first embodiment of the invention.

FIG. 6 is a schematic view illustrating an optical imaging lens according to a first embodiment of the invention, and FIG. 7A to FIG. 7D illustrate a longitudinal spherical aberration and other aberrations of the optical imaging lens according to the first embodiment of the invention. With reference to FIG. 6, the optical imaging lens 10 provided in the first embodiment includes a plurality of lens elements arranged in order from an object side to an image side along an optical axis I of the optical imaging lens 10, and the optical imaging lens 10 includes an aperture stop. Specifically, the optical imaging lens 10 includes an aperture stop 2, a first lens element 3, a second lens element 4, a third lens element 5, a fourth lens element 6, a fifth lens element 7, a sixth lens element 8, and a filter 9 arranged in order from the object side to the image side along the optical axis I. When a ray emitted from an object to be shot enters the optical imaging lens 10 and passes through the aperture stop 2, the first lens element 3, the second lens element 4, the third lens element 5, the fourth lens element 6, the fifth lens element 7, the sixth lens element 8, and the filter 9, an image is formed on an image plane 100. The filter 9 is, for instance, an infrared cut filter (IR cut filter) configured to prevent the infrared ray of the ray from being transmitted to the image plane 100 and deteriorating the imaging quality. It should be added that the object side is a side facing the object to be shot, and the image side is a side facing the image plane 100.

In the present embodiment, each of the lens elements of the optical imaging lens 10 includes an object-side surface and an image-side surface, the object-side surface faces the object side and allows an imaging ray to pass through, and the image-side surface faces the image side and allows the imaging ray to pass through. Particularly, the first lens element 3, the second lens element 4, the third lens element 5, the fourth lens element 6, the fifth lens element 7, the sixth lens element 8, and the cover glass 9 respectively have object-side surfaces 31, 41, 51, 61, 71, 81, and 91 facing the object side and allowing imaging rays to pass through, and respectively have image-side surfaces 32, 42, 52, 62, 72, 82, and 92 facing the image side and allowing the imaging rays to pass through. Among the lens elements, the first lens element 3 is closest to the object side, and the last lens element (i.e., the sixth lens element 8) is closest to the image side. The aperture stop 2 is arranged on the object-side surface of the lens elements closest to the object side, i.e., the aperture stop 2 is arranged on the object-side surface 31 of the first lens element 3.

Besides, in order to meet the demand for lighter products, the first lens element 3 through the sixth lens element 8 all have refracting power and are made of a plastic material; nevertheless, the material of the first lens element 3 through the sixth lens element 8 is not limited thereto.

The first lens element 3 has positive refracting power. The object-side surface 31 of the first lens element 3 is a convex surface and has a convex portion 311 in a vicinity of the optical axis I and a convex portion 312 in a vicinity of a periphery of the first lens element 3. The image-side surface 32 of the first lens element 3 is a concave surface and has a concave portion 321 in a vicinity of the optical axis I and a concave portion 322 in a vicinity of the periphery of the first lens element 3. In the present embodiment, the object-side surface 31 and the image-side surface 32 of the first lens element 3 are both aspheric surfaces.

The second lens element 4 has negative refracting power. The object-side surface 41 of the second lens element 4 is a convex surface and has a convex portion 411 in a vicinity of the optical axis I and a convex portion 412 in a vicinity of a periphery of the second lens element 4. The image-side surface 42 of the second lens element 4 is a concave surface and has a concave portion 421 in a vicinity of the optical axis I and a concave portion 422 in a vicinity of the periphery of the second lens element 4. In the present embodiment, the object-side surface 41 and the image-side surface 42 of the second lens element 4 are both aspheric surfaces.

The third lens element 5 has positive refracting power. The object-side surface 51 of the third lens element 5 is a convex surface and has a convex portion 511 in a vicinity of the optical axis I and a convex portion 512 in a vicinity of a periphery of the third lens element 5. The image-side surface 52 of the third lens element 5 is a concave surface and has a concave portion 521 in a vicinity of the optical axis I and a concave portion 522 in a vicinity of the periphery of the third lens element 5. In the present embodiment, the object-side surface 51 and the image-side surface 52 of the third lens element 5 are both aspheric surfaces.

The fourth lens element 6 has negative refracting power. The object-side surface 61 of the fourth lens element 6 is a concave surface and has a concave portion 611 in a vicinity of the optical axis I and a concave portion 612 in a vicinity of a periphery of the fourth lens element 6. The image-side surface 62 of the fourth lens element 6 is a concave surface and has a concave portion 621 in a vicinity of the optical axis I and a concave portion 622 in a vicinity of the periphery of the fourth lens element 6. In the present embodiment, the object-side surface 61 and the image-side surface 62 of the fourth lens element 6 are both aspheric surfaces.

The fifth lens element 7 has positive refracting power. The object-side surface 71 of the fifth lens element 7 is a concave surface and has a concave portion 711 in a vicinity of the optical axis I and a concave portion 712 in a vicinity of a periphery of the fifth lens element 7. The image-side surface 72 of the fifth lens element 7 is a convex surface and has a convex portion 721 in a vicinity of the optical axis I and a convex portion 722 in a vicinity of the periphery of the fifth lens element 7. In the present embodiment, the object-side surface 71 and the image-side surface 72 of the fifth lens element 7 are both aspheric surfaces.

The sixth lens element 8 has negative refracting power. The object-side surface 81 of the sixth lens element 8 is a concave surface and has a concave portion 811 in a vicinity of the optical axis I and a concave portion 812 in a vicinity of a periphery of the sixth lens element 8. The image-side surface 82 of the sixth lens element 8 has a concave portion 821 in a vicinity of the optical axis I and a convex portion 822 in a vicinity of the periphery of the sixth lens element 8. In the present embodiment, the object-side surface 81 and the image-side surface 82 of the sixth lens element 8 are both aspheric surfaces.

The detailed optical data in the first embodiment are provided in FIG. 8. In the first embodiment, an effective focal length (EFL) of the optical imaging lens 10 is 8.784 mm; the half field of view (HFOV) of the optical imaging lens 10 is 17.993°; the f-number (Fno) of the optical imaging lens 10 is 2.023; the system length of the optical imaging lens 10 is 7.956 mm, and the image height of the optical imaging lens 10 is 2.944 mm. Here, the system length refers to a distance from the object-side surface 31 of the first lens element 3 to the image plane 100 along the optical axis I.

In addition, in the first embodiment, all of the twelve surfaces, i.e., the object-side surfaces 31, 41, 51, 61, 71, and 81 and the image-side surfaces 32, 42, 52, 62, 72, and 82 of the first lens element 3, the second lens element 4, the third lens element 5, the fourth lens element 6, the fifth lens element 7, and the sixth lens element 8 are aspheric surfaces. The aspheric surfaces are defined by the following formula.

$$Z(Y) = \frac{Y^2}{R} \left( 1 + \sqrt{1 - (1+K)\frac{Y^2}{R^2}} \right) + \sum_{i=1}^{n} a_i \times Y^i \quad (1)$$

wherein

Y: a distance from a point on an aspheric curve to the optical axis I;

Z: a depth of the aspheric surface (a vertical distance between the point on the aspheric surface that is spaced from the optical axis I by the distance Y and a tangent plane tangent to a vertex of the aspheric surface on the optical axis I);

R: a radius of curvature of the surface of the lens element close to the optical axis I;

K: a conic constant;

$a_i$: the $i^{th}$ aspheric coefficient.

The aspheric coefficients of the object-side surface 31 of the first lens element 3 to the image-side surface 82 of the sixth lens element 8 in the formula (1) are indicated in FIG. 9. In FIG. 9, the referential number 31 in one column represents the aspheric coefficient of the object-side surface 31 of the first lens element 3, and the reference numbers in other columns can be deduced from the above.

In addition, the relationship among the important parameters pertaining to the optical imaging lens 10 in the first embodiment is indicated in FIG. 50, wherein EFL represents an effective focal length of the optical imaging lens 10;

HFOV represents a half field of view of the optical imaging lens 10;

Fno represents an F-number of the optical imaging lens 10;

T1 represents the thickness of the first lens element 3 along the optical axis I;

T2 represents the thickness of the second lens element 4 along the optical axis I;

T3 represents the thickness of the third lens element 5 along the optical axis I;

T4 represents the thickness of the fourth lens element 6 along the optical axis I;

T5 represents the thickness of the fifth lens element 7 along the optical axis I;

T6 represents the thickness of the sixth lens element 8 along the optical axis I;

G1 represents a distance from the image-side surface 32 of the first lens element 3 to the object-side surface 41 of the second lens element 4 along the optical axis I;

G2 represents a distance from the image-side surface 42 of the second lens element 4 to the object-side surface 51 of the third lens element 5 along the optical axis I;

G3 represents a distance from the image-side surface 52 of the third lens element 5 to the object-side surface 61 of the fourth lens element 6 along the optical axis I;

G4 represents a distance from the image-side surface 62 of the fourth lens element 6 to the object-side surface 71 of the fifth lens element 7 along the optical axis I;

G5 represents a distance from the image-side surface 72 of the fifth lens element 7 to the object-side surface 81 of the sixth lens element 8 along the optical axis I;

G6 represents a distance from the image-side surface 82 of the sixth lens element 8 to the object-side surface 91 of the filter 9 along the optical axis I;

TF represents the thickness of the filter 9 along the optical axis I;

GFP represents a distance from the image-side surface 92 of the filter 9 to the image plane 100 along the optical axis I;

TTL represents a distance from the object-side surface 31 of the first lens element 3 to the image plane 100 along the optical axis I;

BFL represents a distance from the image-side surface of the last lens element to the image plane 100 along the optical axis I;

Gaa represents the sum of a length of air gaps from the first lens element 3 to the last lens element along the optical axis I;

ALT is the sum of a thickness of all lens element in the optical imaging lens 10 along the optical axis I;

TL represents the distance from the object-side surface 31 of the first lens element 3 to the image-side surface of the last lens element along the optical axis I;

Here, ΔG is an absolute value of a difference between a first value and a second value of the length of the at least one variable gap of the optical imaging lens 10 along the optical axis I when an object having an infinite object distance and an object having an object distance of 500 millimeters are focused respectively;

Gv represents the length of the at least one variable gap of the optical imaging lens 10 along the optical axis I when the object having the object distance of 500 millimeters is focused;

EFL_GvA1 represents an effective focal length of a lens group constituted by all the lens elements located on the object side with respect to the variable gap; and EFL_GvA2 represents an effective focal length of a lens group constituted by all the lens elements located on the image side with respect to the variable gap.

Besides, it is further defined that:

f1 is a focal length of the first lens element 3;
f2 is a focal length of the second lens element 4;
f3 is a focal length of the third lens element 5;
f4 is a focal length of the fourth lens element 6;
f5 is a focal length of the fifth lens element 7;
f6 is a focal length of the sixth lens element 8;
n1 is a refracting index of the first lens element 3;
n2 is a refracting index of the second lens element 4;
n3 is a refracting index of the third lens element 5;
n4 is a refracting index of the fourth lens element 6;
n5 is a refracting index of the fifth lens element 7;
n6 is a refracting index of the sixth lens element 8;
υ1 is an Abbe number of the first lens element 3;
υ2 is an Abbe number of the second lens element 4;
υ3 is an Abbe number of the third lens element 5;
υ4 is an Abbe number of the fourth lens element 6;
υ5 is an Abbe number of the fifth lens element 7; and
υ6 is an Abbe number of the sixth lens element 8.

In the present embodiment, the optical imaging lens 10 satisfies ΔG/Gv≤0.1. Here, ΔG is an absolute value of a difference between a first value and a second value of a length of the at least one variable gap along the optical axis when an object having an infinite object distance and an object having an object distance of 500 millimeters are focused respectively, and Gv is the second value. In the present embodiment, the number of the at least one variable gap is 1. The variable gap is the air gap between the third lens element 5 and the fourth lens element 6, and the length of the variable gap along the optical axis I is the distance from the image-side surface 52 of the third lens element 5 to the object-side surface 61 of the fourth lens element 6 along the optical axis I. When the optical imaging lens 10 performs the focusing function, all the lens elements (i.e., the first lens element 3, the second lens element 4, and the third lens element 5) on the object side with respect to the variable gap are a movable group, and the overall refracting power of the lens group (the movable group) is positive. All the lens elements (i.e., the fourth lens element 6, the fifth lens element 7, and the sixth lens element 8) on the image side with respect to the variable gap are a fixed group, and the overall refracting power of the lens group (the fixed group) is negative. In the present embodiment, if the optical imaging lens 10 focuses on the object having the infinite object distance, e.g., the object having the object distance of $10^{10}$ mm, the length of the variable gap along the optical axis I is 1.240 mm. Specifically, when the optical imaging lens 10 focuses on the object having the infinite object distance and focuses on the object having the object distance of $10^{10}$ mm, the difference in the length of the variable gap along the optical axis I is of a small value; hence, the length of the variable gap along the optical axis I when the optical imaging lens 10 focuses on the object having the infinite object distance can be considered as the length of the variable gap along the optical axis I when the optical imaging lens 10 focuses on the object having the object distance of $10^{10}$ mm. Besides, in the present embodiment, if the optical imaging lens 10 focuses on the object having the object distance of 500 mm, the length of the variable gap along the optical axis I is 1.250 mm.

Figures 7A, 7B, 7C, 7D:
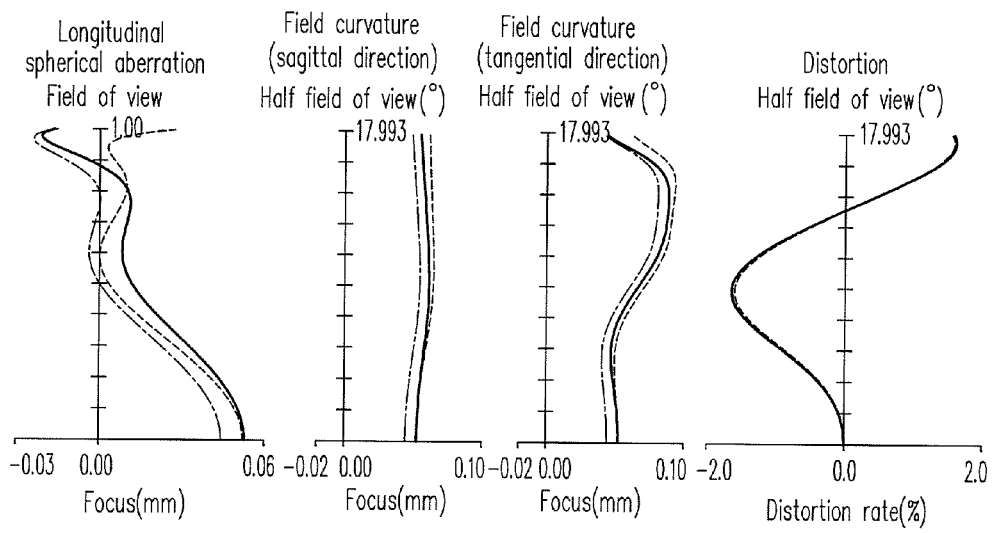
FIG. 7A to FIG. 7D illustrate a longitudinal spherical aberration and other aberrations of the optical imaging lens according to the first embodiment of the invention.

Please refer to FIG. 7A to FIG. 7D. FIG. 7A illustrates the longitudinal spherical aberration described in the first embodiment. FIG. 7B and FIG. 7C respectively illustrate field curvature aberration in a sagittal direction on the image plane 100 and field curvature aberration in a tangential direction on the image plane 100 in the first embodiment. FIG. 7D illustrates distortion aberration on the image plane 100 in the first embodiment. The longitudinal spherical aberration provided in the first embodiment and shown in FIG. 7A is simulated on the condition that the pupil radius is 2.1951 mm. In FIG. 7A which illustrates the longitudinal spherical aberration in the first embodiment, the curve of each wavelength is close to one another and approaches the center position, which indicates that the off-axis ray of each wavelength at different heights is concentrated around the imaging point. The skew margin of the curve of each wavelength indicates that the imaging point deviation of the off-axis ray at different heights is controlled within a range of ±0.06 mm. Hence, it is evident that the spherical aberration of the same wavelength can be significantly improved according to the first embodiment. In addition, the curves of the three representative wavelengths (red, green, and blue) are close to one another, which indicates that the imaging positions of the rays with different wavelengths are rather concentrated; therefore, the chromatic aberration can be significantly improved as well.

In FIG. 7B and FIG. 7C which illustrate two diagrams of field curvature aberrations, the focal length variation of the three representative wavelengths within the entire field of view falls within the range of ±0.100 mm, which indicates that aberration of the optical system provided in the first embodiment can be effectively eliminated. In FIG. 7D, the diagram of distortion aberration shows that the distortion aberration in the first embodiment can be maintained within the range of ±2.0%, which indicates that the distortion aberration in the first embodiment can comply with the imaging quality requirement of the optical system. Accordingly, compared to the existing optical imaging lens, the optical imaging lens provided in the first embodiment can have the favorable imaging quality, given that the system length of the optical imaging lens is shortened to about 8.784 mm. As a result, according to the first embodiment, the length of the lens can be shortened without sacrificing the optical properties, and thereby the slim design of product can be realized. In addition, the optical imaging lens 10 provided in the first embodiment is characterized by a small field of view, which is conducive to the improvement of the telescopic photograph taking ability. Besides, the length of the optical imaging lens 10 extended during auto focus can be reduced without sacrificing the imaging quality, and the clarity of the image of the distant or close object can be guaranteed.

Figure 10:
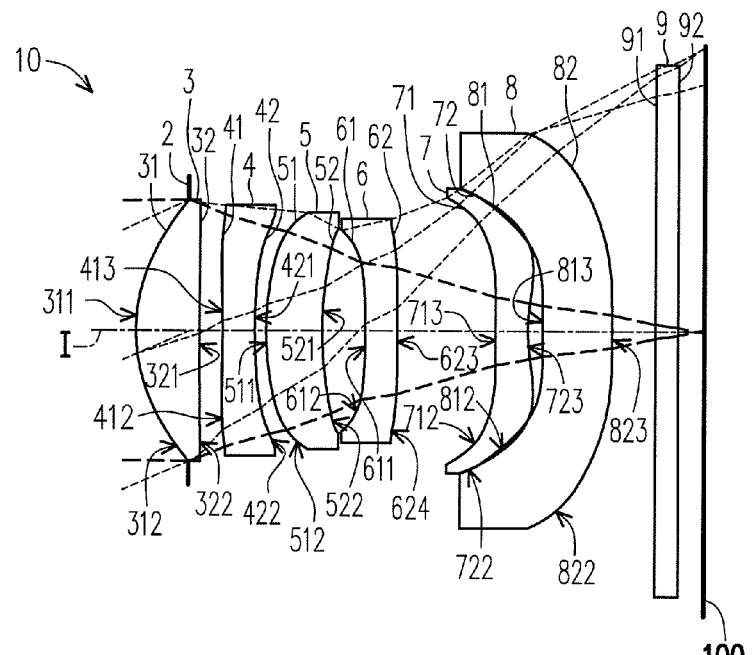
FIG. 10 is a schematic view illustrating an optical imaging lens according to a second embodiment of the invention.

FIG. 10 is a schematic view illustrating an optical imaging lens according to a second embodiment of the invention, and FIG. 11A to FIG. 11D illustrate a longitudinal spherical aberration and other aberrations of the optical imaging lens according to the second embodiment of the invention. With reference to FIG. 10, the optical imaging lens 10 provided in the second embodiment is similar to that provided in the first embodiment, while the optical data, the aspheric coefficients, and the parameters of the lens elements 3, 4, 5, 6, 7, and 8 in these two embodiments are different to some extent. In the second embodiment, the object-side surface 41 of the second lens element 4 has a concave portion 413 in the vicinity of the optical axis I and a convex portion 412 in the vicinity of the periphery of the second lens element 4. The image-side surface 62 of the fourth lens element 6 is a convex surface and has a convex portion 623 in the vicinity of the optical axis I and a convex portion 624 in the vicinity of the periphery of the fourth lens element 6. The fifth lens element 7 has negative refracting power. The object-side surface 71 of the fifth lens element 7 has a convex portion 713 in the vicinity of the optical axis I and a concave portion 712 in the vicinity of the periphery of the fifth lens element 7. The image-side surface 72 of the fifth lens element 7 has a concave portion 723 in the vicinity of the optical axis I and a convex portion 722 in the vicinity of the periphery of the fifth lens element 7. The sixth lens element 8 has positive refracting power. The object-side surface 81 of the sixth lens element 8 has a convex portion 813 in the vicinity of the optical axis I and a concave portion 812 in the vicinity of the periphery of the sixth lens element 8. The image-side surface 82 of the sixth lens element 8 is a convex surface and has a convex portion 823 in the vicinity of the optical axis I and a convex portion 822 in the vicinity of the periphery of the sixth lens element 8. For clear illustration, it should be mentioned that the same reference numbers of the concave portions and the convex portions in the two embodiments are omitted from FIG. 10.

The detailed optical data of the optical imaging lens 10 are provided in FIG. 12. In the second embodiment, the effective focal length of the optical imaging lens 10 is 5.993 mm; the HFOV of the optical imaging lens 10 is 23.580°; the Fno of the optical imaging lens 10 is 2.365; the system length of the optical imaging lens 10 is 5.258 mm, and the image height of the optical imaging lens 10 is 2.619 mm.

The aspheric coefficients of the object-side surface 31 of the first lens element 3 to the image-side surface 82 of the sixth lens element 8 in the formula (1) are indicated in FIG. 13 according to the second embodiment.

In addition, the relationship among the important parameters pertaining to the optical imaging lens 10 in the second embodiment is indicated in FIG. 50.

In the present embodiment, the number of the at least one variable gap in the optical imaging lens 10 is 1. The variable gap is the air gap between the first lens element 3 and the second lens element 4, and the length of the variable gap along the optical axis I is the distance from the image-side surface 32 of the first lens element 3 to the object-side surface 41 of the second lens element 4 along the optical axis I. When the optical imaging lens 10 performs the focusing function, all the lens elements (i.e., the first lens element 3) on the object side with respect to the variable gap are a movable group, and the overall refracting power of the lens group (the movable group) is positive. All the lens elements (i.e., the second lens element 4, the third lens element 5, the fourth lens element 6, the fifth lens element 7, and the sixth lens element 8) on the image side with respect to the variable gap are a fixed group, and the overall refracting power of the lens group (the fixed group) is negative. In the present embodiment, if the optical imaging lens 10 focuses on the object having the infinite object distance, e.g., the object having the object distance of $10^{10}$ mm, the length of the variable gap along the optical axis I is 0.217 mm. Besides, in the present embodiment, if the optical imaging lens 10 focuses on the object having the object distance of 500 mm, the length of the variable gap along the optical axis I is 0.240 mm.

Figures 11A, 11B, 11C, 11D:
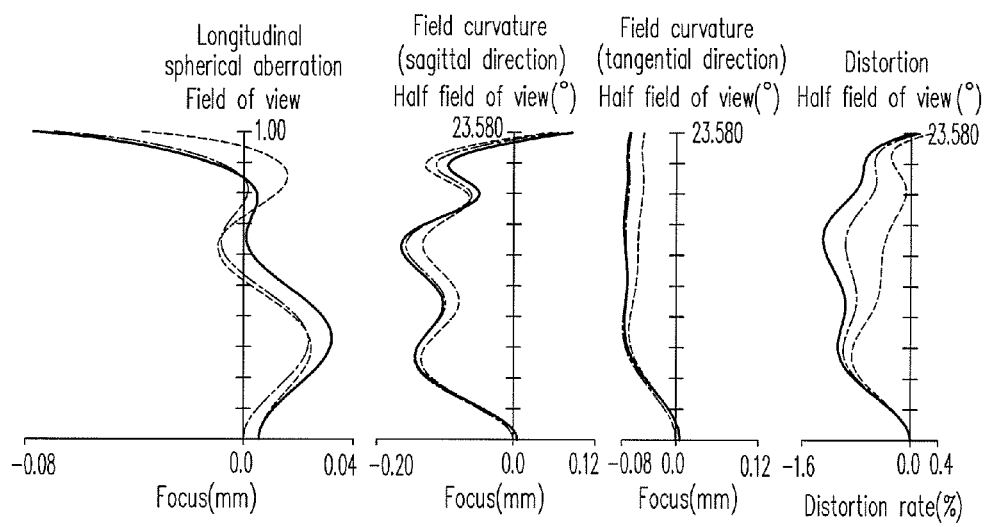
FIG. 11A to FIG. 11D illustrate a longitudinal spherical aberration and other aberrations of the optical imaging lens according to the second embodiment of the invention.

The longitudinal spherical aberration provided in the second embodiment and shown in FIG. 11A is simulated on the condition that the pupil radius is 1.2000 mm. In FIG. 11A which illustrates the longitudinal spherical aberration in the second embodiment, the imaging point deviation of the off-axis ray at different heights is controlled within a range of ±0.08 mm. In FIG. 11B and FIG. 11C which illustrate two diagrams of field curvature aberrations, the focal length variation of the three representative wavelengths within the entire field of view falls within the range of ±0.20 mm. In FIG. 11D, the diagram of distortion aberration shows that the distortion aberration in the second embodiment can be maintained within the range of ±1.6%. Accordingly, compared to the existing optical imaging lens, the optical imaging lens provided in the second embodiment can have the favorable imaging quality, given that the system length of the optical imaging lens is shortened to about 5.258 mm.

According to the above description, compared to the first embodiment, the advantages of the second embodiment are as follows. The second embodiment discloses the optical imaging lens whose length (i.e., the system length) is less than that provided in the first embodiment. The optical imaging lens 10 provided in the second embodiment has less field curvature aberration in the tangential direction than that provided in the first embodiment. Besides, the optical imaging lens 10 provided in the second embodiment has less distortion aberration than that provided in the first embodiment; in addition, the optical imaging lens 10 provided in the second embodiment is, in comparison with that provided in the first embodiment, easier to be manufactured and thus has higher yield.

Figure 14:
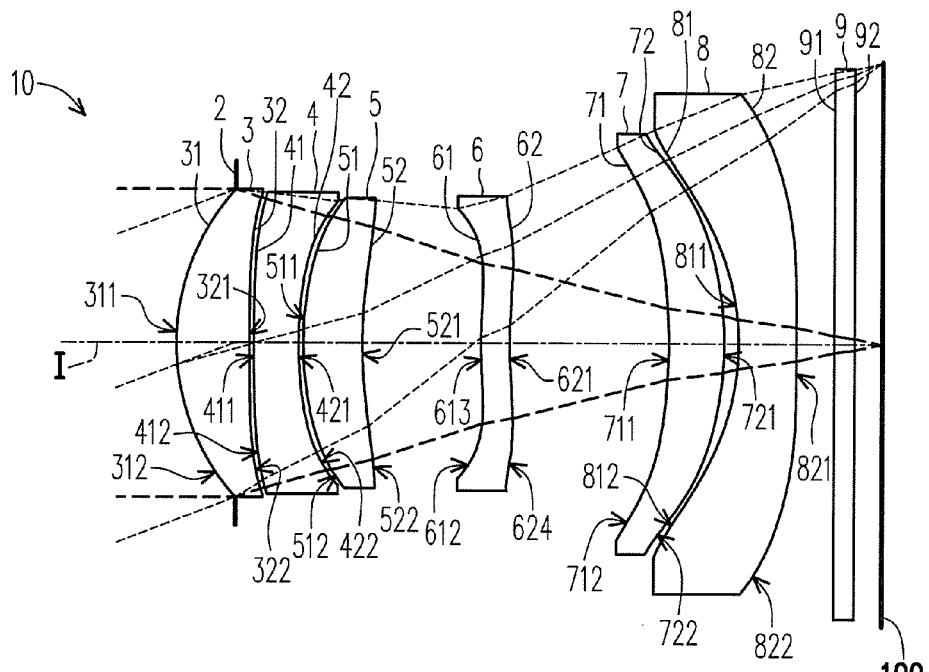
FIG. 14 is a schematic view illustrating an optical imaging lens according to a third embodiment of the invention.

FIG. 14 is a schematic view illustrating an optical imaging lens according to a third embodiment of the invention, and FIG. 15A to FIG. 15D illustrate a longitudinal spherical aberration and other aberrations of the optical imaging lens according to the third embodiment of the invention. With reference to FIG. 14, the optical imaging lens 10 provided in the third embodiment is similar to that provided in the first embodiment, while the optical data, the aspheric coefficients, and the parameters of the lens elements 3, 4, 5, 6, 7, and 8 in these two embodiments are different to some extent. In the third embodiment, the object-side surface 61 of the fourth lens element 6 has a convex portion 613 in the vicinity of the optical axis I and a concave portion 612 in the vicinity of the periphery of the fourth lens element 6. The image-side surface 62 of the fourth lens element 6 has a concave portion 621 in the vicinity of the optical axis I and a convex portion 624 in the vicinity of the periphery of the fourth lens element 6. For clear illustration, it should be mentioned that the same reference numbers of the concave portions and the convex portions in the two embodiments are omitted from FIG. 14.

The detailed optical data of the optical imaging lens 10 are provided in FIG. 16. In the third embodiment, the effective focal length of the optical imaging lens 10 is 7.669 mm; the HFOV of the optical imaging lens 10 is 20.860°; the Fno of the optical imaging lens 10 is 2.395; the system length of the optical imaging lens 10 is 7.365 mm, and the image height of the optical imaging lens 10 is 2.944 mm.

The aspheric coefficients of the object-side surface 31 of the first lens element 3 to the image-side surface 82 of the sixth lens element 8 in the formula (1) are indicated in FIG. 17 according to the third embodiment.

In addition, the relationship among the important parameters pertaining to the optical imaging lens 10 in the third embodiment is indicated in FIG. 50.

In the present embodiment, the number of the at least one variable gap in the optical imaging lens 10 is 1. The variable gap is the air gap between the third lens element 5 and the fourth lens element 6, and the length of the variable gap along the optical axis I is the distance from the image-side surface 52 of the third lens element 5 to the object-side surface 61 of the fourth lens element 6 along the optical axis I. When the optical imaging lens 10 performs the focusing function, all the lens elements (i.e., the first lens element 3, the second lens element 4, and the third lens element 5) on the object side with respect to the variable gap are a movable group, and the overall refracting power of the lens group (the movable group) is positive. All the lens elements (i.e., the fourth lens element 6, the fifth lens element 7, and the sixth lens element 8) on the image side with respect to the variable gap are a fixed group, and the overall refracting power of the lens group (the fixed group) is negative. In the present embodiment, if the optical imaging lens 10 focuses on the object having the infinite object distance, e.g., the object having the object distance of $10^{10}$ mm, the length of the variable gap along the optical axis I is 1.243 mm. Besides, in the present embodiment, if the optical imaging lens 10 focuses on the object having the object distance of 500 mm, the length of the variable gap along the optical axis I is 1.250 mm.

Figures 15A, 15B, 15C, 15D:
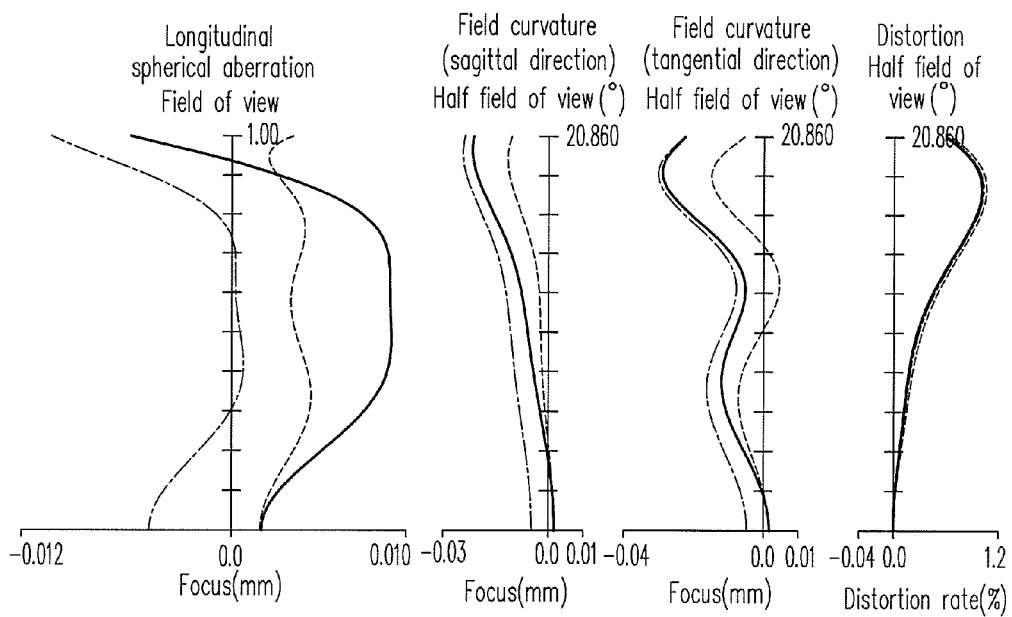
FIG. 15A to FIG. 15D illustrate a longitudinal spherical aberration and other aberrations of the optical imaging lens according to the third embodiment of the invention.

The longitudinal spherical aberration provided in the third embodiment and shown in FIG. 15A is simulated on the condition that the pupil radius is 1.5978 mm. In FIG. 15A which illustrates the longitudinal spherical aberration in the third embodiment, the imaging point deviation of the off-axis ray at different heights is controlled within a range of ±0.012 mm. In FIG. 15B and FIG. 15C which illustrate two diagrams of field curve aberrations, the focal length variation of the three representative wavelengths within the entire field of view falls within the range of ±0.04 mm. In FIG. 15D, the diagram of distortion aberration shows that the distortion aberration in the third embodiment can be maintained within the range of ±1.2%. Accordingly, compared to the existing optical imaging lens, the optical imaging lens provided in the third embodiment can have the favorable imaging quality, given that the system length of the optical imaging lens is shortened to about 7.365 mm.

According to the above description, compared to the first embodiment, the advantages of the third embodiment are as follows. The third embodiment discloses the optical imaging lens whose length (i.e., the system length) is less than that provided in the first embodiment. The optical imaging lens 10 provided in the third embodiment has less longitudinal spherical aberration than that provided in the first embodiment. The optical imaging lens 10 provided in the third embodiment has less field curvature aberration in the sagittal direction than that provided in the first embodiment. The optical imaging lens 10 provided in the third embodiment has less field curvature aberration in the tangential direction than that provided in the first embodiment. Besides, the optical imaging lens 10 provided in the third embodiment has less distortion aberration than that provided in the first embodiment; in addition, the optical imaging lens 10 provided in the third embodiment is, in comparison with that provided in the first embodiment, easier to be manufactured and thus has higher yield.

FIG. 18 is a schematic view illustrating an optical imaging lens according to a fourth embodiment of the invention, and FIG. 19A to FIG. 19D illustrate a longitudinal spherical aberration and other aberrations of the optical imaging lens according to the fourth embodiment of the invention. With reference to FIG. 18, the optical imaging lens 10 provided in the fourth embodiment is similar to that provided in the first embodiment, while the optical data, the aspheric coefficients, and the parameters of the lens elements 3, 4, 5, 6, 7, and 8 in these two embodiments are different to some extent. In the fourth embodiment, the object-side surface 61 of the fourth lens element 6 has a convex portion 613 in the vicinity of the optical axis I and a concave portion 612 in the vicinity of the periphery of the fourth lens element 6. The image-side surface 62 of the fourth lens element 6 has a concave portion 621 in the vicinity of the optical axis I and a convex portion 624 in the vicinity of the periphery of the fourth lens element 6. For clear illustration, it should be mentioned that the same reference numbers of the concave portions and the convex portions in the two embodiments are omitted from FIG. 18.

The detailed optical data of the optical imaging lens 10 are provided in FIG. 20. In the fourth embodiment, the effective focal length of the optical imaging lens 10 is 7.660 mm; the HFOV of the optical imaging lens 10 is 20.899°; the Fno of the optical imaging lens 10 is 2.393; the system length of the optical imaging lens 10 is 7.365 mm, and the image height of the optical imaging lens 10 is 2.944 mm.

The aspheric coefficients of the object-side surface 31 of the first lens element 3 to the image-side surface 82 of the sixth lens element 8 in the formula (1) are indicated in FIG. 21 according to the fourth embodiment.

In addition, the relationship among the important parameters pertaining to the optical imaging lens 10 in the fourth embodiment is indicated in FIG. 50.

In the present embodiment, the number of the at least one variable gap in the optical imaging lens 10 is 1. The variable gap is the air gap between the third lens element 5 and the fourth lens element 6, and the length of the variable gap along the optical axis I is the distance from the image-side surface 52 of the third lens element 5 to the object-side surface 61 of the fourth lens element 6 along the optical axis I. When the optical imaging lens 10 performs the focusing function, all the lens elements (i.e., the first lens element 3, the second lens element 4, and the third lens element 5) on the object side with respect to the variable gap are a movable group, and the overall refracting power of the lens group (the movable group) is positive. All the lens elements (i.e., the fourth lens element 6, the fifth lens element 7, and the sixth lens element 8) on the image side with respect to the variable gap are a fixed group, and the overall refracting power of the lens group (the fixed group) is negative. In the present embodiment, if the optical imaging lens 10 focuses on the object having the infinite object distance, e.g., the object having the object distance of $10^{10}$ mm, the length of the variable gap along the optical axis I is 1.146 mm. Besides, in the present embodiment, if the optical imaging lens 10 focuses on the object having the object distance of 500 mm, the length of the variable gap along the optical axis I is 1.250 mm.

The longitudinal spherical aberration provided in the fourth embodiment and shown in FIG. 19A is simulated on the condition that the pupil radius is 1.5958 mm. In FIG. 19A which illustrates the longitudinal spherical aberration in the fourth embodiment, the imaging point deviation of the off-axis ray at different heights is controlled within a range of ±0.012 mm. In FIG. 19B and FIG. 19C which illustrate two diagrams of field curve aberrations, the focal length variation of the three representative wavelengths within the entire field of view falls within the range of ±0.03 mm. In FIG. 19D, the diagram of distortion aberration shows that the distortion aberration in the fourth embodiment can be maintained within the range of ±1.0%. Accordingly, compared to the existing optical imaging lens, the optical imaging lens provided in the fourth embodiment can have the favorable imaging quality, given that the system length of the optical imaging lens is shortened to about 7.365 mm.

According to the above description, compared to the first embodiment, the advantages of the fourth embodiment are as follows. The fourth embodiment discloses the optical imaging lens whose length (i.e., the system length) is less than that provided in the first embodiment. The optical imaging lens 10 provided in the fourth embodiment has less longitudinal spherical aberration than that provided in the first embodiment. The optical imaging lens 10 provided in the fourth embodiment has less field curvature aberration in the sagittal direction than that provided in the first embodiment. The optical imaging lens 10 provided in the fourth embodiment has less field curvature aberration in the tangential direction than that provided in the first embodiment. Besides, the optical imaging lens 10 provided in the fourth embodiment has less distortion aberration than that provided in the first embodiment; in addition, the optical imaging lens 10 provided in the fourth embodiment is, in comparison with that provided in the first embodiment, easier to be manufactured and thus has higher yield.

Figure 22:
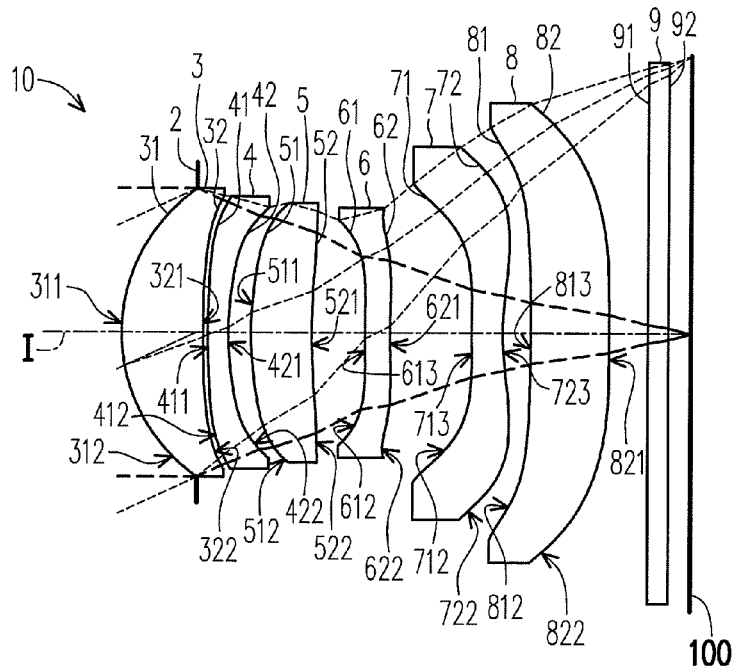
FIG. 22 is a schematic view illustrating an optical imaging lens according to a fifth embodiment of the invention.

FIG. 22 is a schematic view illustrating an optical imaging lens according to a fifth embodiment of the invention, and FIG. 23A to FIG. 23D illustrate a longitudinal spherical aberration and other aberrations of the optical imaging lens according to the fifth embodiment of the invention. With reference to FIG. 22, the optical imaging lens 10 provided in the fifth embodiment is similar to that provided in the first embodiment, while the optical data, the aspheric coefficients, and the parameters of the lens elements 3, 4, 5, 6, 7, and 8 in these two embodiments are different to some extent. In the fifth embodiment, the object-side surface 61 of the fourth lens element 6 has a convex portion 613 in the vicinity of the optical axis I and a concave portion 612 in the vicinity of the periphery of the fourth lens element 6. The fifth lens element 7 has negative refracting power. The object-side surface 71 of the fifth lens element 7 has a convex portion 713 in the vicinity of the optical axis I and a concave portion 712 in the vicinity of the periphery of the fifth lens element 7. The image-side surface 72 of the fifth lens element 7 has a concave portion 723 in the vicinity of the optical axis I and a convex portion 722 in the vicinity of the periphery of the fifth lens element 7. The object-side surface 81 of the sixth lens element 8 has a convex portion 813 in the vicinity of the optical axis I and a concave portion 812 in the vicinity of the periphery of the sixth lens element 8. For clear illustration, it should be mentioned that the same reference numbers of the concave portions and the convex portions in the two embodiments are omitted from FIG. 22.

The detailed optical data of the optical imaging lens 10 are provided in FIG. 24. In the fifth embodiment, the effective focal length of the optical imaging lens 10 is 6.133 mm; the HFOV of the optical imaging lens 10 is 25.002°; the Fno of the optical imaging lens 10 is 2.042; the system length of the optical imaging lens 10 is 5.952 mm, and the image height of the optical imaging lens 10 is 2.912 mm.

The aspheric coefficients of the object-side surface 31 of the first lens element 3 to the image-side surface 82 of the sixth lens element 8 in the formula (1) are indicated in FIG. 25 according to the fifth embodiment.

In addition, the relationship among the important parameters pertaining to the optical imaging lens 10 in the fifth embodiment is indicated in FIG. 50.

In the present embodiment, the number of the at least one variable gap in the optical imaging lens 10 is 1. The variable gap is the air gap between the fourth lens element 6 and the fifth lens element 7, and the length of the variable gap along the optical axis I is the distance from the image-side surface 62 of the fourth lens element 6 to the object-side surface 71 of the fifth lens element 7 along the optical axis I. When the optical imaging lens 10 performs the focusing function, all the lens elements (i.e., the first lens element 3, the second lens element 4, the third lens element 5, and the fourth lens element 6) on the object side with respect to the variable gap are a movable group, and the overall refracting power of the lens group (the movable group) is positive. All the lens elements (i.e., the fifth lens element 7 and the sixth lens element 8) on the image side with respect to the variable gap are a fixed group, and the overall refracting power of the lens group (the fixed group) is negative. In the present embodiment, if the optical imaging lens 10 focuses on the object having the infinite object distance, e.g., the object having the object distance of $10^{10}$ mm, the length of the variable gap along the optical axis I is 0.852 mm. Besides, in the present embodiment, if the optical imaging lens 10 focuses on the object having the object distance of 500 mm, the length of the variable gap along the optical axis I is 0.888 mm.

Figures 23A, 23B, 23C, 23D:
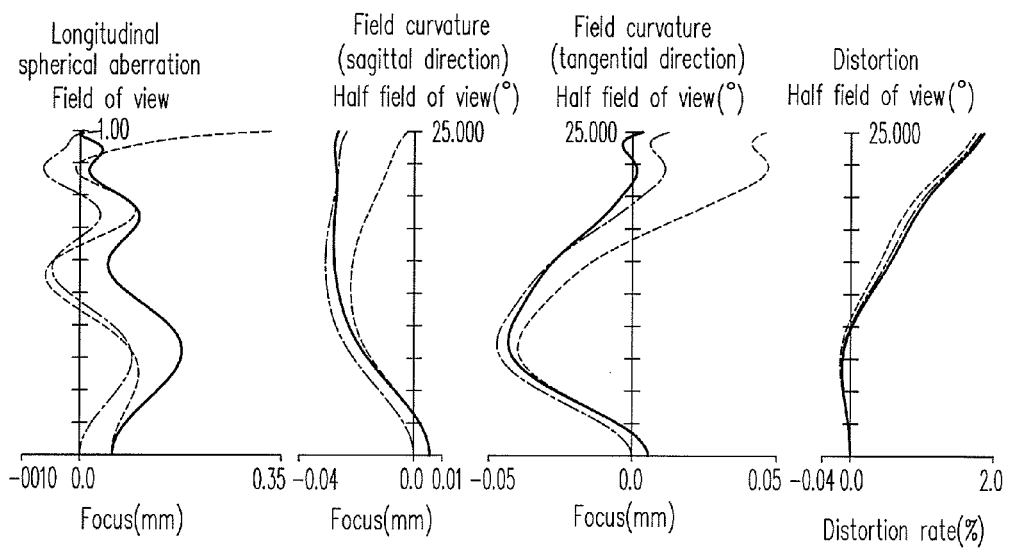
FIG. 23A to FIG. 23D illustrate a longitudinal spherical aberration and other aberrations of the optical imaging lens according to the fifth embodiment of the invention.

The longitudinal spherical aberration provided in the fifth embodiment and shown in FIG. 23A is simulated on the condition that the pupil radius is 1.4959 mm. In FIG. 23A which illustrates the longitudinal spherical aberration in the fifth embodiment, the imaging point deviation of the off-axis ray at different heights is controlled within a range of ±0.035 mm. In FIG. 23B and FIG. 23C which illustrate two diagrams of field curve aberrations, the focal length variation of the three representative wavelengths within the entire field of view falls within the range of ±0.05 mm. In FIG. 23D, the diagram of distortion aberration shows that the distortion aberration in the fifth embodiment can be maintained within the range of ±2.0%. Accordingly, compared to the existing optical imaging lens, the optical imaging lens provided in the fifth embodiment can have the favorable imaging quality, given that the system length of the optical imaging lens is shortened to about 5.952 mm.

According to the above description, compared to the first embodiment, the advantages of the fifth embodiment are as follows. The fifth embodiment discloses the optical imaging lens whose length (i.e., the system length) is less than that provided in the first embodiment. The optical imaging lens 10 provided in the fifth embodiment has less longitudinal spherical aberration than that provided in the first embodiment. The optical imaging lens 10 provided in the fifth embodiment has less field curvature aberration in the sagittal direction than that provided in the first embodiment. Besides, the optical imaging lens 10 provided in the fifth embodiment has less field curvature aberration in the tangential direction than that provided in the first embodiment; in addition, the optical imaging lens 10 provided in the fifth embodiment is, in comparison with that provided in the first embodiment, easier to be manufactured and thus has higher yield.

Figure 26:
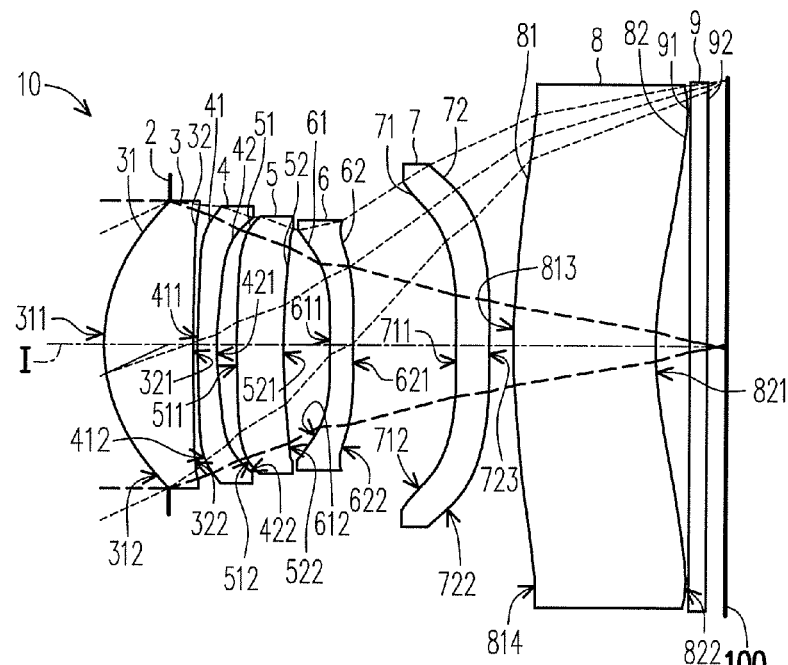
FIG. 26 is a schematic view illustrating an optical imaging lens according to a sixth embodiment of the invention.

FIG. 26 is a schematic view illustrating an optical imaging lens according to a sixth embodiment of the invention, and FIG. 27A to FIG. 27D illustrate a longitudinal spherical aberration and other aberrations of the optical imaging lens according to the sixth embodiment of the invention. With reference to FIG. 26, the optical imaging lens 10 provided in the sixth embodiment is similar to that provided in the first embodiment, while the optical data, the aspheric coefficients, and the parameters of the lens elements 3, 4, 5, 6, 7, and 8 in these two embodiments are different to some extent. The fifth lens element 7 provided in the sixth embodiment has negative refracting power. The image-side surface 72 of the fifth lens element 7 has a concave portion 723 in the vicinity of the optical axis I and a convex portion 722 in the vicinity of the periphery of the fifth lens element 7. The object-side surface 81 of the sixth lens element 8 is a convex surface and has a convex portion 813 in the vicinity of the optical axis I and a convex portion 814 in the vicinity of the periphery of the sixth lens element 8. For clear illustration, it should be mentioned that the same reference numbers of the concave portions and the convex portions in the two embodiments are omitted from FIG. 26.

The detailed optical data of the optical imaging lens 10 are provided in FIG. 28. In the sixth embodiment, the effective focal length of the optical imaging lens 10 is 7.011 mm; the HFOV of the optical imaging lens 10 is 25.001°; the Fno of the optical imaging lens 10 is 1.911; the system length of the optical imaging lens 10 is 7.465 mm, and the image height of the optical imaging lens 10 is 3.214 mm.

The aspheric coefficients of the object-side surface 31 of the first lens element 3 to the image-side surface 82 of the sixth lens element 8 in the formula (1) are indicated in FIG. 29 according to the sixth embodiment.

In addition, the relationship among the important parameters pertaining to the optical imaging lens 10 in the sixth embodiment is indicated in FIG. 51.

In the present embodiment, the number of the at least one variable gap in the optical imaging lens 10 is 1. The variable gap is the air gap between the fourth lens element 6 and the fifth lens element 7, and the length of the variable gap along the optical axis I is the distance from the image-side surface 62 of the fourth lens element 6 to the object-side surface 71 of the fifth lens element 7 along the optical axis I. When the optical imaging lens 10 performs the focusing function, all the lens elements (i.e., the first lens element 3, the second lens element 4, the third lens element 5, and the fourth lens element 6) on the object side with respect to the variable gap are a movable group, and the overall refracting power of the lens group (the movable group) is positive. All the lens elements (i.e., the fifth lens element 7 and the sixth lens element 8) on the image side with respect to the variable gap are a fixed group, and the overall refracting power of the lens group (the fixed group) is negative. In the present embodiment, if the optical imaging lens 10 focuses on the object having the infinite object distance, e.g., the object having the object distance of $10^{10}$ mm, the length of the variable gap along the optical axis I is 1.241 mm. Besides, in the present embodiment, if the optical imaging lens 10 focuses on the object having the object distance of 500 mm, the length of the variable gap along the optical axis I is 1.309 mm.

Figures 27A, 27B, 27C, 27D:
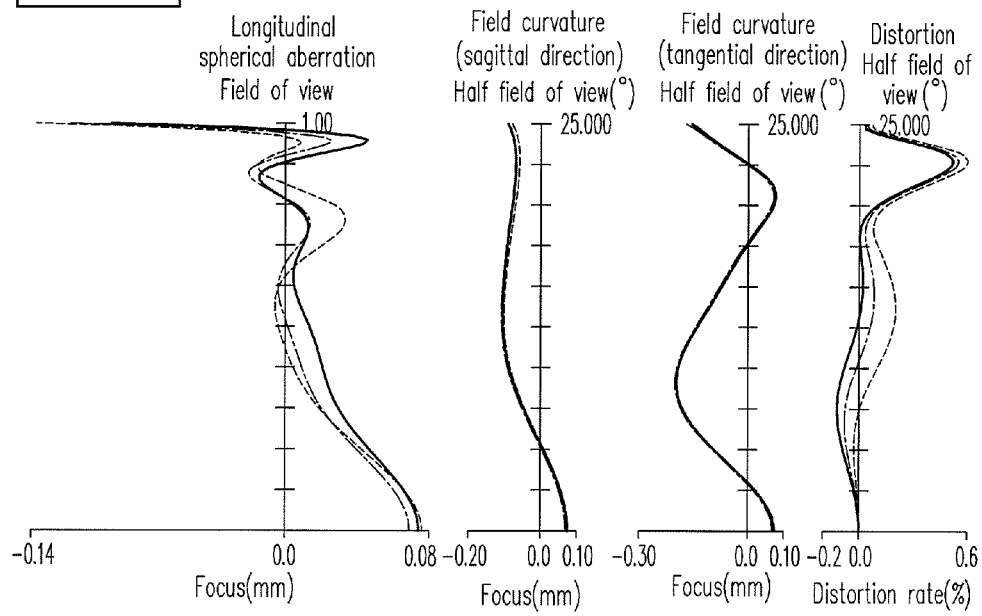
FIG. 27A to FIG. 27D illustrate a longitudinal spherical aberration and other aberrations of the optical imaging lens according to the sixth embodiment of the invention.

The longitudinal spherical aberration provided in the sixth embodiment and shown in FIG. 27A is simulated on the condition that the pupil radius is 1.7099 mm. In FIG. 27A which illustrates the longitudinal spherical aberration in the sixth embodiment, the imaging point deviation of the off-axis ray at different heights is controlled within a range of ±0.14 mm. In FIG. 27B and FIG. 27C which illustrate two diagrams of field curve aberrations, the focal length variation of the three representative wavelengths within the entire field of view falls within the range of ±0.30 mm. In FIG. 27D, the diagram of distortion aberration shows that the distortion aberration in the sixth embodiment can be maintained within the range of ±0.6%. Accordingly, compared to the existing optical imaging lens, the optical imaging lens provided in the sixth embodiment can have the favorable imaging quality, given that the system length of the optical imaging lens is shortened to about 7.465 mm.

According to the above description, compared to the first embodiment, the advantages of the sixth embodiment are as follows. The sixth embodiment discloses the optical imaging lens whose length (i.e., the system length) is less than that provided in the first embodiment. The Fno provided in the sixth embodiment is less than that provided in the first embodiment; that is, the aperture provided in the sixth embodiment is greater than that provided in the first embodiment. Besides, the optical imaging lens 10 provided in the sixth embodiment has less distortion aberration than that provided in the first embodiment; in addition, the optical imaging lens 10 provided in the sixth embodiment is, in comparison with that provided in the first embodiment, easier to be manufactured and thus has higher yield.

FIG. 30 is a schematic view illustrating an optical imaging lens according to a seventh embodiment of the invention, and FIG. 31A to FIG. 31D illustrate a longitudinal spherical aberration and other aberrations of the optical imaging lens according to the seventh embodiment of the invention. With reference to FIG. 30, the optical imaging lens 10 provided in the seventh embodiment is similar to that provided in the first embodiment, while the optical data, the aspheric coefficients, and the parameters of the lens elements 3, 4, 5, 6, 7, and 8 in these two embodiments are different to some extent. The fourth lens element 6 provided in the seventh embodiment has positive refracting power. The object-side surface 61 of the fourth lens element 6 has a convex portion 613 in the vicinity of the optical axis I and a concave portion 612 in the vicinity of the periphery of the fourth lens element 6. The image-side surface 62 of the fourth lens element 6 has a concave portion 621 in the vicinity of the optical axis I and a convex portion 624 in the vicinity of the periphery of the fourth lens element 6. For clear illustration, it should be mentioned that the same reference numbers of the concave portions and the convex portions in the two embodiments are omitted from FIG. 30.

The detailed optical data of the optical imaging lens 10 are provided in FIG. 32. In the seventh embodiment, the effective focal length of the optical imaging lens 10 is 7.314 mm; the HFOV of the optical imaging lens 10 is 21.901'; the Fno of the optical imaging lens 10 is 1.660; the system length of the optical imaging lens 10 is 7.310 mm, and the image height of the optical imaging lens 10 is 2.944 mm.

The aspheric coefficients of the object-side surface 31 of the first lens element 3 to the image-side surface 82 of the seventh lens element 8 in the formula (1) are indicated in FIG. 33 according to the sixth embodiment.

In addition, the relationship among the important parameters pertaining to the optical imaging lens 10 in the seventh embodiment is indicated in FIG. 51.

In the present embodiment, the number of the at least one variable gap in the optical imaging lens 10 is 1. The variable gap is the air gap between the third lens element 5 and the fourth lens element 6, and the length of the variable gap along the optical axis I is the distance from the image-side surface 52 of the third lens element 5 to the object-side surface 61 of the fourth lens element 6 along the optical axis I. When the optical imaging lens 10 performs the focusing function, all the lens elements (i.e., the first lens element 3, the second lens element 4, and the third lens element 5) on the object side with respect to the variable gap are a movable group, and the overall refracting power of the lens group (the movable group) is positive. All the lens elements (i.e., the fourth lens element 6, the fifth lens element 7, and the sixth lens element 8) on the image side with respect to the variable gap are a fixed group, and the overall refracting power of the lens group (the fixed group) is negative. In the present embodiment, if the optical imaging lens 10 focuses on the object having the infinite object distance, e.g., the object having the object distance of $10^{10}$ mm, the length of the variable gap along the optical axis I is 1.362 mm. Besides, in the present embodiment, if the optical imaging lens 10 focuses on the object having the object distance of 500 mm, the length of the variable gap along the optical axis I is 1.250 mm.

The longitudinal spherical aberration provided in the seventh embodiment and shown in FIG. 31A is simulated on the condition that the pupil radius is 2.1951 mm. In FIG. 31A which illustrates the longitudinal spherical aberration in the seventh embodiment, the imaging point deviation of the off-axis ray at different heights is controlled within a range of ±0.012 mm. In FIG. 31B and FIG. 31C which illustrate two diagrams of field curve aberrations, the focal length variation of the three representative wavelengths within the entire field of view falls within the range of ±0.12 mm. In FIG. 31D, the diagram of distortion aberration shows that the distortion aberration in the seventh embodiment can be maintained within the range of ±0.12%. Accordingly, compared to the existing optical imaging lens, the optical imaging lens provided in the seventh embodiment can have the favorable imaging quality, given that the system length of the optical imaging lens is shortened to about 7.310 mm.

According to the above description, compared to the first embodiment, the advantages of the seventh embodiment are as follows. The seventh embodiment discloses the optical imaging lens whose length (i.e., the system length) is less than that provided in the first embodiment. The Fno provided in the seventh embodiment is less than that provided in the first embodiment; that is, the aperture provided in the seventh embodiment is greater than that provided in the first embodiment. The optical imaging lens 10 provided in the seventh embodiment has less longitudinal spherical aberration than that provided in the first embodiment. Besides, the optical imaging lens 10 provided in the seventh embodiment has less distortion aberration than that provided in the first embodiment; in addition, the optical imaging lens 10 provided in the seventh embodiment is, in comparison with that provided in the first embodiment, easier to be manufactured and thus has higher yield.

Figure 34:
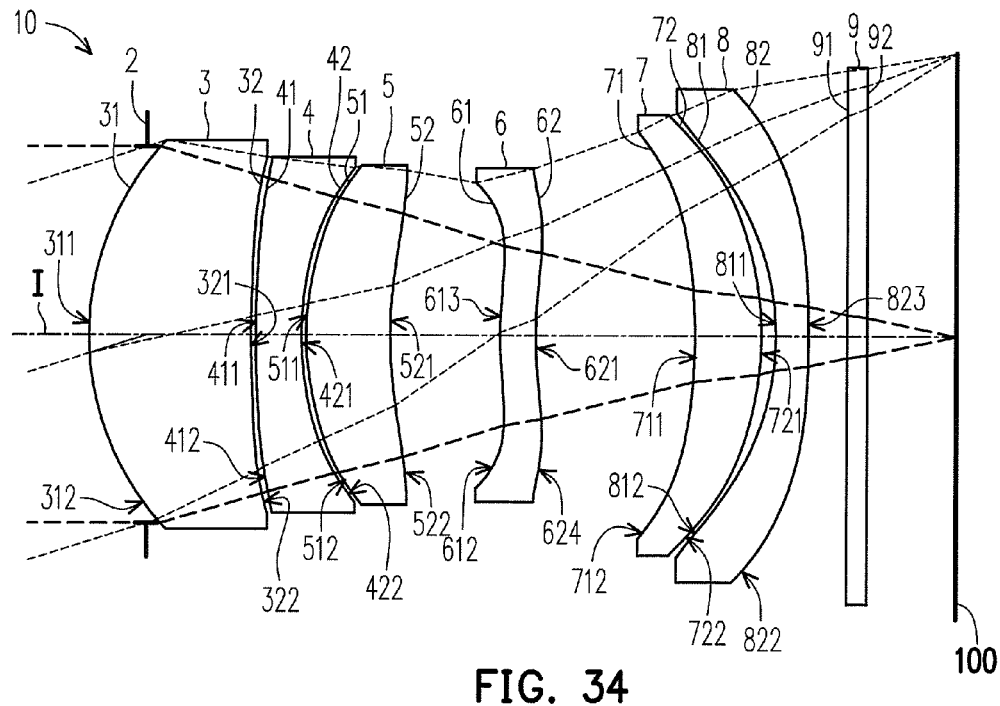
FIG. 34 is a schematic view illustrating an optical imaging lens according to an eighth embodiment of the invention.

FIG. 34 is a schematic view illustrating an optical imaging lens according to an eighth embodiment of the invention, and FIG. 35A to FIG. 35D illustrate a longitudinal spherical aberration and other aberrations of the optical imaging lens according to the eighth embodiment of the invention. With reference to FIG. 34, the optical imaging lens 10 provided in the eighth embodiment is similar to that provided in the first embodiment, while the optical data, the aspheric coefficients, and the parameters of the lens elements 3, 4, 5, 6, 7, and 8 in these two embodiments are different to some extent.

In the eighth embodiment, the object-side surface 61 of the fourth lens element 6 has a convex portion 613 in the vicinity of the optical axis I and a concave portion 612 in the vicinity of the periphery of the fourth lens element 6. The image-side surface 62 of the fourth lens element 6 has a concave portion 621 in the vicinity of the optical axis I and a convex portion 624 in the vicinity of the periphery of the fourth lens element 6. The image-side surface 82 of the sixth lens element 8 is a convex surface and has a convex portion 823 in the vicinity of the optical axis I and a convex portion 822 in the vicinity of the periphery of the sixth lens element 8. For clear illustration, it should be mentioned that the same reference numbers of the concave portions and the convex portions in the two embodiments are omitted from FIG. 34.

The detailed optical data of the optical imaging lens 10 are provided in FIG. 36. In the eighth embodiment, the effective focal length of the optical imaging lens 10 is 9.355 mm; the HFOV of the optical imaging lens 10 is 17.449°; the Fno of the optical imaging lens 10 is 2.392; the system length of the optical imaging lens 10 is 9.000 mm, and the image height of the optical imaging lens 10 is 2.944 mm.

The aspheric coefficients of the object-side surface 31 of the first lens element 3 to the image-side surface 82 of the sixth lens element 8 in the formula (1) are indicated in FIG. 37 according to the eighth embodiment.

In addition, the relationship among the important parameters pertaining to the optical imaging lens 10 in the eighth embodiment is indicated in FIG. 51.

In the present embodiment, the number of the at least one variable gap in the optical imaging lens 10 is 1. The variable gap is the air gap between the third lens element 5 and the fourth lens element 6, and the length of the variable gap along the optical axis I is the distance from the image-side surface 52 of the third lens element 5 to the object-side surface 61 of the fourth lens element 6 along the optical axis I. When the optical imaging lens 10 performs the focusing function, all the lens elements (i.e., the first lens element 3, the second lens element 4, and the third lens element 5) on the object side with respect to the variable gap are a movable group, and the overall refracting power of the lens group (the movable group) is positive. All the lens elements (i.e., the fourth lens element 6, the fifth lens element 7, and the sixth lens element 8) on the image side with respect to the variable gap are a fixed group, and the overall refracting power of the lens group (the fixed group) is negative. In the present embodiment, if the optical imaging lens 10 focuses on the object having the infinite object distance, e.g., the object having the object distance of $10^{10}$ mm, the length of the variable gap along the optical axis I is 1.145 mm. Besides, in the present embodiment, if the optical imaging lens 10 focuses on the object having the object distance of 500 mm, the length of the variable gap along the optical axis I is 1.250 mm.

Figures 35A, 35B, 35C, 35D:
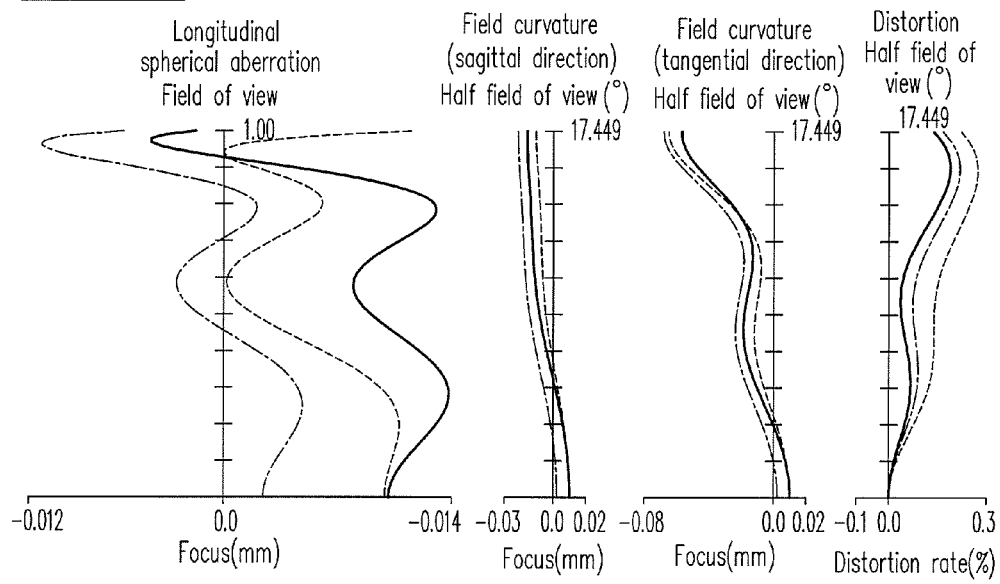
FIG. 35A to FIG. 35D illustrate a longitudinal spherical aberration and other aberrations of the optical imaging lens according to the eighth embodiment of the invention.

The longitudinal spherical aberration provided in the eighth embodiment and shown in FIG. 35A is simulated on the condition that the pupil radius is 1.9489 mm. In FIG. 35A which illustrates the longitudinal spherical aberration in the eighth embodiment, the imaging point deviation of the off-axis ray at different heights is controlled within a range of ±0.014 mm. In FIG. 35B and FIG. 35C which illustrate two diagrams of field curve aberrations, the focal length variation of the three representative wavelengths within the entire field of view falls within the range of ±0.08 mm. In FIG. 35D, the diagram of distortion aberration shows that the distortion aberration in the eighth embodiment can be maintained within the range of ±0.3%. Accordingly, compared to the existing optical imaging lens, the optical imaging lens provided in the eighth embodiment can have the favorable imaging quality, given that the system length of the optical imaging lens is shortened to about 9.000 mm.

According to the above description, compared to the first embodiment, the advantages of the eighth embodiment are as follows. The eighth embodiment discloses the optical imaging lens whose half field of view is less than that provided in the first embodiment. If the system focal length almost remains unchanged, the smaller the half field of view is, the greater the telescopic properties are. The optical imaging lens 10 provided in the eighth embodiment has less longitudinal spherical aberration than that provided in the first embodiment. The optical imaging lens 10 provided in the eighth embodiment has less field curvature aberration in the sagittal direction than that provided in the first embodiment. The optical imaging lens 10 provided in the eighth embodiment has less field curvature aberration in the tangential direction than that provided in the first embodiment. Besides, the optical imaging lens 10 provided in the eighth embodiment has less distortion aberration than that provided in the first embodiment; in addition, the optical imaging lens 10 provided in the eighth embodiment is, in comparison with that provided in the first embodiment, easier to be manufactured and thus has higher yield.

Figure 38:
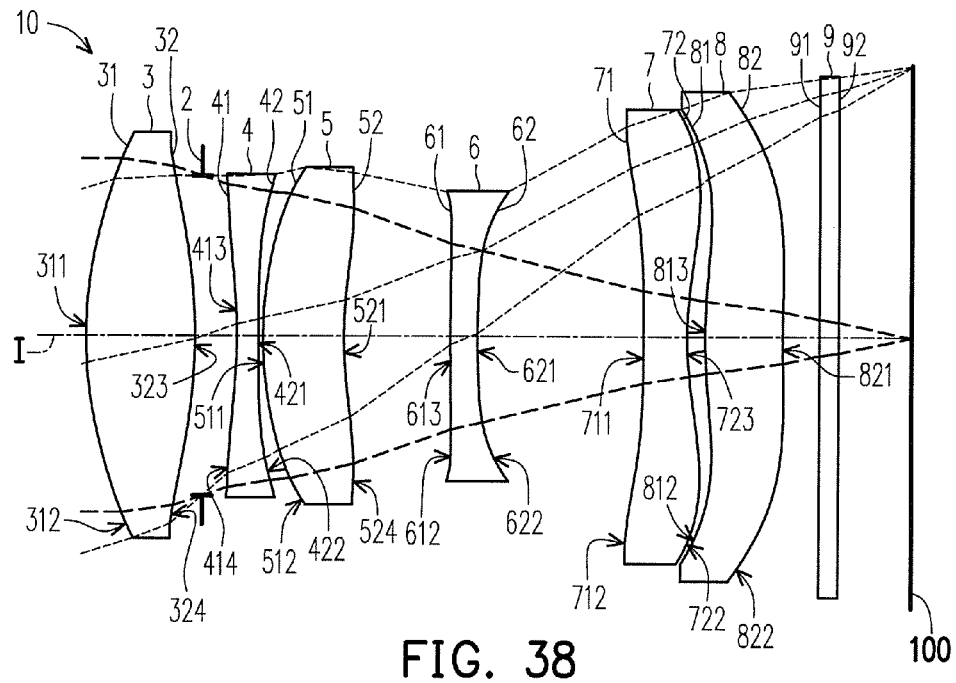
FIG. 38 is a schematic view illustrating an optical imaging lens according to a ninth embodiment of the invention.

FIG. 38 is a schematic view illustrating an optical imaging lens according to a ninth embodiment of the invention, and FIG. 39A to FIG. 39D illustrate a longitudinal spherical aberration and other aberrations of the optical imaging lens according to the ninth embodiment of the invention. With reference to FIG. 38, the optical imaging lens 10 provided in the ninth embodiment is similar to that provided in the first embodiment, while the optical data, the aspheric coefficients, and the parameters of the lens elements 3, 4, 5, 6, 7, and 8 in these two embodiments are different to some extent. According to the ninth embodiment, the optical imaging lens 10 includes a first lens element 3, an aperture stop 2, a second lens element 4, a third lens element 5, a fourth lens element 6, a fifth lens element 7, a sixth lens element 8, and a filter 9 arranged in order from the object side to the image side along the optical axis I. In the present embodiment, among the lens elements, the first lens element 3 is closest to the object side, and the second lens element 4 is the second-closest lens element to the object side. The aperture stop 2 is arranged between the lens element closest to the object side and the lens element second closest to the object side, i.e., the aperture stop 2 is located between the first lens element 3 and the second lens element 4. The image-side surface 32 of the first lens element 3 is a convex surface and has a convex portion 323 in the vicinity of the optical axis I and a convex portion 324 in the vicinity of the periphery of the first lens element 3. The object-side surface 41 of the second lens element 4 is a concave surface and has a concave portion 413 in the vicinity of the optical axis I and a concave portion 414 in the vicinity of the periphery of the second lens element 4. The image-side surface 52 of the third lens element 5 has a concave portion 521 in the vicinity of the optical axis I and a convex portion 524 in the vicinity of the periphery of the third lens element 5. The object-side surface 61 of the fourth lens element 6 has a convex portion 613 in the vicinity of the optical axis I and a concave portion 612 in the vicinity of the periphery of the fourth lens element 6. The fifth lens element 7 has negative refracting power. The image-side surface 72 of the fifth lens element 7 has a concave portion 723 in the vicinity of the optical axis I and a convex portion 722 in the vicinity of the periphery of the fifth lens element 7. The sixth lens element 8 has positive refracting power. The object-side surface 81 of the sixth lens element 8 has a convex portion 813 in the vicinity of the optical axis I and a concave portion 812 in the vicinity of the periphery of the sixth lens element 8. For clear illustration, it should be mentioned that the same reference numbers of the concave portions and the convex portions in the two embodiments are omitted from FIG. 38.

The detailed optical data of the optical imaging lens 10 are provided in FIG. 40. In the ninth embodiment, the effective focal length of the optical imaging lens 10 is 9.391 mm; the HFOV of the optical imaging lens 10 is 17.323°; the Fno of the optical imaging lens 10 is 2.400; the system length of the optical imaging lens 10 is 9.000 mm, and the image height of the optical imaging lens 10 is 2.944 mm.

The aspheric coefficients of the object-side surface 31 of the first lens element 3 to the image-side surface 82 of the sixth lens element 8 in the formula (1) are indicated in FIG. 41 according to the ninth embodiment.

In addition, the relationship among the important parameters pertaining to the optical imaging lens 10 in the ninth embodiment is indicated in FIG. 51.

In the present embodiment, the number of the at least one variable gap in the optical imaging lens 10 is 1. The variable gap is the air gap between the first lens element 3 and the second lens element 4, and the length of the variable gap along the optical axis I is the distance from the image-side surface 32 of the first lens element 3 to the second lens element 4 along the optical axis I. When the optical imaging lens 10 performs the focusing function, all the lens elements (i.e., the first lens element 3) on the object side with respect to the variable gap are a movable group, and the overall refracting power of the lens group (the movable group) is positive. All the lens elements (i.e., the second lens element 4, the third lens element 5, the fourth lens element 6, the fifth lens element 7, and the sixth lens element 8) on the image side with respect to the variable gap are a fixed group, and the overall refracting power of the lens group (the fixed group) is negative. In the present embodiment, if the optical imaging lens 10 focuses on the object having the infinite object distance, e.g., the object having the object distance of $10^{10}$ mm, the length of the variable gap along the optical axis I is 0.457 mm. Besides, in the present embodiment, if the optical imaging lens 10 focuses on the object having the object distance of 500 mm, the length of the variable gap along the optical axis I is 0.466 mm.

Figures 39A, 39B, 39C, 39D:
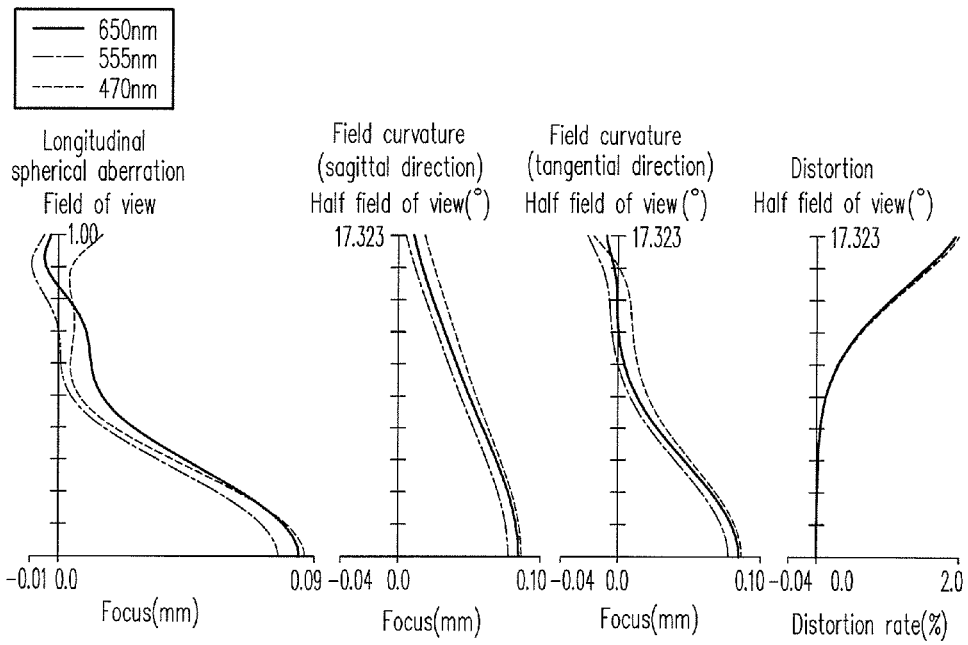
FIG. 39A to FIG. 39D illustrate a longitudinal spherical aberration and other aberrations of the optical imaging lens according to the ninth embodiment of the invention.

The longitudinal spherical aberration provided in the ninth embodiment and shown in FIG. 39A is simulated on the condition that the pupil radius is 1.9565 mm. In FIG. 39A which illustrates the longitudinal spherical aberration in the ninth embodiment, the imaging point deviation of the off-axis ray at different heights is controlled within a range of ±0.09 mm. In FIG. 39B and FIG. 39C which illustrate two diagrams of field curve aberrations, the focal length variation of the three representative wavelengths within the entire field of view falls within the range of ±0.10 mm. In FIG. 39D, the diagram of distortion aberration shows that the distortion aberration in the ninth embodiment can be maintained within the range of ±2.0%. Accordingly, compared to the existing optical imaging lens, the optical imaging lens provided in the ninth embodiment can have the favorable imaging quality, given that the system length of the optical imaging lens is shortened to about 9,000 mm.

According to the above description, compared to the first embodiment, the advantages of the ninth embodiment are as follows. The ninth embodiment discloses the optical imaging lens whose half field of view is less than that provided in the first embodiment. If the system focal length almost remains unchanged, the smaller the half field of view is, the greater the telescopic properties are. The location of the aperture stop provided in the ninth embodiment is different from that provided in the first embodiment. Compared to the aperture stop provided in the first embodiment, the aperture stop provided in the ninth embodiment is closer to the image side. In general, the closer the aperture stop is to the image side, the larger the field of view of the optical imaging lens is, and the greater the imaging quality of the optical imaging lens. Besides, the optical imaging lens 10 provided in the ninth embodiment is, in comparison with that provided in the first embodiment, easier to be manufactured and thus has higher yield.

FIG. 42 is a schematic view illustrating an optical imaging lens according to a tenth embodiment of the invention, and FIG. 43A to FIG. 43D illustrate a longitudinal spherical aberration and other aberrations of the optical imaging lens according to the tenth embodiment of the invention. With reference to FIG. 42, the optical imaging lens 10 provided in the tenth embodiment includes an aperture stop 2, a first lens element 3, a second lens element 4, a third lens element 5, a fourth lens element 6, a fifth lens element 7, and a filter 9 arranged in order from an object side to an image side along an optical axis I of the optical imaging lens 10. When a ray emitted from an object to be shot enters the optical imaging lens 10 and passes through the aperture stop 2, the first lens element 3, the second lens element 4, the third lens element 5, the fourth lens element 6, the fifth lens element 7, and the filter 9, an image is formed on an image plane 100. The filter 9, for example, is an infrared cut filter (IR cut filter) configured to prevent the infrared ray at part of the waveband of the ray from being transmitted to the image plane 100 and deteriorating the imaging quality. It should be added that the object side is a side facing the object to be shot, and the image side is a side facing the image plane 100.

The first lens element 3, the second lens element 4, the third lens element 5, the fourth lens element 6, the fifth lens element 7 and the cover glass 9 respectively have object-side surfaces 31, 41, 51, 61, 71, and 91 facing the object side and allowing imaging rays to pass through, and respectively have image-side surfaces 32, 42, 52, 62, 72, and 92 facing the image side and allowing the imaging rays to pass through. Among the lens elements, the first lens element 3 is closest to the object side, and the last lens element (i.e., the fifth lens element 7) is closest to the image side. The aperture stop 2 is arranged on the object-side surface of the lens elements closest to the object side, i.e., the aperture stop 2 is arranged on the object-side surface 31 of the first lens element 3.

Besides, in order to meet the demand for lighter products, the first lens element 3 through the fifth lens element 7 all have refracting power and are made of a plastic material; nevertheless, the material of the first lens element 3 through the fifth lens element 7 is not limited thereto.

The first lens element 3 has positive refracting power. The object-side surface 31 of the first lens element 3 is a convex surface and has a convex portion 311 in a vicinity of the optical axis I and a convex portion 312 in a vicinity of a periphery of the first lens element 3. The image-side surface 32 of the first lens element 3 is a convex surface and has a convex portion 323 in a vicinity of the optical axis I and a convex portion 324 in a vicinity of the periphery of the first lens element 3. In the tenth embodiment, the object-side surface 31 and the image-side surface 32 of the first lens element 3 are both aspheric surfaces.

The second lens element 4 has negative refracting power. The object-side surface 41 of the second lens element 4 is a concave surface and has a concave portion 413 in a vicinity of the optical axis I and a concave portion 414 in a vicinity of a periphery of the second lens element 4. The image-side surface 42 of the second lens element 4 is a concave surface and has a concave portion 421 in a vicinity of the optical axis I and a concave portion 422 in a vicinity of the periphery of the second lens element 4. In the tenth embodiment, the object-side surface 41 and the image-side surface 42 of the second lens element 4 are both aspheric surfaces.

The third lens element 5 has negative refracting power. The object-side surface 51 of the third lens element 5 is a concave surface and has a concave portion 513 in a vicinity of the optical axis I and a concave portion 514 in a vicinity of a periphery of the third lens element 5. The image-side surface 52 of the third lens element 5 has a convex portion 523 in a vicinity of the optical axis I and a concave portion 522 in a vicinity of the periphery of the third lens element 5. In the tenth embodiment, the object-side surface 51 and the image-side surface 52 of the third lens element 5 are both aspheric surfaces.

The fourth lens element 6 has negative refracting power. The object-side surface 61 of the fourth lens element 6 is a concave surface and has a concave portion 611 in a vicinity of the optical axis I and a concave portion 612 in a vicinity of a periphery of the fourth lens element 6. The image-side surface 62 of the fourth lens element 6 is a convex surface and has a convex portion 623 in a vicinity of the optical axis I and a convex portion 624 in a vicinity of the periphery of the fourth lens element 6. In the tenth embodiment, the object-side surface 61 and the image-side surface 62 of the fourth lens element 6 are both aspheric surfaces.

The fifth lens element 7 has negative refracting power. The object-side surface 71 of the fifth lens element 7 is a concave surface and has a concave portion 711 in a vicinity of the optical axis I and a concave portion 712 in a vicinity of a periphery of the fifth lens element 7. The image-side surface 72 of the fifth lens element 7 has a concave portion 723 in a vicinity of the optical axis I and a convex portion 722 in a vicinity of the periphery of the fifth lens element 7. In the tenth embodiment, the object-side surface 71 and the image-side surface 72 of the fifth lens element 7 are both aspheric surfaces.

The detailed optical data in the tenth embodiment are provided in FIG. 44. In the tenth embodiment, an effective focal length of the optical imaging lens 10 is 9.192 mm; the HFOV of the optical imaging lens 10 is 17.736°; the Fno of the optical imaging lens 10 is 2.397; the system length of the optical imaging lens 10 is 8.279 mm, and the image height of the optical imaging lens 10 is 2.944 mm. Here, the system length refers to a distance from the object-side surface 31 of the first lens element 3 to the image plane 100 along the optical axis I.

In addition, in the tenth embodiment, all of the ten surfaces, i.e., the object-side surfaces 31, 41, 51, 61, and 71 and the image-side surfaces 32, 42, 52, 62, and 72 of the first lens element 3, the second lens element 4, the third lens element 5, the fourth lens element 6, and the fifth lens element 7 are aspheric surfaces. The aspheric surfaces are defined by the formula (1) and thus will not be further described. The aspheric coefficients of the object-side surface 31 of the first lens element 3 to the image-side surface 72 of the fifth lens element 7 in the formula (1) are indicated in FIG. 45. In FIG. 45, the referential number 31 in one column represents the aspheric coefficient of the object-side surface 31 of the first lens element 3, and the reference numbers in other columns can be deduced from the above.

In addition, the relationship among the important parameters pertaining to the optical imaging lens 10 in the tenth embodiment is indicated in FIG. 51. The definitions of the parameters of the first lens element 3, the second lens element 4, the third lens element 5, the fourth lens element 6, and the fifth lens element 7 provided in the tenth embodiment are similar to those defined in the first embodiment, while the differences are provided below.

Here, G5 represents a distance from the image-side surface 72 of the fifth lens element 7 to the object-side surface 91 of the filter 9 along the optical axis I.

In the present embodiment, the optical imaging lens 10 satisfies $\Delta G/Gv \leq 0.1$. Here, $\Delta G$ is an absolute value of a difference between a first value and a second value of a length of the at least one variable gap along the optical axis when an object having an infinite object distance and an object having an object distance of 500 millimeters are focused respectively, and Gv is the second value. Specifically, in the present embodiment, the number of the at least one variable gap in the optical imaging lens 10 is 1. The variable gap is the air gap between the third lens element 5 and the fourth lens element 6, and the length of the variable gap along the optical axis I is the distance from the image-side surface 52 of the third lens element 5 to the object-side surface 61 of the fourth lens element 6 along the optical axis I. When the optical imaging lens 10 performs the focusing function, all the lens elements (i.e., the first lens element 3, the second lens element 4, and the third lens element 5) on the object side with respect to the variable gap are a movable group, and the overall refracting power of the lens group (the movable group) is positive. All the lens elements (i.e., the fourth lens element 6 and the fifth lens element 7) on the image side with respect to the variable gap are a fixed group, and the overall refracting power of the lens group (the fixed group) is negative. In the present embodiment, if the optical imaging lens 10 focuses on the object having the infinite object distance, e.g., the object having the object distance of $10^{10}$ mm, the length of the variable gap along the optical axis I is 1.792 mm. Besides, in the present embodiment, if the optical imaging lens 10 focuses on the object having the object distance of 500 mm, the length of the variable gap along the optical axis I is 1.825 mm.

The longitudinal spherical aberration provided in the tenth embodiment and shown in FIG. 43A is simulated on the condition that the pupil radius is 1.9151 mm. In FIG. 43A which illustrates the longitudinal spherical aberration in the tenth embodiment, the imaging point deviation of the off-axis ray at different heights is controlled within a range of ±0.05 mm. In FIG. 43B and FIG. 43C which illustrate two diagrams of field curve aberrations, the focal length variation of the three representative wavelengths within the entire field of view falls within the range of ±0.06 mm. In FIG. 43D, the diagram of distortion aberration shows that the distortion aberration in the tenth embodiment can be maintained within the range of ±1.0%. Accordingly, compared to the existing optical imaging lens, the optical imaging lens provided in the tenth embodiment can have the favorable imaging quality, given that the system length of the optical imaging lens is shortened to about 8.279 mm. That is, according to the tenth embodiment, the length of the lens can be shortened without sacrificing the optical properties, and thereby the slim design of product can be realized. In addition, the optical imaging lens 10 provided in the tenth embodiment is characterized by a small field of view, which is conducive to the improvement of the telescopic photograph taking ability. Besides, the length of the optical imaging lens 10 extended during auto focus can be reduced without sacrificing the imaging quality, and the clarity of the image of the distant or close object can be guaranteed.

According to the above description, compared to the first embodiment, the advantages of the tenth embodiment are as follows. The tenth embodiment discloses the optical imaging lens whose half field of view is less than that provided in the first embodiment. If the system focal length almost remains unchanged, the smaller the half field of view is, the greater the telescopic properties are. The optical imaging lens 10 provided in the tenth embodiment has less longitudinal spherical aberration than that provided in the first embodiment. The optical imaging lens 10 provided in the tenth embodiment has less field curvature aberration in the sagittal direction than that provided in the first embodiment. The optical imaging lens 10 provided in the tenth embodiment has less field curvature aberration in the tangential direction than that provided in the first embodiment. Besides, the optical imaging lens 10 provided in the tenth embodiment has less distortion aberration than that provided in the first embodiment; in addition, the optical imaging lens 10 provided in the tenth embodiment is, in comparison with that provided in the first embodiment, easier to be manufactured and thus has higher yield.

Figure 46:
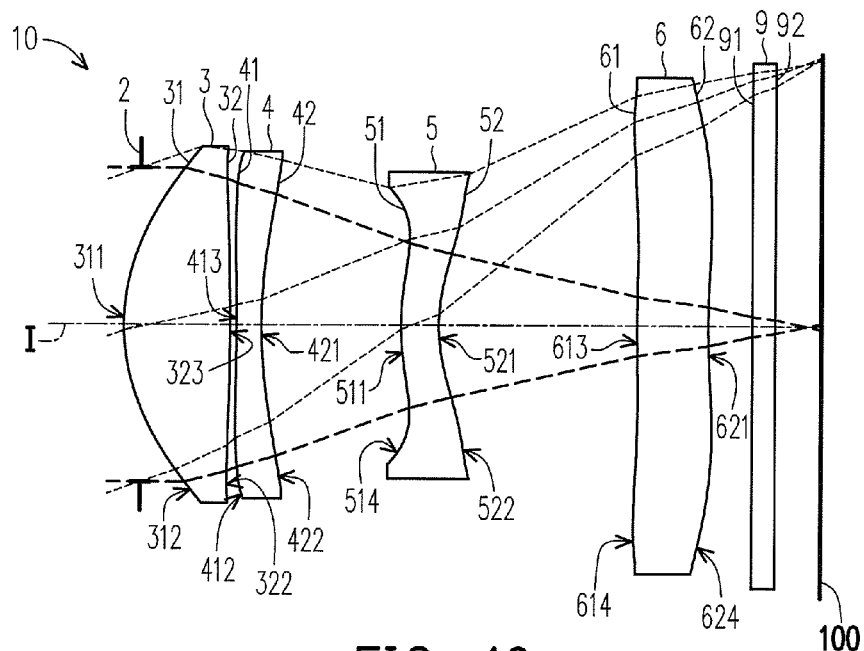
FIG. 46 is a schematic view illustrating an optical imaging lens according to an eleventh embodiment of the invention.

FIG. 46 is a schematic view illustrating an optical imaging lens according to an eleventh embodiment of the invention, and FIG. 47A to FIG. 47D illustrate a longitudinal spherical aberration and other aberrations of the optical imaging lens according to the eleventh embodiment of the invention. With reference to FIG. 46, the optical imaging lens 10 provided in the eleventh embodiment includes an aperture stop 2, a first lens element 3, a second lens element 4, a third lens element 5, a fourth lens element 6, and a filter 9 arranged in order from an object side to an image side along an optical axis I of the optical imaging lens 10. When a ray emitted from an object to be shot enters the optical imaging lens 10 and passes through the aperture stop 2, the first lens element 3, the second lens element 4, the third lens element 5, the fourth lens element 6, and the filter 9, an image is formed on an image plane 100. The filter 9, for example, is an IR cut filter configured to prevent the infrared ray at part of the waveband of the ray from being transmitted to the image plane 100 and deteriorating the imaging quality. It should be added that the object side is a side facing the object to be shot, and the image side is a side facing the image plane 100.

The first lens element 3, the second lens element 4, the third lens element 5, the fourth lens element 6, and the cover glass 9 respectively have object-side surfaces 31, 41, 51, 61, and 91 facing the object side and allowing imaging rays to pass through, and respectively have image-side surfaces 32, 42, 52, 62, and 92 facing the image side and allowing the imaging rays to pass through. Among the lens elements, the first lens element 3 is closest to the object side, and the last lens element (i.e., the fourth lens element 6) is closest to the image side. The aperture stop 2 is arranged on the object-side surface of the lens elements closest to the object side, i.e., the aperture stop 2 is arranged on the object-side surface 31 of the first lens element 3.

Besides, in order to meet the demand for lighter products, the first lens element 3 through the fourth lens element 6 all have refracting power and are made of a plastic material; nevertheless, the material of the first lens element 3 through the fourth lens element 6 is not limited thereto.

The first lens element 3 has positive refracting power. The object-side surface 31 of the first lens element 3 is a convex surface and has a convex portion 311 in a vicinity of the optical axis I and a convex portion 312 in a vicinity of a periphery of the first lens element 3. The image-side surface 32 of the first lens element 3 has a convex portion 323 in a vicinity of the optical axis I and a concave portion 322 in a vicinity of the periphery of the first lens element 3. In the eleventh embodiment, the object-side surface 31 and the image-side surface 32 of the first lens element 3 are both aspheric surfaces.

The second lens element 4 has negative refracting power. The object-side surface 41 of the second lens element 4 has a concave portion 413 in a vicinity of the optical axis I and a convex portion 412 in a vicinity of a periphery of the second lens element 4. The image-side surface 42 of the second lens element 4 is a concave surface and has a concave portion 421 in a vicinity of the optical axis I and a concave portion 422 in a vicinity of the periphery of the second lens element 4. In the eleventh embodiment, the object-side surface 41 and the image-side surface 42 of the second lens element 4 are both aspheric surfaces.

The third lens element 5 has negative refracting power. The object-side surface 51 of the third lens element 5 has a convex portion 511 in a vicinity of the optical axis I and a concave portion 514 in a vicinity of a periphery of the third lens element 5. The image-side surface 52 of the third lens element 5 is a concave surface and has a concave portion 521 in a vicinity of the optical axis I and a concave portion 522 in a vicinity of the periphery of the third lens element 5. In the eleventh embodiment, the object-side surface 51 and the image-side surface 52 of the third lens element 5 are both aspheric surfaces.

The fourth lens element 6 has negative refracting power. The object-side surface 61 of the fourth lens element 6 is a convex surface and has a convex portion 613 in a vicinity of the optical axis I and a convex portion 614 in a vicinity of a periphery of the fourth lens element 6. The image-side surface 62 of the fourth lens element 6 has a concave portion 621 in a vicinity of the optical axis I and a convex portion 624 in a vicinity of the periphery of the fourth lens element 6. In the eleventh embodiment, the object-side surface 61 and the image-side surface 62 of the fourth lens element 6 are both aspheric surfaces.

The detailed optical data in the eleventh embodiment are provided in FIG. 48. In the eleventh embodiment, an effective focal length of the optical imaging lens 10 is 3.515 mm; the HFOV of the optical imaging lens 10 is 18.771°; the Fno of the optical imaging lens 10 is 2.343; the system length of the optical imaging lens 10 is 3.253 mm, and the image height of the optical imaging lens 10 is 1.224 mm. Here, the system length refers to a distance from the object-side surface 31 of the first lens element 3 to the image plane 100 along the optical axis I.

In addition, in the eleventh embodiment, all of the eight surfaces, i.e., the object-side surfaces 31, 41, 51, and 61 and the image-side surfaces 32, 42, 52, and 62 of the first lens element 3, the second lens element 4, the third lens element 5, and the fourth lens element 6 are aspheric surfaces. The aspheric surfaces are defined by the formula (1) and thus will not be further described. The aspheric coefficients of the object-side surface 31 of the first lens element 3 to the image-side surface 62 of the fourth lens element 6 in the formula (1) are indicated in FIG. 49. In FIG. 49, the referential number 31 in one column represents the aspheric coefficient of the object-side surface 31 of the first lens element 3, and the reference numbers in other columns can be deduced from the above.

In addition, the relationship among the important parameters pertaining to the optical imaging lens 10 in the eleventh embodiment is indicated in FIG. 51. The definitions of the parameters of the first lens element 3, the second lens element 4, the third lens element 5, and the fourth lens element 6 provided in the eleventh embodiment are similar to those defined in the first embodiment, while the differences are provided below.

Here, G4 represents a distance from the image-side surface 62 of the fourth lens element 6 to the object-side surface 91 of the filter 9 along the optical axis I.

In the present embodiment, the optical imaging lens 10 satisfies ΔG/Gv≤0.1. Here, ΔG is an absolute value of a difference between a first value and a second value of a length of the at least one variable gap along the optical axis when an object having an infinite object distance and an object having an object distance of 500 millimeters are focused respectively, and Gv is the second value. Specifically, in the present embodiment, the number of the at least one variable gap in the optical imaging lens 10 is 1. The variable gap is the air gap between the second lens element 4 and the third lens element 5, and the length of the variable gap along the optical axis I is the distance from the image-side surface 42 of the second lens element 4 to the object-side surface 51 of the third lens element 5 along the optical axis I. When the optical imaging lens 10 performs the focusing function, all the lens elements (i.e., the first lens element 3 and the second lens element 4) on the object side with respect to the variable gap are a movable group, and the overall refracting power of the lens group (the movable group) is positive. All the lens elements (i.e., the third lens element 5 and the fourth lens element 6) on the image side with respect to the variable gap are a fixed group, and the overall refracting power of the lens group (the fixed group) is negative. In the present embodiment, if the optical imaging lens 10 focuses on the object having the infinite object distance, e.g., the object having the object distance of $5.1^9$ mm, the length of the variable gap along the optical axis I is 0.653 mm. Besides, in the present embodiment, if the optical imaging lens 10 focuses on the object having the object distance of 500 mm, the length of the variable gap along the optical axis I is 0.673 mm.

Figures 47A, 47B, 47C, 47D:
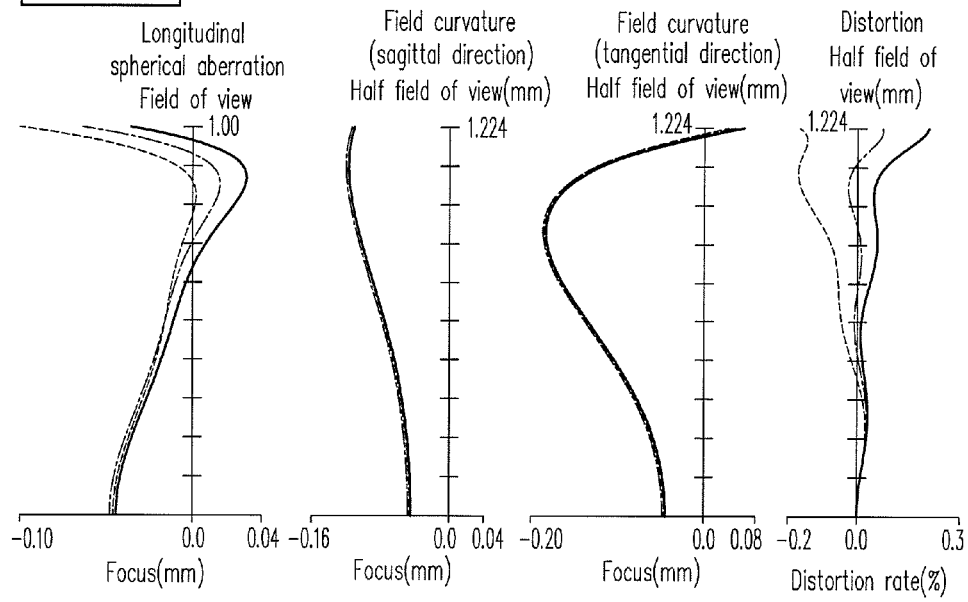
FIG. 47A to FIG. 47D illustrate a longitudinal spherical aberration and other aberrations of the optical imaging lens according to the eleventh embodiment of the invention.

The longitudinal spherical aberration provided in the eleventh embodiment and shown in FIG. 47A is simulated on the condition that the pupil radius is 0.7323 mm. In FIG. 47A which illustrates the longitudinal spherical aberration in the eleventh embodiment, the imaging point deviation of the off-axis ray at different heights is controlled within a range of ±0.04 mm. In FIG. 47B and FIG. 47C which illustrate two diagrams of field curve aberrations, the focal length variation of the three representative wavelengths within the entire field of view falls within the range of ±0.20 mm. In FIG. 47D, the diagram of distortion aberration shows that the distortion aberration in the eleventh embodiment can be maintained within the range of ±0.3%. Accordingly, compared to the existing optical imaging lens, the optical imaging lens provided in the eleventh embodiment can have the favorable imaging quality, given that the system length of the optical imaging lens is shortened to about 3.253 mm. That is, according to the eleventh embodiment, the length of the lens can be shortened without sacrificing the optical properties, and thereby the slim design of product can be realized. In addition, the optical imaging lens 10 provided in the eleventh embodiment is characterized by a small field of view, which is conducive to the improvement of the telescopic photograph taking ability. Besides, the length of the optical imaging lens 10 extended during auto focus can be reduced without sacrificing the imaging quality, and the clarity of the image of the distant or close object can be guaranteed.

According to the above description, compared to the first embodiment, the advantages of the eleventh embodiment are as follows. The eleventh embodiment discloses the optical imaging lens whose length (i.e., the system length) is less than that provided in the first embodiment. The optical imaging lens 10 provided in the eleventh embodiment has less longitudinal spherical aberration than that provided in the first embodiment. Besides, the optical imaging lens 10 provided in the eleventh embodiment has less distortion aberration than that provided in the first embodiment; in addition, the optical imaging lens 10 provided in the eleventh embodiment is, in comparison with that provided in the first embodiment, easier to be manufactured and thus has higher yield.

Please refer to both FIG. 50 and FIG. 51. FIG. 50 is a table diagram showing optical parameters provided in the first embodiment to the fifth embodiment. FIG. 51 is a table diagram showing optical parameters provided in the sixth embodiment to the eleventh embodiment.

The first lens element 3 of the optical imaging lens 10 provided herein is characterized by the positive refracting power, which is conducive to concentration of rays. Besides, given that the air gap between the lens elements can be properly modified, and the following condition can be satisfied, the length of the numerator may be relatively reduced while the denominator remains unchanged, so as to reduce the length of the lens extended during auto focus: ΔG/Gv≤0.1; if the following condition can be further satisfied, the imaging quality can be further enhanced: 0.003≤ΔG/Gv≤0.1.

In view of said design, the length of the lens can be effectively reduce, favorable imaging quality can be ensured, and the clarity of the image of the distant or close object can be guaranteed.

If the relationship of the optical parameters in the optical imaging lens 10 provided in the embodiments of the invention satisfies at least one of the following conditions, the design of the optical imaging lens 10 with favorable optical performance and the reduced length in whole becomes technical feasible:

1. To shorten the system length of the lens elements, the thickness of the lens elements and the air gap among the lens elements are properly reduced according to the embodiments of the invention. However, in consideration of the difficulty of assembling the lens elements without sacrificing the imaging quality, the thickness of the lens elements and the air gap among the lens elements need be correspondingly adjusted. Hence, the configurations of the optical imaging lens can be optimized if the following conditions are satisfied.

If the optical imaging lens provided herein can satisfy any of the following conditions, it is indicated that the length of the numerator may be relatively reduced while the denominator remains unchanged, so as to reduce the size of the lens: (ALT*HFOV)/EFL≤15.1; if the following condition can be further satisfied, the imaging quality can be further enhanced: 5.2≤(ALT*HFOV)/EFL≤15.1; (TTL*Fno)/(EFL+AAG)≤1.8; if the following condition can be further satisfied, the imaging quality can be further enhanced: 1.1≤(TTL*Fno)/(EFL+AAG)≤1.8; and (TTL*Fno)/(EFL+TL)≤1.3; if the following condition can be further satisfied, the imaging quality can be further enhanced: 0.8≤(TTL*Fno)/(EFL+TL)≤1.3.

If the optical imaging lens provided herein can satisfy any of the following conditions, it is indicated that the satisfactory arrangement allows the imaging quality to be improved while maintaining the yield to a satisfactory extent: 2.8≤AAG/10ΔG; if any of the following conditions can be further satisfied, the size of the resultant lens is satisfactory:

$2.8 \leq AAG/10\Delta G \leq 45.2$; $4.3 \leq (EFL+AAG)/(10\Delta G*Fno)$; if any of the following conditions can be further satisfied, the size of the resultant lens is satisfactory: $4.3 \leq (EFL+AAG)/(10\Delta G*Fno) \leq 65$; and $1.7 \leq (EFL+TTL)/(ALT*Fno)$; if any of the following conditions can be further satisfied, the size of the resultant lens is satisfactory: $1.7 \leq (EFL+TTL)/(ALT*Fno) \leq 2.8$.

2. If the optical imaging lens satisfies the following condition, the light incident aperture can be enhanced without increasing the length of the optical imaging lens, which is conducive to the design of the telescopic lens with the large aperture stop.

If the following condition can be satisfied, it is indicated that the length of the numerator may be relatively reduced while the denominator remains unchanged, so as to reduce the size of the lens: $(TTL*Fno)/EFL \leq 2.3$; if the following condition can be further satisfied, the imaging quality can be further enhanced: $1.6 \leq (TTL*Fno)/EFL \leq 2.3$.

3. Large EFL is conducive to the reduction of the field of view of the optical imaging lens and the improvement of the telescopic properties. Hence, the EFL is designed to have a large value according to the disclosure. However, while the optical imaging lens is applied as a micro lens in a portable phone, the EFL is limited. As such, if the following condition can be satisfied, the field of view can be reduced during the reduction of the thickness of the optical system, and favorable telescopic properties can be achieved.

If the optical imaging lens provided herein can satisfy any of the following conditions, it is indicated that the satisfactory arrangement allows the imaging quality to be improved while maintaining the yield to a satisfactory extent: $0.9 \leq EFL/TTL$; if any of the following conditions can be further satisfied, the size of the resultant lens is satisfactory: $0.9 \leq EFL/TTL \leq 1.5$; and $5.8 \leq EFL/BFL$; if any of the following conditions can be further satisfied, the size of the resultant lens is satisfactory: $5.8 \leq EFL/BFL \leq 11$.

4. If the following condition can be satisfied, the limitation to the relationship between the focal length and the aperture stop is conducive to improvement of the imaging quality, uniformity of the brightness of the resultant images, easy control of image distortion, and reduction of difficulty of designing and processing the optical lens.

If the optical imaging lens provided herein can satisfy the following condition, it is indicated that the satisfactory arrangement allows the imaging quality to be improved while maintaining the yield to a satisfactory extent: $1.5 \leq EFL/Fno$; if any of the following conditions can be further satisfied, the size of the resultant lens is satisfactory: $1.5 \leq EFL/Fno \leq 4.5$.

5. If the condition $HFOV \leq 25°$ is satisfied, the telescopic properties of the images can be enhanced, the brightness of the images is uniform, and the difficulty of designing and processing the optical lens can be reduced.

6. If the condition $TTL \leq 9$ mm is satisfied, the portable electronic product can be miniaturized. If the condition $3 \text{ mm} \leq TTL \leq 9$ mm can be further satisfied, the imaging quality can be further enhanced.

7. In the optical imaging lens provided herein, the aperture stop is arranged on the object-side surface of the lens element closest to the object side (e.g., the object-side surface of the first lens element) or arranged between the lens element closest to the object side and the lens element second closest to the object side (e.g., between the first lens element and the second lens element). Thereby, with use of other lenses, the Fno can be reduced, and the available aperture can be enlarged.

8. When the condition $Fno \leq 2.4$ is satisfied, the small Fno can be obtained, i.e., the large aperture stop can be obtained. Thereby, the optical imaging lens can have the enlarged available aperture stop.

9. If the number of the lens elements having the refracting power is assumed to be 8 at most, the design of the optical imaging lens with favorable optical performance and the reduced length in whole becomes technical feasible.

In view of the unpredictability of the design of an optical system, with the framework set forth in the embodiments of the invention, the optical imaging lens satisfying said conditions can be characterized by the reduced length, the enlarged available aperture, the reduced field of view (i.e., the better telescopic properties), the improved imaging quality, or the improved assembly yield, such that the shortcomings described in the related art can be better prevented.

In addition, the above-limited relation is provided in an exemplary sense and can be randomly and selectively combined and applied to the embodiments of the invention in different manners; the invention should not be limited to the above examples. In implementation of the invention, apart from the above-described relations, it is also possible to add additional detailed structure such as more concave and convex curvatures arrangement of a specific lens element or a plurality of lens elements so as to enhance control of system property and/or resolution. For example, it is optional to form an additional concave portion in the vicinity of the optical axis or an additional concave portion in the vicinity of the periphery on the image-side surface of the second lens element. It should be noted that the above-described details can be optionally combined and applied to the other embodiments of the invention under the condition where they are not in conflict with one another.

To sum up, the optical imaging lens 10 described in the embodiments of the invention may have at least one of the following advantages and/or achieve at least one of the following effects.

1. The longitudinal spherical aberrations, field curvature aberrations, and distortion aberrations provided in the embodiments of the invention all comply with usage specifications. Moreover, the off-axis rays with different heights and the three representative wavelengths 650 nm (red ray), 555 nm (green ray), and 470 nm (blue ray) are all gathered around imaging points, and according to a deviation range of each curve, it can be observed that deviations of the imaging points of the off-axis rays with different heights are all controlled and thus capable of suppressing spherical aberrations, image aberrations, and distortion. With reference to the imaging quality data, distances among the three representative wavelengths 650 nm, 555 nm, and 470 nm are fairly close, which indicates that rays with different wavelengths in the optical imaging lens as provided in the embodiments of the invention can be well concentrated under different circumstances, and the optical imaging lens is characterized by the capability of suppressing dispersion. As such, the optical imaging lens provided herein has favorable optical properties.

2. The first lens element 3 of the optical imaging lens 10 provided herein is characterized by the positive refracting power, which is conducive to concentration of rays. Besides, if the air gap between the lens elements can be properly modified, and the condition $\Delta G/Gv \leq 0.1$ can be satisfied, the length of the lens extended during auto focus can be reduced. In view of said design, the length of the lens can be effectively reduce, favorable image quality can be ensured, and the clarity of the image of the distant or close object can be guaranteed.

Although the disclosure has been provided with reference to the above embodiments, it will be apparent to one of ordinary skill in the art that modifications to the described embodiments may be made without departing from the spirit of the disclosure. Accordingly, the scope of the disclosure will be defined by the attached claims and not by the above detailed descriptions.

What is claimed is:

1. An optical imaging lens comprising a plurality of lens elements arranged in order from an object side to an image side along an optical axis, each of the lens elements comprising an object-side surface and an image-side surface, the object-side surface facing the object side and allowing an imaging ray to pass through, the image-side surface facing the image side and allowing the imaging ray to pass through, at least one variable gap existing between the lens elements, one of the lens elements closest to the object side having positive refracting power, wherein the optical imaging lens satisfies:

ΔG/Gv≤0.1 and 0.9≤EFL/TTL, and

ΔG is an absolute value of a difference between a first value and a second value of a length of the at least one variable gap along the optical axis when an object having an infinite object distance and an object having an object distance of 500 millimeters are focused respectively, Gv is the second value, EFL is a system focal length of the optical imaging lens, and TTL is a distance from the object-side surface of the one of the lens elements closest to the object side to an image plane of the optical imaging lens along the optical axis.

2. The optical imaging lens as recited in claim 1, wherein the optical imaging lens further satisfies: TTL≤9 mm.

3. The optical imaging lens as recited in claim 1, wherein the optical imaging lens further satisfies HFOV≤25°, and HFOV is a half field of view of the optical imaging lens.

4. The optical imaging lens as recited in claim 1, wherein the optical imaging lens further satisfies: Fno≤2.4, and Fno is an F-number of the optical imaging lens.

5. The optical imaging lens as recited in claim 1, further comprising an aperture stop arranged on the object-side surface of the one of the lens elements closest to the object side or between the one of the lens elements closest to the object side and one of the lens elements second-closest to the object side.

6. The optical imaging lens as recited in claim 1, wherein the optical imaging lens further satisfies: (ALT*HFOV)/EFL≤15.1°, ALT is a sum of a thickness of all the lens elements along the optical axis, and HFOV is a half field of view of the optical imaging lens.

7. The optical imaging lens as recited in claim 1, wherein the optical imaging lens further satisfies: 1.5 mm≤EFL/Fno, and Fno is an F-number of the optical imaging lens.

8. The optical imaging lens as recited in claim 1, wherein the optical imaging lens further satisfies: (TTL*Fno)/(EFL+AAG)≤1.8, Fno is an F-number of the optical imaging lens, and AAG is a sum of a length of air gaps among the lens elements along the optical axis.

9. The optical imaging lens as recited in claim 1, wherein the optical imaging lens further satisfies: (TTL*Fno)/(EFL+TL)≤1.3, Fno is an F-number of the optical imaging lens, and TL is a distance from the object-side surface of the one of the lens elements closest to the object side to the image-side surface of one of the lens elements farthest to the object side.

10. The optical imaging lens as recited in claim 1, wherein the optical imaging lens further satisfies: (TTL*Fno)/EFL≤2.3, and Fno is an F-number of the optical imaging lens.

11. The optical imaging lens as recited in claim 1, wherein the optical imaging lens further satisfies: 2.8≤AAG/10ΔG, and AAG is a sum of a length of air gaps among the lens elements along the optical axis.

12. The optical imaging lens as recited in claim 1, wherein the optical imaging lens further satisfies: 4.3≤(EFL+AAG)/(10ΔG*Fno), AAG is a sum of a length of air gaps among the lens elements along the optical axis, and Fno is an F-number of the optical imaging lens.

13. The optical imaging lens as recited in claim 1, wherein the optical imaging lens further satisfies: 5.8≤EFL/BFL, and BFL is a distance from the image-side surface of one of the lens elements farthest to the object side to an image plane of the optical imaging lens along the optical axis.

14. The optical imaging lens as recited in claim 1, wherein the optical imaging lens further satisfies: 1.7≤(EFL+TTL)/(ALT*Fno), ALT is a sum of a thickness of all the lens elements along the optical axis, and Fno is an F-number of the optical imaging lens.

15. The optical imaging lens as recited in claim 1, wherein the number of the lens elements having refracting power is 8 at most.

16. The optical imaging lens as recited in claim 1, wherein the number of the at least one variable gap is 1.

17. The optical imaging lens as recited in claim 16, wherein overall refracting power of the lens elements on the object side with respect to the variable gap is positive.

18. The optical imaging lens as recited in claim 16, wherein overall refracting power of the lens elements on the image side with respect to the variable gap is negative.

19. The optical imaging lens as recited in claim 16, wherein the lens elements on the object side with respect to the variable gap are a movable group, and the lens elements on the image side with respect to the variable gap are a fixed group.

* * * * *